(12) United States Patent
Elder et al.

(10) Patent No.: US 12,187,827 B2
(45) Date of Patent: Jan. 7, 2025

(54) CROSSLINKABLE NONLINEAR-OPTICAL CHROMOPHORE SYSTEM

(71) Applicant: University of Washington, Seattle, WA (US)

(72) Inventors: Delwin Elder, Seattle, WA (US); Huajun Xu, Seattle, WA (US); Bruce H. Robinson, Seattle, WA (US); Larry R. Dalton, Seattle, WA (US)

(73) Assignee: University of Washington, Seattle, WA (US)

( * ) Notice: Subject to any disclaimer, the term of this patent is extended or adjusted under 35 U.S.C. 154(b) by 546 days.

(21) Appl. No.: 17/624,519

(22) PCT Filed: Jul. 1, 2020

(86) PCT No.: PCT/US2020/040543
§ 371 (c)(1),
(2) Date: Jan. 3, 2022

(87) PCT Pub. No.: WO2021/003296
PCT Pub. Date: Jan. 7, 2021

(65) Prior Publication Data
US 2022/0380500 A1 Dec. 1, 2022

Related U.S. Application Data

(60) Provisional application No. 62/869,868, filed on Jul. 2, 2019.

(51) Int. Cl.
| | | |
|---|---|---|
| C08F 220/16 | (2006.01) | |
| C08F 220/14 | (2006.01) | |
| C08F 220/30 | (2006.01) | |
| C08J 3/24 | (2006.01) | |
| C08J 5/18 | (2006.01) | |
| G02F 1/361 | (2006.01) | |

(52) U.S. Cl.
CPC ............... *C08F 220/14* (2013.01); *C08J 3/24* (2013.01); *C08J 5/18* (2013.01); *G02F 1/3617* (2013.01); *C08F 220/16* (2013.01); *C08F 220/302* (2020.02); *C08J 2333/12* (2013.01)

(58) Field of Classification Search
None
See application file for complete search history.

(56) References Cited

U.S. PATENT DOCUMENTS

| | | |
|---|---|---|
| 7,101,957 B2 | 9/2006 | Huang |
| 8,173,045 B2 | 5/2012 | Jen |
| 8,394,499 B2 | 3/2013 | Jen |
| 8,409,713 B2 | 4/2013 | Jen |

(Continued)

OTHER PUBLICATIONS

"Controlled Diels-Alder Reactions Used To Incorporate Highly Efficient Polyenic Chromophores into Maleimide-Containing Side-Chain Polymers for Electro-Optics". Macromolecules 2009, 42, 2438-2445. (Year: 2009).*

(Continued)

*Primary Examiner* — Richard A. Huhn
(74) *Attorney, Agent, or Firm* — Christensen O'Connor Johnson Kindness PLLC

(57) ABSTRACT

Crosslinked films having electro-optic activity, compositions and compounds for making the films, methods for making the films, and devices that include the films are disclosed.

23 Claims, 27 Drawing Sheets

(56) References Cited

U.S. PATENT DOCUMENTS

| | | | |
|---|---|---|---|
| 9,023,248 B2 | 5/2015 | Jen | |
| 2007/0152198 A1* | 7/2007 | Jen | G02F 1/3614 252/582 |
| 2009/0148717 A1* | 6/2009 | Jen | C08F 232/08 428/522 |

OTHER PUBLICATIONS

Communication and Supplementary Search Report for EP Application No. 20834513.2, mailed Jul. 3, 2023, (8 oages).
Ayata, Masafumi, et al. "High-speed plasmonic modulator in a single metal layer." Science 358.6363 (2017): 630-632.
Benea-Chelmus, Ileana-Cristina, et al. "Three-dimensional phase modulator at telecom wavelength acting as a terahertz detector with an electro-optic bandwidth of 1.25 terahertz." ACS Photonics 5.4 (2018): 1398-1403.
Cheng, Yen-Ju, et al. "Donor—acceptor thiolated polyenic chromophores exhibiting large optical nonlinearity and excellent photostability." Chemistry of Materials 20.15 (2008): 5047-5054.
Cheng, Ziyao, et al. "Photo-crosslinkable second-order nonlinear optical polymer: facile synthesis and enhanced NLO thermostability." Polymer Chemistry 9.25 (2018): 3522-3527.
Dalton, Larry R., Philip A. Sullivan, and Denise H. Bale. "Electric field poled organic electro-optic materials: state of the art and future prospects." Chemical reviews 110.1 (2010): 25-55.
Elder, Delwin L., et al. "Effect of rigid bridge-protection units, quadrupolar interactions, and blending in organic electro-optic chromophores." Chemistry of Materials 29.15 (2017): 6457-6471.
Haffner, Christian, et al. "Harnessing nonlinearities near material absorption resonances for reducing losses in plasmonic modulators." Optical Materials Express 7.7 (2017): 2168-2181.
Haffner, Christian, et al. "Low-loss plasmon-assisted electro-optic modulator." Nature (2018).
Jin, Wenwei, et al. "Structure-function relationship exploration for enhanced thermal stability and electro-optic activity in monolithic organic NLO chromophores." Journal of Materials Chemistry C 4.15 (2016): 3119-3124.
Kieninger, C., et al. "Record-high in-device electro-optic coefficient of 359 pm/V in a silicon-organic hybrid (SOH) modulator." CLEO, 2017.
Kim, Tae-Dong, et al. "Binary chromophore systems in nonlinear optical dendrimers and polymers for large electrooptic activities." The Journal of Physical Chemistry C 112.21 (2008): 8091-8098.
Kim, T-D., et al. "Ultralarge and thermally stable electro-optic activities from Diels-Alder crosslinkable polymers containing binary chromophore systems." Advanced Materials 18.22 (2006): 3038-3042.
I, Zhong'an, et al. "Ar—ArF Self-Assembly of Star-Shaped Second-Order Nonlinear Optical Chromophores Achieving Large Macroscopic Nonlinearities." Advanced Electronic Materials 3.11 (2017): 1700138.
Li, Ming, et al. "Poling efficiency enhancement of tethered binary nonlinear optical chromophores for achieving an ultrahigh n 3 r 33 figure-of-merit of 2601 pm V- 1." Journal of Materials Chemistry C 3.26 (2015): 6737-6744.
Iu, Jialei, et al. "Recent advances in polymer electro-optic modulators." RSC advances 5.21 (2015): 15784-15794.
Luo, Jingdong, et al. "Highly efficient and thermally stable electro-optic polymer from a smartly controlled crosslinking process." Advanced Materials 15.19 (2003): 1635-1638.
Ouyang, Canbin, et al. "Preparation of main-chain polymers based on novel monomers with d-π-a structure for application in organic second-order nonlinear optical materials with good long-term stability." ACS applied materials & Interfaces 9.12 (2017): 10366-10370.
Shi, Zhengwei, et al. "Achieving excellent electro-optic activity and thermal stability in poled polymers through an expeditious crosslinking process." Journal of Materials Chemistry 22.3 (2012): 951-959.
Shi, Zhengwei, et al. "Controlled Diels-Alder Reactions Used To Incorporate Highly Efficient Polyenic Chromophores into Maleimide-Containing Side-Chain Polymers for Electro-Optics." Macromolecules 42.7 (2009): 2438-2445.
Shi, Zhengwei, et al. "Dipolar chromophore facilitated huisgen cross-linking reactions for highly efficient and thermally stable electrooptic polymers." ACS Macro Letters 1.7 (2012): 793-796.
Shi, Zhengwei, et al. "Highly Efficient Diels-Alder Crosslinkable Electro-Optic Dendrimers for Electric-Field Sensors." Advanced Functional Materials 17.14 (2007): 2557-2563.
Shi, Yongqiang, et al. "Low (sub-1-volt) halfwave voltage polymeric electro-optic modulators achieved by controlling chromophore shape." Science 288.5463 (2000): 119-122.
Shi, Zhengwei, et al. "Reinforced site isolation leading to remarkable thermal stability and high electrooptic activities in cross-linked nonlinear optical dendrimers." Chemistry of Materials 20.20 (2008): 6372-6377.
Teng, C. C., and H. T. Man. "Simple reflection technique for measuring the electro-optic coefficient of poled polymers." Applied Physics Letters 56.18 (1990): 1734-1736.
Ummethala, S., et al. "Terahertz-to-optical conversion using a plasmonic modulator." CLEO, 2018, STu3D.4.
Wu, Jieyun, et al. "Synthesis of novel nonlinear optical chromophore to achieve ultrahigh electro-optic activity." Chemical Communications 48.77 (2012): 9637-9639.
Wu, Wenbo, et al. "The influence of pentafluorophenyl groups on the nonlinear optical (NLO) performance of high generation dendrons and dendrimers." Scientific reports 4.6101 (2014): 1-8.
Wu, Jieyun, et al. "Ultra-efficient and stable electro-optic dendrimers containing supramolecular homodimers of semifluorinated dipolar aromatics." Materials Chemistry Frontiers 2.5 (2018): 901-909.
Xu, Huajun, et al. "Crosslinkable Nonlinear Optical Chromophore System," University of Washington, Department of Chemistry, Confidential Information, 2018, 15 pages.
Xu, Huajun, et al. "Synthesis, characterization and comparative studies of nonlinear optical chromophores with rod-like, Y-shaped and X-shaped configurations." Dyes and Pigments 164 (2019): 54-61.
Yu, Yeli, et al. "Design and preparation of hybrid films containing three-branched chromophores for nonlinear optical applications." RSC advances 6.85 (2016): 81969-81975.
Zhou, Jian, et al. "Facile preparation of crosslinkable organic EO polymers based on AZO nonlinear optical chromophore: great indemnification for long term of stability." Journal of Materials Science: Materials in Electronics 28.6 (2017): 4931-4940.
International Search Report and Written Opinion mailed Nov. 3, 2020, issued in corresponding International Application No. PCT/US2020/040543, filed Jul. 1, 2020, 10 pages.
International Preliminary Report on Patentability mailed Dec. 28, 2021, issued in corresponding International Application No. PCT/US2020/040543, filed Jul. 1, 2020, 7 pages.
Robinson, Bruce H., et al. "Optimization of plasmonic-organic hybrid electro-optics." Journal of Lightwave Technology 36.21 (2018): 5036-5047.

* cited by examiner

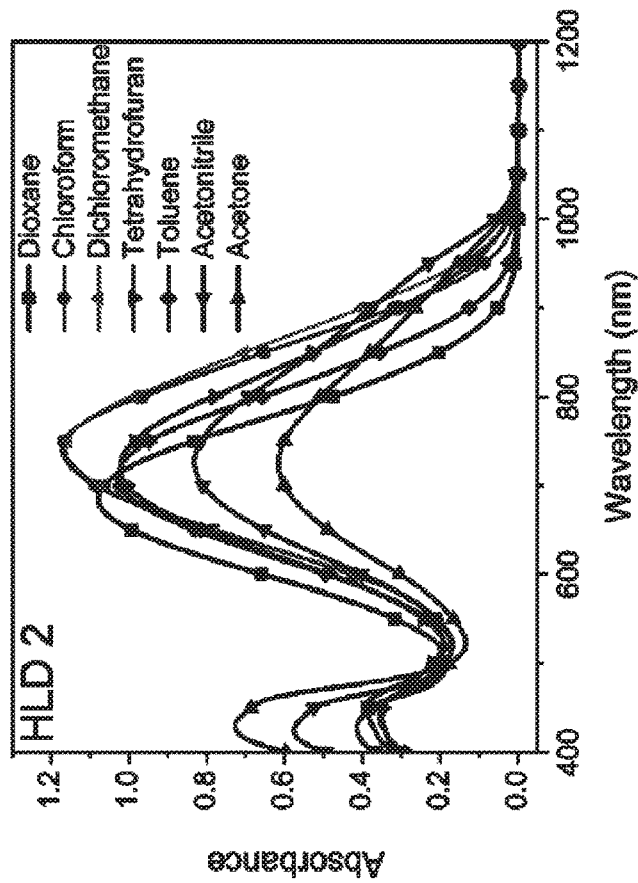
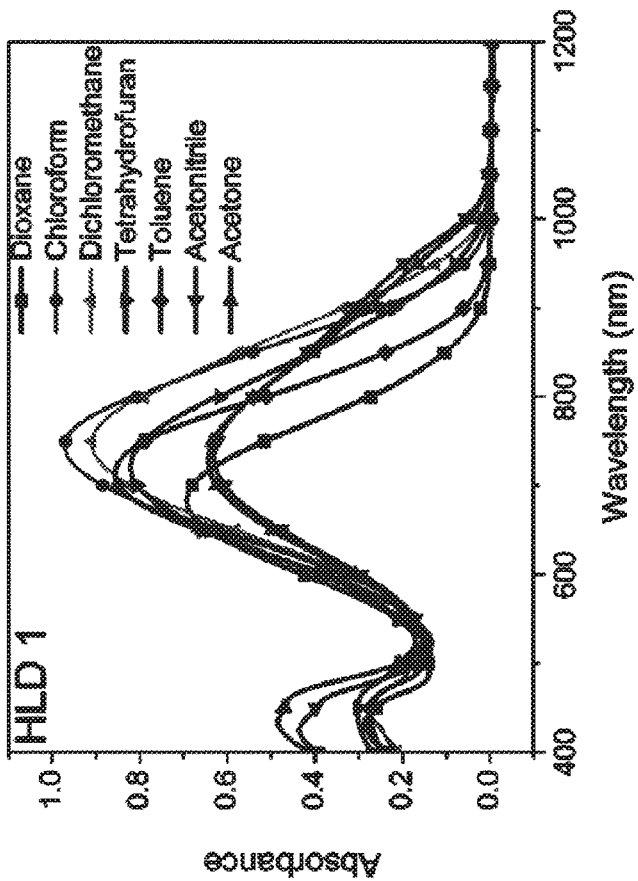
FIG. 4A
FIG. 4B

CROSSLINKABLE NONLINEAR-OPTICAL CHROMOPHORE SYSTEM

CROSS-REFERENCE TO RELATED APPLICATION

This application claims the benefit of Provisional Application No. 62/869,868 filed Jul. 2, 2019, the disclosure of which is expressly incorporated herein by reference in its entirety.

STATEMENT OF GOVERNMENT LICENSE RIGHTS

This invention was made with government support under Grant No. FA9550-15-1-0319, awarded by the Air Force Office of Scientific Research, and Grant No. DMR1303080, awarded by the National Science Foundation. The government has certain rights in the invention.

BACKGROUND

Organic electro-optic (OEO) materials are of great interest due to promising applications for ultra-high speed and power-efficient data transmission and signal processing at dimensions small enough for chipscale integration. State-of-the-art OEO materials show great advantages in EO activity, response time and bandwidth compared with traditional inorganic EO materials (e.g., lithium niobate). Hybrid organic modulator systems have demonstrated bandwidths greater than 500 GHz, with the intrinsic capability for THz bandwidths. They also have better energy efficiency (femtojoule/bit level), smaller footprints, and dramatically lower $U_\pi L$ (the $\pi$-voltage-length product) in EO modulators than competing materials. In order to meet the stringent requirements for commercial Mach-Zehnder modulator devices, the electro-optic material must have a large electro-optic coefficient ($r_{33}$), high index of refraction, and long-term alignment stability.

Traditionally, OEO materials have consisted of nonlinear optical (NLO) chromophores doped or incorporated at the level of ca. 20-40 wt % in a polymer host. In recent years, excellent EO materials and EO device results have been achieved using neat OEO materials (chromophore without a polymer host). The high density of active EO material has helped contribute to high EO activities >500 pm/V in bulk, and high index of refraction (n>1.75, 1310-1550 nm) has helped contribute to in-device EO activities >250 pm/V and flat frequency responses up to 170-500 GHz in plasmonic-organic hybrid (POH) and silicon-organic hybrid (SOH) EO devices. One factor limiting greater adoption is that the neat materials tend to have only moderate thermostability of EO activity (glass transition temperature, $T_g$<~110° C.). In OEO systems, EO activity must be induced by performing bulk non-centrosymmetric alignment of the EO molecules, which is typically performed by electric field poling in which the OEO material is heated to the $T_g$, and an electric field is applied to align the highly dipolar EO molecules. The molecular order and EO activity are lost if the material is subsequently heated to or near the $T_g$ again. Moderate thermostability can be achieved by using high $T_g$ polymers or neat chromophores functionalized with rigid, bulky groups, but covalent crosslinking results in high $T_g$ and a covalent 3-D network that restricts molecular motions giving rise to even better EO alignment stability, which is required for long-term operation in a commercial device.

Several very elegant demonstrations of crosslinkable EO systems have been reported using cycloaddition "click" chemistry following poling to achieve relatively high $r_{33}$ and temporal stability. Cycloaddition reactions such as Diels-Alder (DA) are ideal in that they are thermally activated and can be initiated immediately after the thermal poling process, they produce a sterically bulky crosslink that helps to increase the $T_g$, and they produce no side products that would outgas from or plasticize the EO material. There are some crosslinked EO systems in the literature that have high $r_{33}$ (>250 pm/V) but only moderate thermostability (as measured by $T_g$), or high $T_g$ (>150° C.) but only moderate $r_{33}$ (<150 pm/V). Furthermore, most of these crosslinked systems use polymeric crosslinkers, which dilutes the amount of EO material and thus lowers the index of refraction. Traditional polymeric crosslinked OEO systems have chromophore number density $\rho_N$ usually less than ~2.7×10$^{20}$ molecules/cm$^3$ and n≈1.7 (1310 nm). It is crucial to have a high n because it has a strong influence on the in-device figure-of-merit (FOM) to quantify the efficiency of optical modulation, $n^3 r_{33}$. This figure of merit is particularly critical since $U_\pi L \propto 1/n^3 r_{33}$. Some systems dope in a non-crosslinkable chromophore into a crosslinkable chromophore formulation, which increases the chromophore number density (~3.5×10$^{20}$ molecules/cm$^3$) and boosts the electro-optic coefficient (>260 pm/V); however, the long-term stability of acentric order is reduced because of the lower degree of crosslinking. Another example in the literature reports a neat, high number density (~4.5×10$^{20}$ molecules/cm$^3$), high n (estimated n of 1.75-1.8, 1310 nm), high hyperpolarizability crosslinked OEO system, however the maximum $r_{33}$ is rather low at 84 pm/V.

There is a need for a crosslinked OEO system that has a high $r_{33}$ (>250 pm/V), high index of refraction (n>1.8), and high $T_g$ and alignment thermostability. The present disclosure describes such materials.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides crosslinked films having electro-optic activity, methods for making the films, and devices that include the films.

In one aspect, provided herein are crosslinked films having electro-optic activity. In some embodiments, the films have an $r_{33}$ value of about 150 pm/V or greater and a $T_g$ of about 130° C. or greater. The films disclosed herein are formed by a reaction between a first polarizable chromophore comprising at least two first reactive, e.g., crosslinkable groups and one or more compounds comprising at least two counterpart reactive groups.

In another aspect, provided herein is a method for making a film having electro-optic activity.

In a third aspect, crosslinkable chromophore compounds useful for forming films disclosed herein are provided.

In yet another aspect, the disclosure provides electro-optic devices that include the films described above.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A and 4B are UV-Vis absorption spectra of exemplary chromophores HLD1 and HLD2 ($1\times10^{-5}$ M) in seven aprotic solvents with varying dielectric constants (c). The heights are proportional to different extinction coefficients.

DETAILED DESCRIPTION

Figure 1:
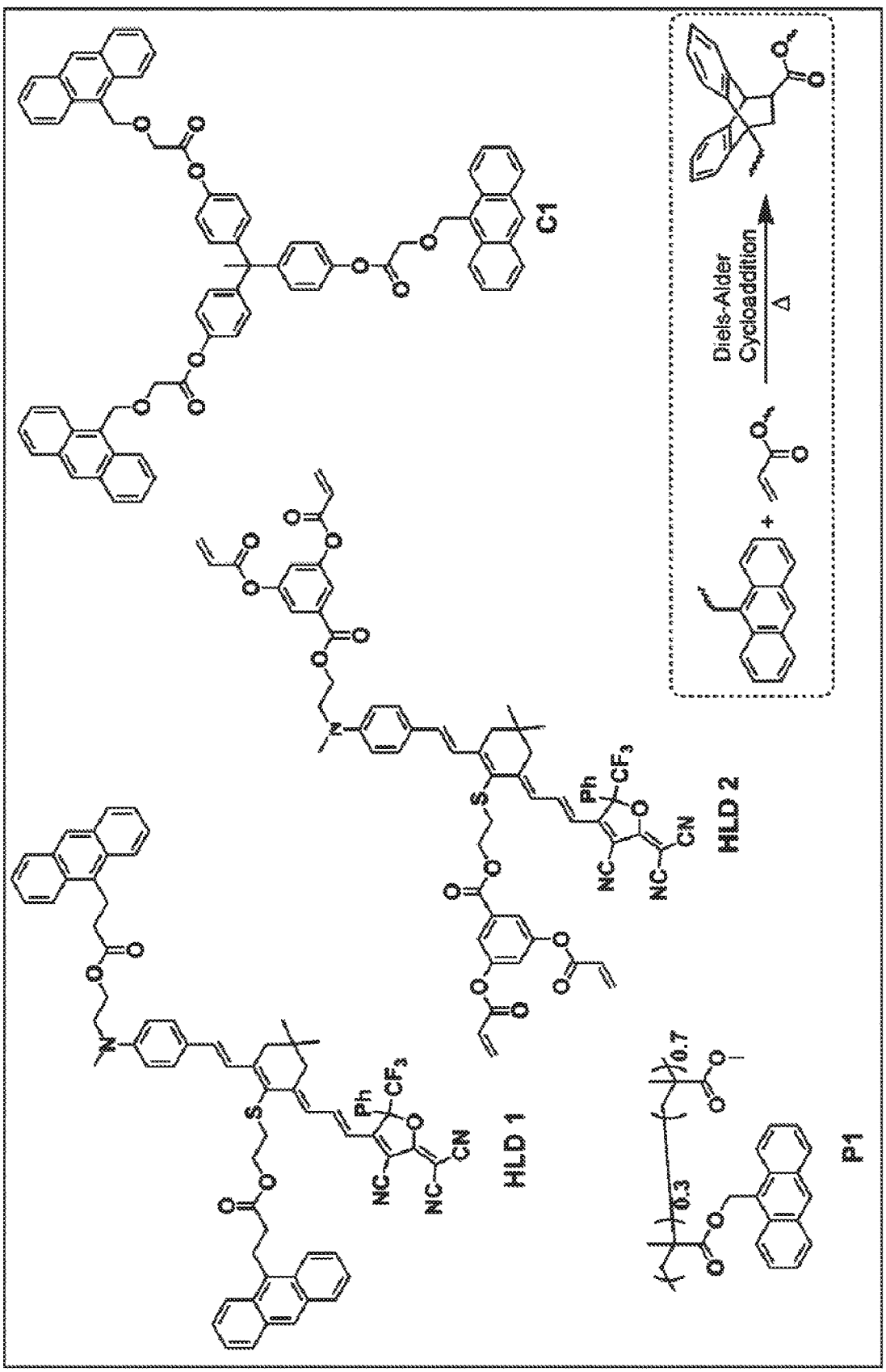
FIG. 1 shows chemical structures for chromophores HLD1, HLD2, crosslinker C1, and polymer P1.

Provided herein are crosslinked films having electro-optic (also referred to as E-O or EO) activity, compounds for making the films, methods for making the films, and devices that include the films. The films of the disclosure concurrently possess a high electro-optic coefficient ($r_{33}$), high index of refraction, and long-term and high temperature stability of chromophore alignment.

In certain embodiments, the films disclosed herein have an $r_{33}$ value of from about 150 pm/V to about 450 pm/V, from 200 pm/V to about 450 pm/V, from about 150 pm/V to about 500 pm/V, from about 200 pm/V to about 500 pm/V, from about 250 pm/V to about 500 pm/V. In certain embodiments, the films have an $r_{33}$ value of about 150 pm/V or greater, about 160 pm/V or greater, about 170 pm/V or greater, about 180 pm/V or greater, about 190 pm/V or greater, about 200 pm/V or greater, or about 250 pm/V or greater.

The films disclosed herein have a high index of refraction as measured using variable angle spectroscopic ellipsometry on unpoled thin films using an isotropic model fit. In some embodiments, the films have an index of refraction at 1310 nm of about 1.75 or greater. In other embodiments, the films have an index of refraction at 1310 nm between about 1.75 and about 1.9 or between about 1.75 and about 2.0.

The films of the disclosure are characterized by high poling efficiency as calculated by linear least squares regression through the origin of multiple $r_{33}$ vs poling field data points. In some embodiments, the films have a poling efficiency of about 2 nm$^2$/V$^2$ or greater, about 2.5 nm$^2$/V$^2$ or greater, or about 3 nm$^2$/V$^2$ or greater. In certain embodiments, the films have a poling efficiency from about 2 nm$^2$/V$^2$ to about 4 nm$^2$/V$^2$ or from about 3 nm$^2$/V$^2$ to about 4 nm$^2$/V$^2$.

In addition to the above-referenced characteristics, in some embodiments, the films have a high $T_g$. In certain embodiments, the films have a $T_g$ of about 130° C. or greater, about 140° C. or greater, about 150° C. or greater, about 160° C. or greater, about 180° C. or greater, about 190° C. or greater, or about 200° C. or greater.

The films disclosed herein are formed by a reaction between a first polarizable chromophore comprising at least two first reactive (e.g., crosslinkable) groups and one or more compounds comprising at least two counterpart reactive groups. In some embodiments, the films are formed by a (4+2) cycloaddition reaction between (a) a first polarizable chromophore comprising at least two first reactive groups crosslinkable by (4+2) cycloaddition and (b) one or more compounds comprising at least two counterpart reactive groups, resulting in a film having an $r_{33}$ value of about 150 pm/V or greater and a $T_g$ of about 130° C. or greater.

The polarizable chromophore compounds or polarizable chromophores are second-order nonlinear optical chromophore compounds. As used herein, the term "chromophore" refers to a compound that can absorb light in the visible spectral range and is colored. In the context of the disclosure, the term "nonlinear" refers to second order effects that arise from the nature of the polarizable chromophore compound (i.e., "push-pull" chromophore compound) having the general structure D-π-A, where D is an electron donor, A is an electron acceptor, and π is a π-bridge that conjugates the donor to the acceptor.

A "donor" (represented by "D") is an atom or group of atoms with low electron affinity relative to an acceptor (defined below) such that, when the donor is conjugated to an acceptor through a π-bridge, electron density is transferred from the donor to the acceptor.

An "acceptor" (represented by "A") is an atom or group of atoms with high electron affinity relative to a donor such that, when the acceptor is conjugated to a donor through a π-bridge, electron density is transferred from the acceptor to the donor.

A "π-bridge" or "conjugated bridge" (represented in chemical structures by "π" or "$\pi_n$," where n is an integer) is comprised of an atom or group of atoms through which electrons can be delocalized from an electron donor (defined above) to an electron acceptor (defined above) through the orbitals of atoms in the bridge. In some embodiments, the orbitals are p-orbitals on multiply bonded carbon atoms such as those found in alkenes, alkynes, neutral or charged aromatic rings, and neutral or charged heteroaromatic ring systems. Additionally, the orbitals can be p-orbitals on multiply bonded atoms such as boron or nitrogen or organometallic orbitals. The atoms of the bridge that contain the orbitals through which the electrons are delocalized are referred to here as the "critical atoms." The number of critical atoms in a bridge can be a number from 1 to about 30. The critical atoms can also be substituted further with the following: "alkyl" as defined below, "aryl" as defined below, or "heteroalkyl" as defined below. One or more atoms, with the exception of hydrogen, on alkyl, aryl, or heteroalkyl substituents of critical atoms in the bridge may be bonded to atoms in other alkyl, aryl, or heteroalkyl substituents to form one or more rings.

The first polarizable chromophores used in the methods and films disclosed herein comprise at least two first reactive groups that can form a covalent bond (i.e., crosslink) when reacted with a counterpart group, for example, when subjected to high temperatures. Any suitable reactive groups and counterpart groups can be used to form the films of the disclosure. In some embodiments, under some conditions, the reactive groups react selectively or exclusively with the counterpart groups and neither reactive groups not counterpart groups react with other groups that can be present on the compounds comprising such reactive and/or counterpart groups. In some embodiments, the reactive groups and counterpart groups are groups crosslinkable by (4+2) cycloaddition. A number of such groups is known in the art.

In some embodiments, the first reactive groups crosslinkable by (4+2) cycloaddition are diene groups, and the counterpart reactive groups are dienophile groups. In some embodiments, the first polarizable chromophore comprises a plurality (i.e. two or more) diene groups. In other embodiments, the first reactive groups crosslinkable by (4+2) cycloaddition are dienophile groups and the counterpart reactive groups are diene groups.

In some embodiments of the films disclosed herein, the first polarizable chromophore is a compound of Formula (I):

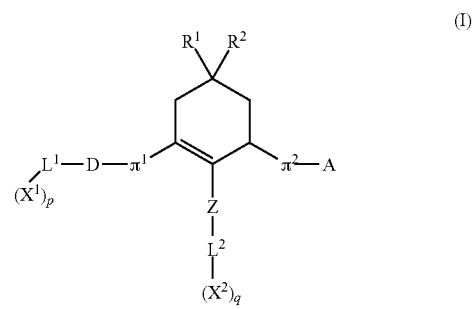

wherein
D is a π-electron donor group,
A is a π-electron acceptor group,
$L^1$ is a linker moiety selected from optionally substituted C1-C20 alkylene, optionally substituted C1-C20 heteroalkylene, optionally substituted C6-C10 aryl, optionally substituted C5-C10 heteroarylene, and combinations thereof,
$L^2$ is a linker moiety selected from optionally substituted C1-C20 alkylene, optionally substituted C1-C20 heteroalkylene, optionally substituted C6-C10 aryl, optionally substituted C5-C10 heteroarylene, and combinations thereof,
$R^1$ and $R^2$ are independently H or optionally substituted $C_1$-$C_6$ alkyl,
Z is S, O, or $CH_2$,
$\pi^1$ and $\pi^2$ are a π bridge electronically conjugating the groups attached to it
$X^1$ is a group crosslinkable by (4+2) cycloaddition,
$X^2$ is a group crosslinkable by (4+2) cycloaddition,
p is 1 or 2, and
q is 1 or 2.

As used herein, the terms "alkyl," "alkenyl," and "alkynyl" include straight-chain, branched-chain, and cyclic monovalent hydrocarbyl radicals, and combinations of these, which contain only C and H when they are unsubstituted. Examples include methyl, ethyl, isobutyl, cyclohexyl, cyclopentylethyl, 2-propenyl, 3-butynyl, and the like. The total number of carbon atoms in each such group is sometimes described herein, e.g., when the group can contain up to ten carbon atoms it can be represented as 1-10C, as $C_1$-$C_{10}$, C-C10, or C1-10.

The terms "heteroalkyl," "heteroalkenyl," and "heteroalkynyl," as used herein, mean the corresponding hydrocarbons wherein one or more chain carbon atoms have been replaced by a heteroatom. Exemplary heteroatoms include N, O, S, and P. When heteroatoms are allowed to replace carbon atoms, for example, in heteroalkyl groups, the numbers describing the group, though still written as e.g. C3-C10, represent the sum of the number of carbon atoms in the cycle or chain and the number of such heteroatoms that are included as replacements for carbon atoms in the cycle or chain being described.

Typically, the alkyl, alkenyl, and alkynyl substituents contain 1-20 carbon atoms (alkyl) or 2-10 carbon atoms (alkenyl or alkynyl). Preferably, they contain 1-8 carbon atoms (alkyl) or 2-8 carbon atoms (alkenyl or alkynyl). Sometimes they refer to as "lower alkyl," meaning that they contain 1-6 carbon atoms (alkyl) or 2-6 carbon atoms (alkenyl or alkynyl). A single group can include more than one type of multiple bond, or more than one multiple bond; such groups are included within the definition of the term "alkenyl" when they contain at least one carbon-carbon double bond, and are included within the term "alkynyl" when they contain at least one carbon-carbon triple bond.

As used herein, the terms "alkylene," "alkenylene," and "alkynylene" include straight-chain, branched-chain, and cyclic divalent hydrocarbyl radicals, and combinations thereof.

Alkyl, alkenyl, and alkynyl groups can be optionally substituted to the extent that such substitution makes sense chemically. Typical substituents include, but are not limited to, halogens (F, Cl, Br, I), =O, =N—CN, =N—OR, =NR, OR, NR$_2$, SR, SO$_2$R, SO$_2$NR$_2$, NRSO$_2$R, NRCONR$_2$, NRC(O)OR, NRC(O)R, CN, C(O)OR, C(O)NR$_2$, OC(O)R, C(O)R, and NO$_2$, wherein each R is independently H, C1-C8 alkyl, C2-C8 heteroalkyl, C1-C8 acyl, C2-C8 heteroacyl, C2-C8 alkenyl, C2-C8 heteroalkenyl, C2-C8 alkynyl, C2-C8 heteroalkynyl, C6-C10 aryl, or C5-C10 heteroaryl, and each R is optionally substituted with halogens (F, Cl, Br, I), =O, =N—CN, =N—OR, =NR', OR', NR'$_2$, SR', SO$_2$R', SO$_2$NR'$_2$, NR'SO$_2$R', NR'CONR'$_2$, NR'C(O)OR', NR'C(O)R', CN, C(O)OR', C(O)NR'$_2$, OC(O) R', C(O)R', and NO$_2$, wherein each R' is independently H, C1-C8 alkyl, C2-C8 heteroalkyl, C1-C8 acyl, C2-C8 heteroacyl, C6-C10 aryl or C5-C10 heteroaryl. Alkyl, alkenyl and alkynyl groups can also be substituted by C1-C8 acyl, C2-C8 heteroacyl, C6-C10 aryl or C5-C10 heteroaryl, each of which can be substituted by the substituents that are appropriate for the particular group.

While "alkyl" as used herein includes cycloalkyl and cycloalkylalkyl groups, the term "cycloalkyl" is used herein to describe a carbocyclic non-aromatic group that is connected via a ring carbon atom, and "cycloalkylalkyl" is used to describe a carbocyclic non-aromatic group that is connected to the molecule through an alkyl linker. Similarly, "heterocyclyl" is used to identify a non-aromatic cyclic group that contains at least one heteroatom as a ring member and that is connected to the molecule via a ring atom, which may be C or N; and "heterocyclylalkyl" may be used to describe such a group that is connected to another molecule through an alkylene linker. As used herein, these terms also include rings that contain a double bond or two, as long as the ring is not aromatic.

"Aromatic" or "aryl" substituent or moiety refers to a monocyclic or fused bicyclic moiety having the well-known characteristics of aromaticity; examples include phenyl and naphthyl. Similarly, the terms "heteroaromatic" and "heteroaryl" refer to such monocyclic or fused bicyclic ring systems which contain as ring members one or more heteroatoms. Suitable heteroatoms include N, O, and S, inclusion of which permits aromaticity in 5-membered rings as well as 6-membered rings. Typical heteroaromatic systems include monocyclic C5-C6 aromatic groups such as pyridyl, pyrimidyl, pyrazinyl, thienyl, furanyl, pyrrolyl, pyrazolyl, thiazolyl, oxazolyl, and imidazolyl, and fused bicyclic moieties formed by fusing one of these monocyclic groups with a phenyl ring or with any of the heteroaromatic monocyclic groups to form a C8-C10 bicyclic group such as indolyl, benzimidazolyl, indazolyl, benzotriazolyl, isoquinolyl, quinolyl, benzothiazolyl, benzofuranyl, pyrazolopyridyl, quinazolinyl, quinoxalinyl, cinnolinyl, and the like. Any monocyclic or fused ring bicyclic system which has the characteristics of aromaticity in terms of electron distribution throughout the ring system is included in this definition. It also includes bicyclic groups where at least the ring which is directly attached to the remainder of the molecule has the characteristics of aromaticity. Typically, the ring systems contain 5-12 ring member atoms. Preferably, the monocyclic heteroaryls contain 5-6 ring members, and the bicyclic heteroaryls contain 8-10 ring members.

Aryl and heteroaryl moieties can be substituted with a variety of substituents including C1-C8 alkyl, C2-C8 alkenyl, C2-C8 alkynyl, C5-C12 aryl, C1-C8 acyl, and heteroforms of these, each of which can itself be further substituted; other substituents for aryl and heteroaryl moieties include halogens (F, Cl, Br, I), OR, NR$_2$, SR, SO$_2$R, SO$_2$NR$_2$, NRSO$_2$R, NRCONR$_2$, NRC(O)OR, NRC(O)R, CN, C(O)OR, C(O)NR$_2$, OC(O)R, C(O)R, and NO$_2$, wherein each R is independently H, C1-C8 alkyl, C2-C8 heteroalkyl, C2-C8 alkenyl, C2-C8 heteroalkenyl, C2-C8 alkynyl, C2-C8 heteroalkynyl, C6-C10 aryl, C5-C10 heteroaryl, C7-C12 arylalkyl, or C6-C12 heteroarylalkyl, and each R is optionally substituted as described above for alkyl groups. The substituent groups on an aryl or heteroaryl group may of course be further substituted with the groups described herein as suitable for each type of such substituents or for each component of the substituent. Thus, for example, an arylalkyl substituent may be substituted on the aryl portion with substituents described herein as typical for aryl groups, and it may be further substituted on the alkyl portion with substituents described herein as typical or suitable for alkyl groups.

"Optionally substituted," as used herein, indicates that the particular group being described may have one or more hydrogen substituents replaced by a non-hydrogen substituent. In some optionally substituted groups or moieties, all hydrogen substituents are replaced by a non-hydrogen substituent, e.g., C1-C6 alkyl, C2-C6 heteroalkyl, alkynyl, halogens (F, Cl, Br, I), N$_3$, OR, NR$_2$, SR, SO$_2$R, SO$_2$NR$_2$, NRSO$_2$R, NRCONR$_2$, NRC(O)OR, NRC(O)R, CN, C(O) OR, C(O)NR$_2$, OC(O)R, C(O)R, oxo, and NO$_2$, wherein each R is independently H, C1-C6 alkyl, or C2-C6 heteroalkyl. Where an optional substituent is attached via a double bond, such as a carbonyl oxygen or oxo (=O), the group takes up two available valences, so the total number of substituents that may be included is reduced according to the number of available valences.

In certain embodiments of Formula I, $\pi^1$ is

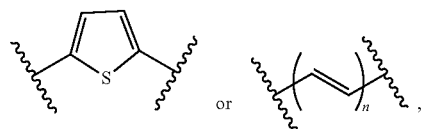

wherein n is 1, 2, or 3. In other embodiments Formula I, $\pi^2$ is

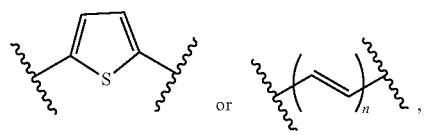

wherein n is 1, 2, or 3.

In some embodiments, the first polarizable compound has a structure represented by formula (II):

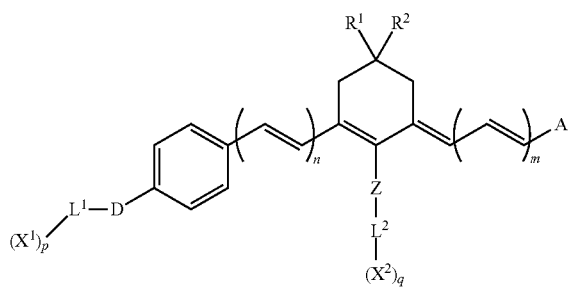

(II)

wherein
D is a π-electron donor group,
A is a π-electron acceptor group,
$R^1$ and $R^2$ are independently H or optionally substituted $C_1$-$C_6$ alkyl,
Z is S or O,
$L^1$ is a linker moiety selected from optionally substituted C1-C20 alkylene, optionally substituted C1-C20 heteroalkylene, optionally substituted C6-C10 aryl, optionally substituted C5-C10 heteroarylene, and combinations thereof,
$L^2$ is a linker moiety selected from optionally substituted C1-C20 alkylene, optionally substituted C1-C20 heteroalkylene, optionally substituted C6-C10 aryl, optionally substituted C5-C10 heteroarylene, and combinations thereof,
$X^1$ is a group crosslinkable by (4+2) cycloaddition,
$X^2$ is a group crosslinkable by (4+2) cycloaddition,
n is 1, 2, or 3,
m is 1, 2, or 3,
p is 1 or 2, and
q is 1 or 2.

In some embodiments of Formula (I) or Formula (II), the group crosslinkable by (4+2) cycloaddition is an anthracenyl group or an acrylate group. In certain embodiments of Formula (I) or Formula (II), p is 2 and q is 2. In some embodiments of Formula (I) or Formula (II), $L^1$-$(X^1)_p$ and $L^2$-$(X^2)_q$ are:

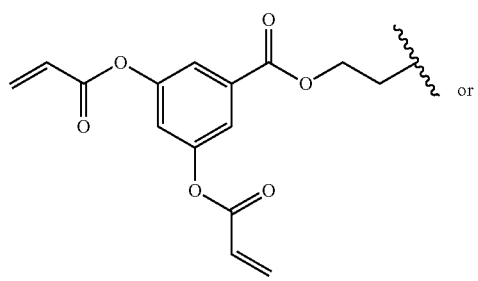 or

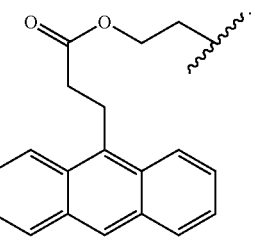

In some embodiments of Formula (I) or Formula (II), Z is S. In some embodiments of Formula (I) or Formula (II), $R^1$ is $CH_3$ and $R^2$ is $CH_3$.

In some embodiments of Formula (I) or Formula (II), D is $NR^3$, wherein $R^3$ is an optionally substituted $C_1$-$C_{10}$ alkyl or $C_1$-$C_{10}$ heteroalkyl. In specific embodiments, D is $NCH_3$.

In some embodiments of Formula (I) or Formula (II), A is

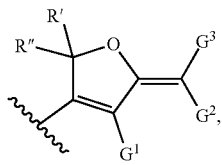

wherein R' and R" are independently selected from optionally substituted C1-C12 alkyl (e.g., fluorinated alkyl) and optionally substituted C6-C10 aryl (e.g., fluorinated aryl), and $G^1$, $G^2$, and $G^3$ are independently selected from electronegative groups that include F, CN, $CF_3$, $SO_2CF_3$. In some embodiments, R' is $CF_3$. In other embodiments, R" is phenyl. In certain embodiments, $G^1$, $G^2$, and $G^3$ are CN.

In some embodiments of Formula (I) or Formula (II), A is

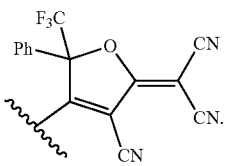 [SMILES: *C1=C(C#N)C(=C(C#N)C#N)OC1(c1ccccc1)C(F)(F)F]

In some embodiments of the films disclosed herein, the first polarizable chromophore is a compound of formula IIA or IIB:

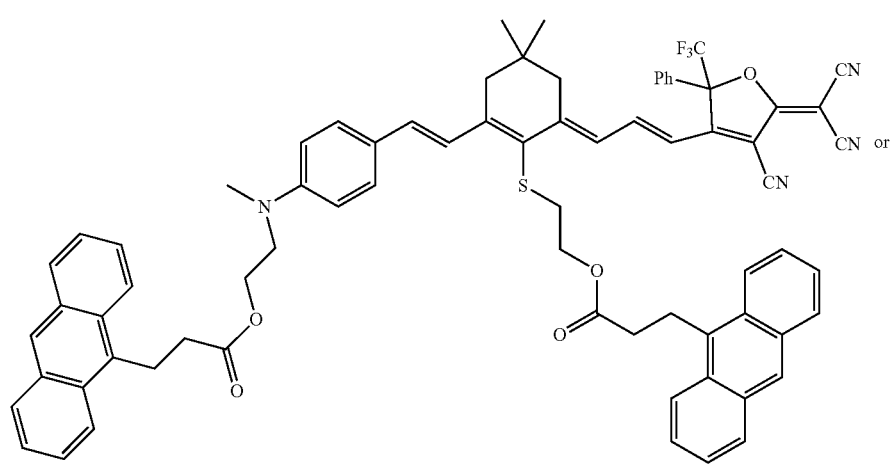
(IIA)
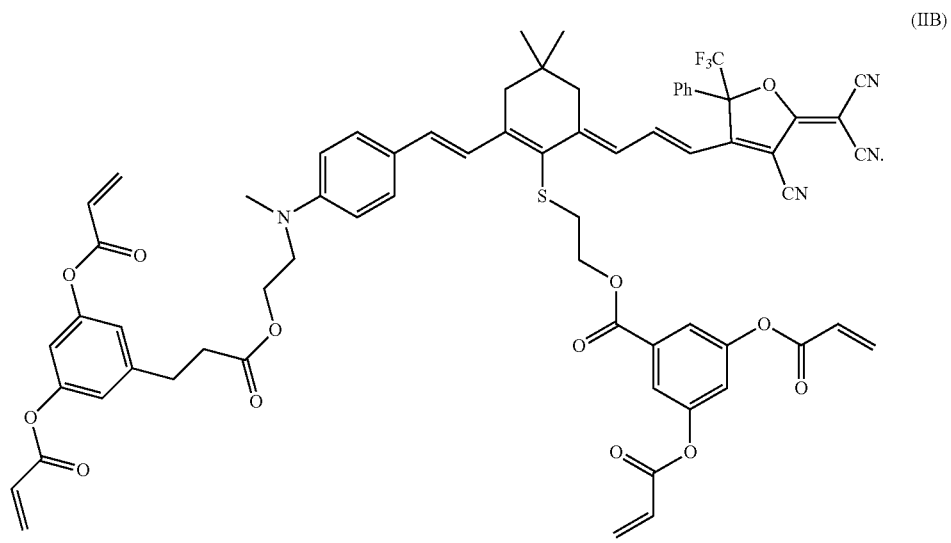
(IIB)
In some embodiments, the first polarizable chromophore is a compound of formula IIA:
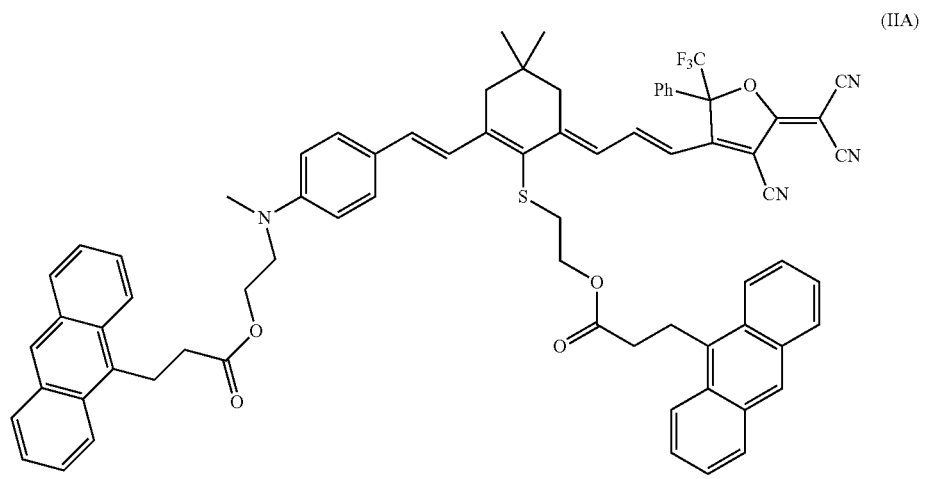 [SMILES: CN(CCOC(=O)CCc1c2ccccc2cc2ccccc12)c1ccc(/C=C/C2=C(SCCOC(=O)CCc3c4ccccc4cc4ccccc34)C(=C/C=C/C3=C(C#N)C(=C(C#N)C#N)OC3(c3ccccc3)C(F)(F)F)/CC(C)(C)C2)cc1]
(IIA)

and the one or more compounds comprising at least two counterpart reactive groups is a compound of Formula (IIB):

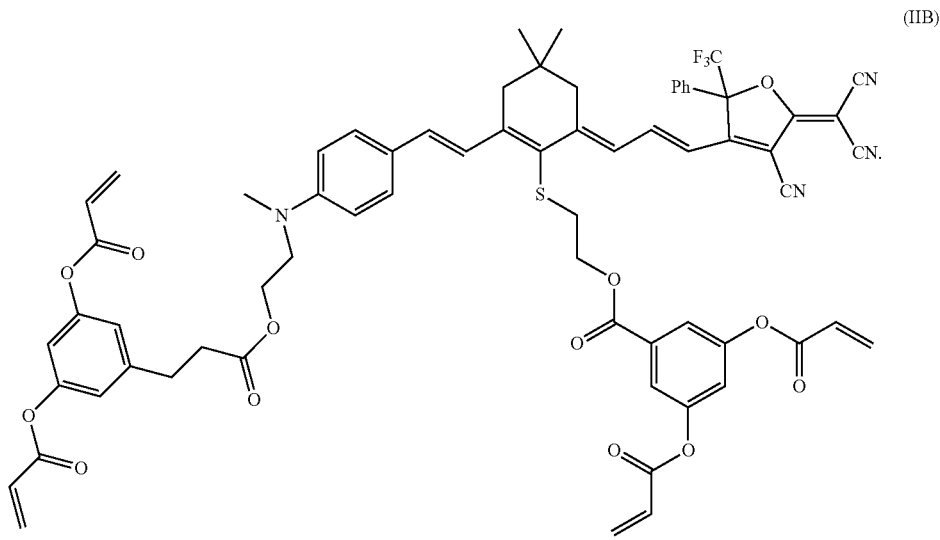 [SMILES: C=CC(=O)Oc1cc(CCC(=O)OCCN(C)c2ccc(/C=C/C3=C(SCCOC(=O)c4cc(OC(=O)C=C)cc(OC(=O)C=C)c4)C(=C/C=C/C4=C(C#N)C(=C(C#N)C#N)OC4(c4ccccc4)C(F)(F)F)/CC(C)(C)C3)cc2)cc(OC(=O)C=C)c1]

In some embodiments, the one or more compounds comprising at least two counterpart reactive groups is a crosslinking agent, a polymer, a second polarizable chromophore, or a combination thereof. FIG. 20 depict some of the exemplary ways the films of the present disclosure can be formed.

In some embodiments, the one or more compounds comprising at least two counterpart reactive groups is a crosslinking agent, e.g., a small molecule crosslinking agent. Various crosslinking agents can be used to form the films disclosed herein. In one embodiment, the crosslinking agent is a compound having the structure depicted by Formula C:

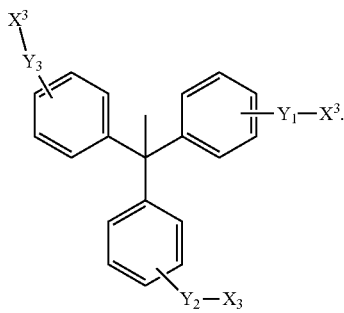

wherein:
$Y^1$, $Y^2$, and $Y^3$ are independently a linker moiety selected from optionally substituted C1-C20 alkylene, option-ally substituted C1-C20 heteroalkylene, optionally substituted C6-C10 aryl, optionally substituted C5-C10 heteroarylene, and combinations thereof, and $X^3$ is a group crosslinkable by (4+2) cycloaddition.

In certain embodiments of Formula X, the compound is:

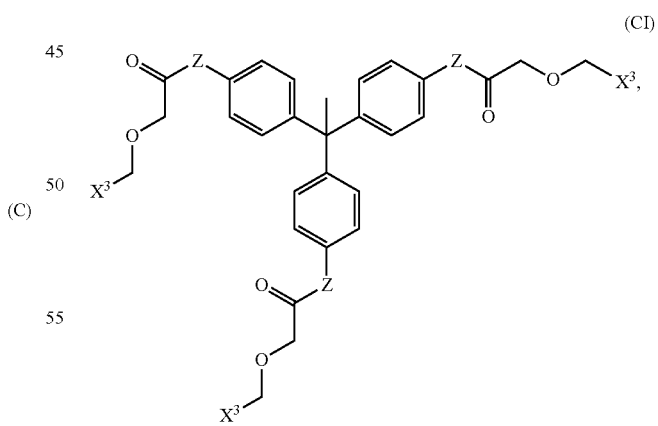

wherein Z is NH or O and $X^3$ is a group crosslinkable by (4+2) cycloaddition such as those described above.

In some embodiments of Formulae C or CI, $X^3$ is anthracenyl.

In certain embodiments, the crosslinking agent is a compound having the formula C1:

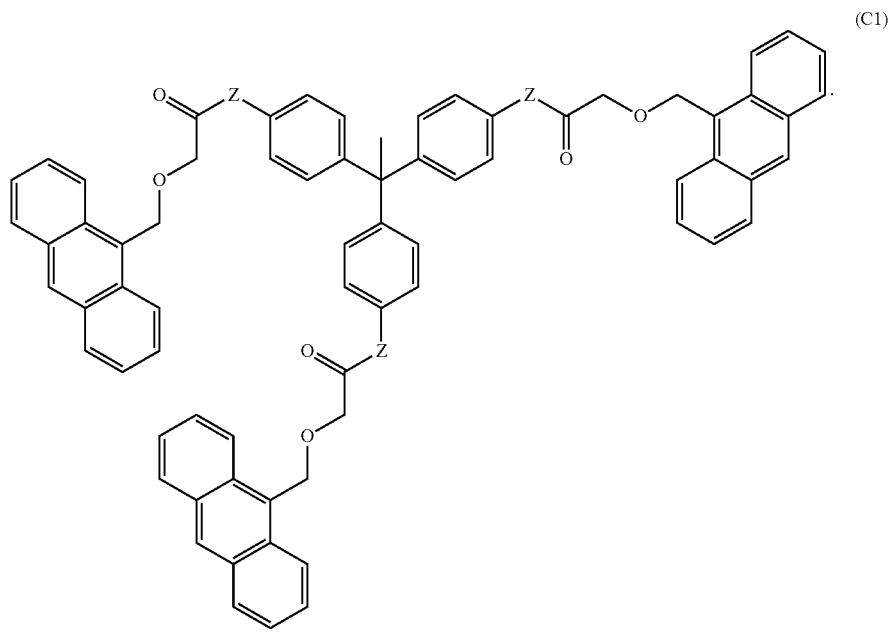

Polymers comprising at least two counterpart reactive groups can be used as the one or more compounds comprising at least two counterpart reactive groups, for example, a polymer with ethylenic backbone comprising side chains comprising counterpart reactive groups.

In some embodiments, the polymer has a structure of Formula P:

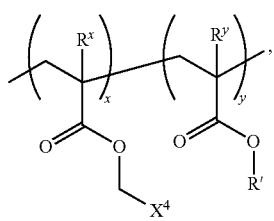

wherein:

x and y are molar proportions of the corresponding monomers;

$X^4$ is a group crosslinkable by (4+2) cycloaddition;

$R^x$ and $R^y$ are H or C1-C3 alkyl; and

R' is H or C1-C5 alkyl.

In some embodiments, the group crosslinkable by (4+2) cycloaddition is anthracenyl.

In certain embodiments, the polymer has the structure of Formula P1:

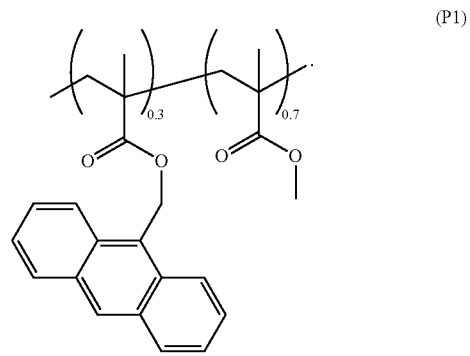

The polymers used in the preparation of the films disclosed herein have a molecular weight from about 1000 g/mol to about 500,000 g/mol. In some embodiments, the polymers have a molecular weight from about 1000 g/mol to about 300,000 g/mol, from about 1000 g/mol to about 200,000 g/mol, from about 1000 g/mol to about 100,000 g/mol, from about 10,000 g/mol to about 500,000 g/mol, from about 10,000 g/mol to about 200,000 g/mol, or from about 10,000 g/mol to about 100,000 g/mol.

In certain embodiments, the films can further comprise a third polarizable chromophore, for example, a third polarizable chromophore non-covalently associated within the film, wherein the third polarizable chromophore does not comprise a (4+2) cycloaddition reactive group.

Additionally, the disclosure provides methods of forming films having electro-optic activity. In one embodiment, provided herein is a method for forming a film having electro-optic activity, comprising:

depositing a composition onto a substrate to provide a film, wherein the composition comprises (a) a first polarizable chromophore comprising at least two first reactive groups crosslinkable by (4+2) cycloaddition and (b) one or more compounds comprising at least two counterpart reactive groups;

applying an aligning force to the film at a temperature sufficient to provide a film having at least a portion of the first polarizable chromophores aligned;

heating the film having at least a portion of the first polarizable chromophores aligned at one or more temperatures sufficient to effect crosslinking between the first polarizable chromophore and the one or more compounds; and reducing the temperature of the film to provide a hardened film having electro-optic activity, wherein the film has an $r_{33}$ of 150 pm/V or greater and a $T_g$ of about 130° C. or greater.

The steps described above can be performed in any particular order, for instance, certain steps can be in a different order than recited above. In some embodiments, the heating to effect crosslinking can be done in several cycles at several different temperatures, for example, the hardened films can be further subjected to one or more heating steps to a temperature higher than the one or more temperatures sufficient to effect crosslinking between the first polarizable chromophore and the one or more compounds. For instance, an exemplary cycle of heating can include crosslinking the film having at least a portion of the first polarizable chromophores aligned at a temperature between about 100° C. and about 150° C. and then heating the resulting film to another temperature between about 110° C. and 200° C., for a period from about 5 minutes to about 2 hours.

In some embodiments, the films having electro-optic activity formed by the methods disclosed herein are films described above, i.e., films that concurrently possess a high electro-optic coefficient ($r_{33}$), high index of refraction, and long-term and high temperature stability of chromophore alignment, as described above.

In certain embodiments, the films formed by the methods disclosed herein have an $r_{33}$ value of from about 150 pm/V to about 450 pm/V, from 200 pm/V to about 450 pm/V, from about 150 pm/V to about 500 pm/V, from about 200 pm/V to about 500 pm/V, from about 250 pm/V and about 500 pm/V. In certain embodiments, the films have an $r_{33}$ value of about 150 pm/V or greater, about 160 pm/V or greater, about 170 pm/V or greater, about 180 pm/V or greater, about 190 pm/V or greater, about 200 pm/V or greater, or about 250 pm/V or greater.

In some embodiments, the films formed by the methods disclosed herein have an index of refraction at 1310 nm of about 1.75 or greater. In other embodiments, the films have an index of refraction at 1310 nm between about 1.75 and about 1.9 or between about 1.75 and about 2.0.

In some embodiments, the films formed by the methods disclosed herein have a poling efficiency of about 2 $nm^2/V^2$ or greater, about 2.5 $nm^2/V^2$ or greater, or about 3 $nm^2/V^2$ or greater. In certain embodiments, the films have a poling efficiency from about 2 $nm^2/V^2$ to about 4 $nm^2/V^2$.

In addition to the above-referenced characteristics, in some embodiments, the films formed by the methods disclosed herein have a high $T_g$. In certain embodiments, the films have a $T_g$ of about 130° C. or greater, about 140° C. or greater, about 150° C. or greater, about 160° C. or greater, about 180° C. or greater, about 190° C. or greater, or about 200° C. or greater.

Any suitable first polarizable chromophores and one or more compounds comprising at least two counterpart reactive groups can be used in the methods disclosed herein, for example, compounds of Formulae (I), (II), (IIA), or (IIB) as described above.

In some embodiments, the one or more compounds comprising at least two counterpart reactive groups used in the methods disclosed herein is a crosslinking agent, a polymer, a second polarizable chromophore, or a combination thereof.

In yet another aspect, the disclosure provides polarizable chromophore compounds comprising crosslinkable groups. The compounds can be used in forming films having high electro-optic activity.

In some embodiments, provided herein is a compound of Formula (I):

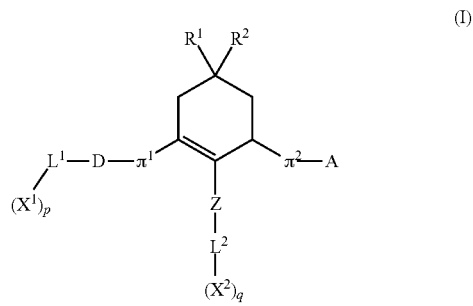

wherein

D is a π-electron donor group;

A is a π-electron acceptor group;

$L^1$ is a linker moiety selected from optionally substituted C1-C20 alkylene, optionally substituted C1-C20 heteroalkylene, optionally substituted C6-C10 aryl, optionally substituted C5-C10 heteroarylene, and combinations thereof;

$L^2$ is a linker moiety selected from optionally substituted C1-C20 alkylene, optionally substituted C1-C20 heteroalkylene, optionally substituted C6-C10 aryl, optionally substituted C5-C10 heteroarylene, and combinations thereof;

$R^1$ and $R^2$ are independently H or optionally substituted $C_1$-$C_6$ alkyl;

Z is S, O, or $CH_2$;

$\pi^1$ and $\pi^2$ are independently a π bridge electronically conjugating the groups attached to it;

$X^1$ is a group crosslinkable by (4+2) cycloaddition;

$X^2$ is a group crosslinkable by (4+2) cycloaddition;

p is 1 or 2, and q is 1 or 2.

In certain embodiments, $\pi^1$ is

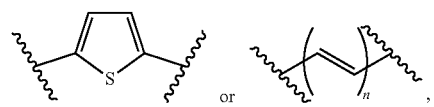

wherein n is 1, 2, or 3. In other embodiments, $\pi^2$ is

wherein n is 1, 2, or 3.

In some embodiments, the polarizable chromophore compound has a structure represented by formula (II):

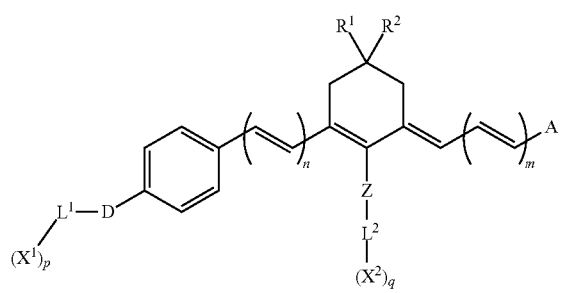

(II)

wherein
D is a π-electron donor group;
A is a π-electron acceptor group;
$R^1$ and $R^2$ are independently H or optionally substituted $C_1$-$C_6$ alkyl;
Z is S or O;
$L^1$ is a linker moiety selected from optionally substituted C1-C20 alkylene, optionally substituted C1-C20 heteroalkylene, optionally substituted C6-C10 aryl, optionally substituted C5-C10 heteroarylene, and combinations thereof;
$L^2$ is a linker moiety selected from optionally substituted C1-C20 alkylene, optionally substituted C1-C20 heteroalkylene, optionally substituted C6-C10 aryl, optionally substituted C5-C10 heteroarylene, and combinations thereof;
$X^1$ is a group crosslinkable by (4+2) cycloaddition;
$X^2$ is a group crosslinkable by (4+2) cycloaddition;
n is 1, 2, or 3;
m is 1, 2, or 3;
p is 1 or 2; and
q is 1 or 2.

In some embodiments of Formula (I) or Formula (II), the group crosslinkable by (4+2) cycloaddition is an anthracenyl group or an acrylate group. In certain embodiments of Formula (I) or Formula (II), p is 2 and q is 2. In some embodiments of Formula (I) or Formula (II), $L^1$-$(X^1)_p$ and $L^2$-$(X^2)_q$ are:

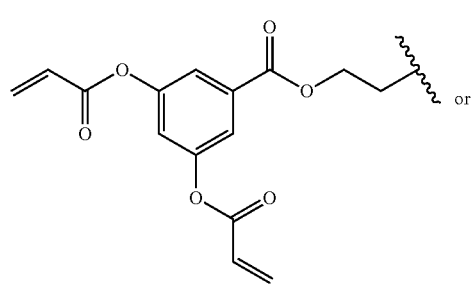 or

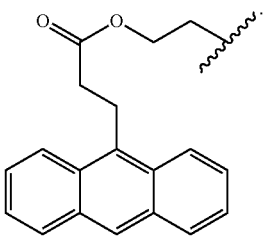

In some embodiments of Formula (I) or Formula (II), Z is S. In some embodiments of Formula (I) or Formula (II), $R^1$ is $CH_3$ and $R^2$ is $CH_3$.

In some embodiments of Formula (I) or Formula (II), D is $NR^3$, wherein $R^3$ is an optionally substituted $C_1$-$C_{10}$ alkyl or $C_1$-$C_{10}$ heteroalkyl. In specific embodiments, D is $NCH_3$.

In some embodiments of Formula (I) or Formula (II), A is

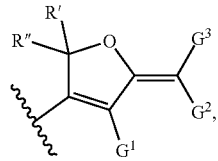

wherein R' and R" are independently selected from optionally substituted C1-C12 alkyl (e.g., fluorinated alkyl) and optionally substituted C6-C10 aryl (e.g., fluorinated aryl), and $G^1$, $G^2$, and $G^3$ are independently selected from electronegative groups that include F, CN, $CF_3$, $SO_2CF_3$. In some embodiments, R' is $CF_3$. In other embodiments, R" is phenyl. In certain embodiments, $G^1$, $G^2$, and $G^3$ are CN.

In some embodiments of Formula (I) or Formula (II), A is

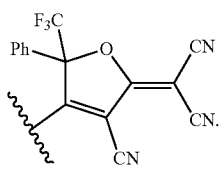 [SMILES: *C1=C(C#N)C(=C(C#N)C#N)OC1(c1ccccc1)C(F)(F)F]

In some embodiments, the polarizable chromophore compound is a compound of formula (IIA) or (IIB):

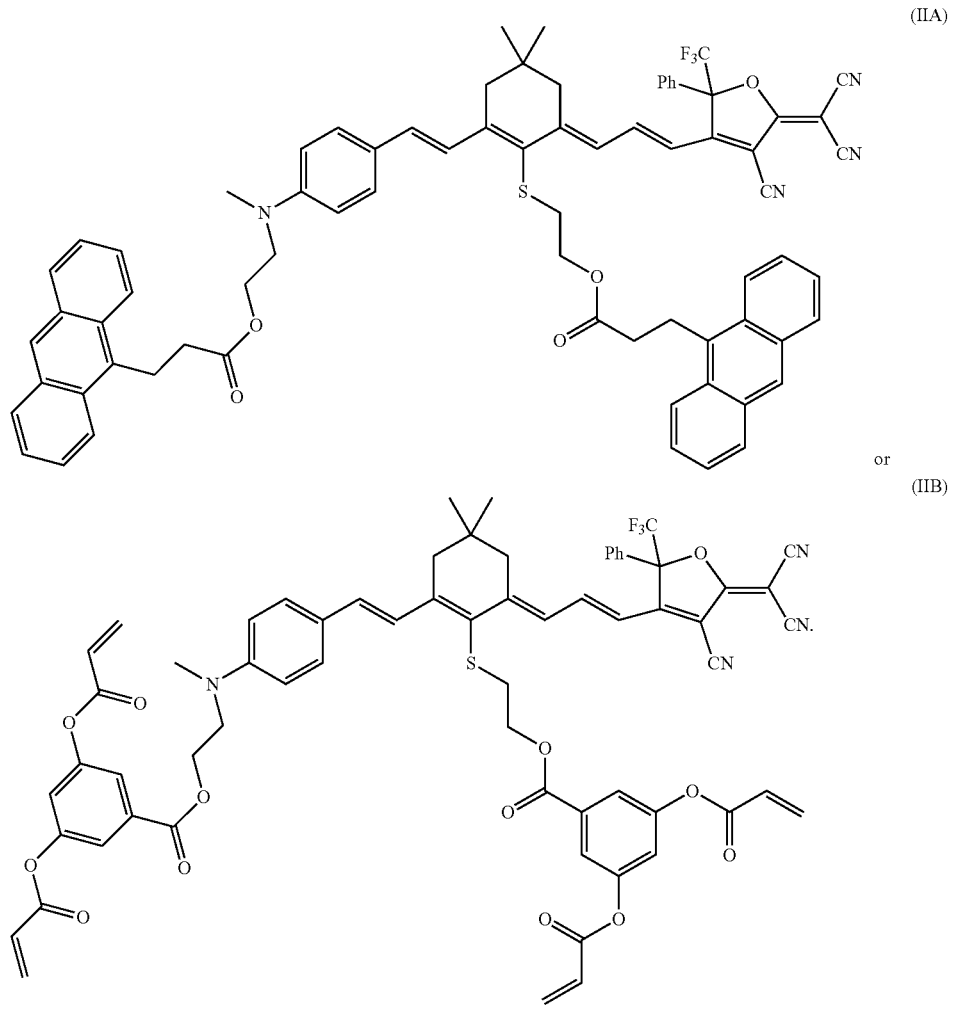

(IIA)

or (IIB)

Compounds of Formulae (I), (II), II(A), and (IIB) can be used in forming films having electro-optic activity, for example, by a method comprising:

depositing first and second crosslinkable compounds onto a substrate to provide a film, wherein the first crosslinkable compound is a compound of any one of Compounds of Formulae (I), (II), II(A), and (IIB), and wherein the second crosslinkable compound is a compound comprising at least two counterpart reactive groups and is selected from the group consisting of a crosslinking agent that does not have a chromophore, a polymer, a polarizable chromophore, and combinations thereof;

applying an aligning force to the film at a temperature sufficient to provide a film having at least a portion of the compounds aligned;

heating the film having at least a portion of the compounds aligned at one or more temperatures sufficient to effect crosslinking between the first and second compounds; and reducing the temperature of the film to provide a hardened film having electro-optic activity.

In yet another aspect, provided herein are electro-optic devices comprising the films disclosed herein or films formed by the methods disclosed herein. Exemplary devices incorporating the films of the disclosure include an electro-optic modulator, antenna, Mach-Zehnder modulator, phase modulator, silicon-organic hybrid modulator, plasmonic-organic hybrid modulator, electrical-to-optical convertor, terahertz detector, frequency shifter, or frequency comb source.

Certain components of optical communications systems can be fabricated, in whole or part, with the films according to the present disclosure. Exemplary components include, without limitation, straight waveguides, bends, single-mode splitters, couplers (including directional couplers, MMI couplers, star couplers), routers, filters (including wavelength filters), switches, modulators (optical and electro-optical, e.g., birefringent modulator, the Mach-Zehnder interferometer, and directional and evanescent coupler), arrays (including long, high-density waveguide arrays), optical interconnects, optochips, single-mode DWDM components, photonic crystal devices, resonant devices (e.g., photonic crystal, ring, or disc resonators, and gratings. The films described herein may be used with, for example, wafer-level processing, as applied in, for example, vertical cavity surface emitting laser (VCSEL) and CMOS technologies.

In many applications, the films described herein can be used in lieu of lithium niobate, gallium arsenide, and other inorganic materials that currently find use as light-transmissive materials in optical communication systems.

As used herein, the term "about" indicates that the subject value can be modified by plus or minus 5% and still fall within the disclosed embodiment.

The following examples are provided for the purpose of illustrating, not limiting, the invention.

EXAMPLES

The development of electro-optic (EO) materials that concurrently possess a high electro-optic coefficient ($r_{33}$), high index of refraction, long-term or high temperature stability of chromophore alignment, has been a crucial and challenging goal for the development of practical hybrid organic electro-optic systems. A crosslinkable, binary non-linear optical chromophore organic glass was developed to solve this problem. The following Examples describe the preparation and characterization of an exemplary neat EO material consists of an anthracene-containing dendritic chromophore HLD1 (a compound of Formula IIA) and an acrylate-containing dendritic chromophore HLD2 (a compound of Formula IIB) which can be electric field poled and then thermally crosslinked in situ to form a stable EO material. This approach does not require blending with EO inactive materials such as polymers or small molecule crosslinkers to form the composite. Avoiding the use of EO inactive materials results in a high chromophore loading ($5.10 \times 10^{20}$ molecules/cm$^3$) for HLD1/HLD2. The high loading also enhances the index of refraction (n=1.89 at 1310 nm). Different ratios of HLD1 and HLD2 were evaluated to optimize poling efficiency and thermal stability of poling-induced order. With 2:1 HLD1/HLD2 (w:w), poling efficiency ($r_{33}/E_p$) of 2.29±0.11 nm$^2$ V$^{-2}$ and maximum $r_{33}$ of 286 pm V$^{-1}$ (1310 nm) were achieved in a crosslinked film. This is one of the highest $r_{33}$ values reported among crosslinkable chromophore systems. The glass transition temperature ($T_g$), after Diels-Alder cycloaddition, had increased to a maximum of 175° C., an increase of over 100° C. compared to the precursors. Thermal stability tests showed that after annealing at 85° C. for over 500 h, greater than 99% of the initial $r_{33}$ value was maintained. This combination of large electro-optic activity, high index of refraction, and high long-term alignment stability is an important breakthrough in EO materials for device applications. HLD1/HLD2 can also be poled without the subsequent crosslinking step, and an even larger poling efficiency of 3.23±0.08 nm$^2$ V$^{-2}$ was achieved (2:1 HLD1:HLD2). An exceptional maximum $r_{33}$ of 456 pm/V was obtained with non-crosslinked 2:1 HLD1:HLD2, which represents a record-high n$^3$r$_{33}$ figure-of-merit of 3079 pm/V (1310 nm).

Materials and Instruments

All chemicals that are commercially available were purchased from Sigma-Aldrich, Acros, Alfa Aesar, or TCI and are used without further purification unless otherwise stated. Tetrahydrofuran (THF), dichloromethane, and toluene solvents were dried by passage through commercial solvent purification system columns (Glass Contour or Pure Process Technology). N,N-dimethylformamide (DMF) was purchased in anhydrous form and stored over molecular sieves (pore size 3 Å). Compound 1 was synthesized according to literature procedure. Polymer P1 was synthesized according to literature procedure. Crosslinker C1 was prepared according to the methods in the literature. TLC analyses were carried out on 0.25 mm thick precoated silica plates and spots were visualized under UV light. Chromatography on silica gel was carried out on Kieselgel (200-300 mesh).

$^1$H NMR spectra were determined on an Avance Bruker (300 or 500 MHz) NMR spectrometer (tetramethylsilane as internal reference). The MS spectra were obtained on MALDI-TOF (Matrix Assisted Laser Desorption/Ionization of Flight) on BIFLEX III (Bruker Inc.,) spectrometer. The UV-Vis spectra were performed on Cary 5000 spectrophotometer. The decomposition temperature ($T_d$) was determined by TGA analysis, performed on a TA5000-2950TGA (TA Instruments) with a heating rate of 10° C. min$^{-1}$ under the protection of nitrogen. Glass transition temperature ($T_g$) was measured by differential scanning calorimetry (DSC) with a heating rate of 10° C. min$^{-1}$ under the protection of nitrogen.

The following Examples explain the design, synthesis, and evaluation of two exemplary crosslinkable, CLD-type (amine donor, tetraene bridge, tricyanofuran acceptor) chromophores denoted as HLD1 and HLD2. The anthracene-containing chromophore HLD1 and acrylate-containing chromophore HLD2 can be crosslinked to each other in a Diels-Alder reaction without any polymer or small molecule crosslinker (FIG. 1). The $T_g$, EO performance, number density, index of refraction, spectroscopic properties, and long-term alignment stability of the poled and crosslinked EO system with different ratios of HLD1:HLD2 are evaluated. In order to show the advantage of the exemplary neat crosslinkable chromophore, a traditional crosslinkable EO system containing crosslinkable polymer P1 or crosslinkable small molecule C1 has been synthesized and evaluated (FIG. 1). Finally, it was shown that even higher EO performance can be achieved by poling without subsequent crosslinking, achieving near-record high $r_{33}$ and n$^3$r$_{33}$, which demonstrates the versatility of the films of the disclosure, e.g., the films comprising the HLD1:HLD2 chromophore system.

Syntheses of Exemplary Chromophores

Figure 3:
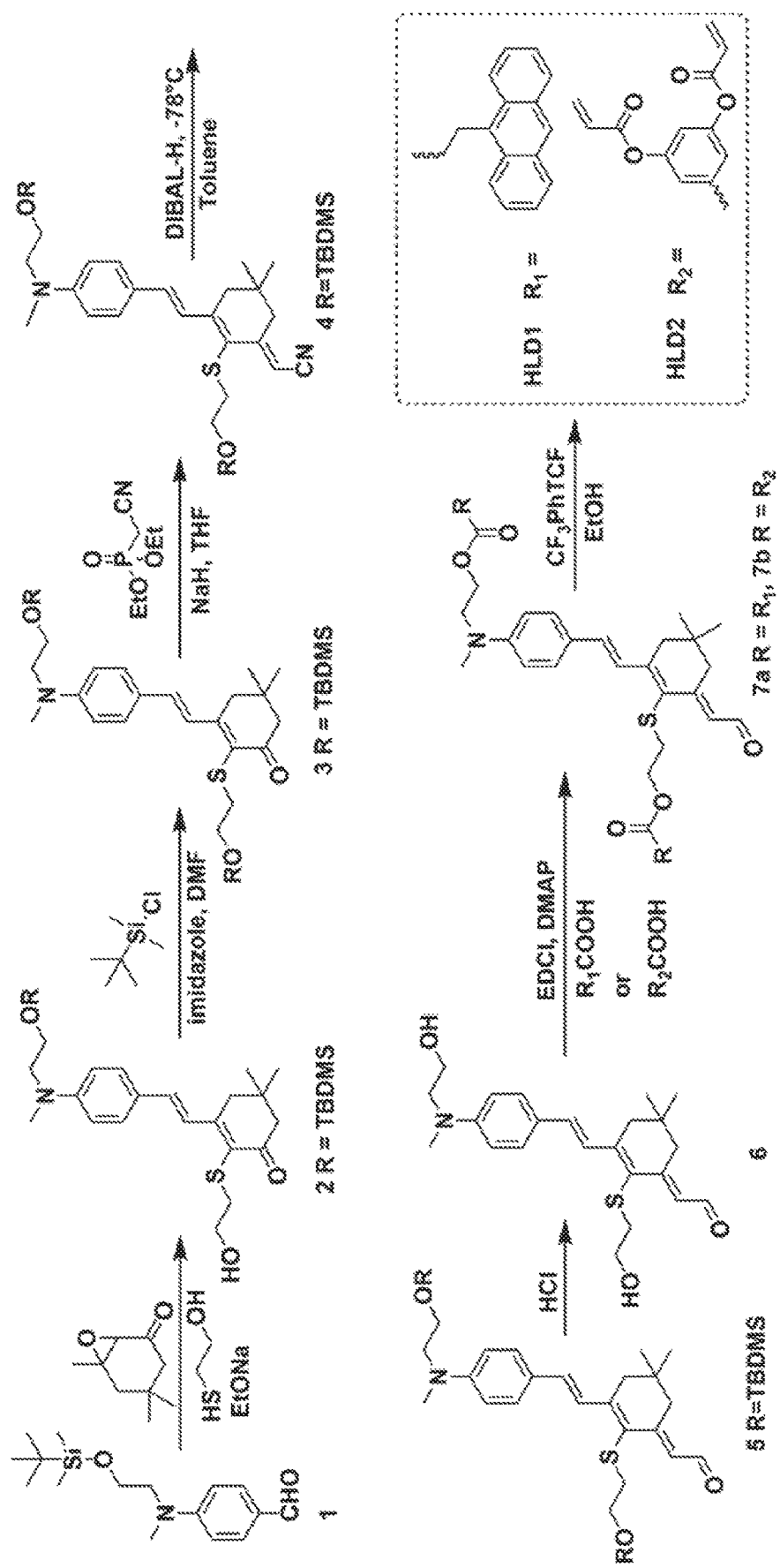
FIG. 3 depicts synthetic routes for exemplary chromophores HLD1 and HLD2.

The synthesis of exemplary compounds HLD1 and HLD2 (compounds of Formula I or Formula II) has been accomplished according to the scheme depicted in FIG. 3.

Synthesis of (E)-3-(4-((2-((tert-butyldimethylsilyl)oxy)ethyl)(methyl)amino)-styryl)-2-((2-hydroxyethyl)thio)-5,5-dimethylcyclohex-2-en-1-one (Compound 2)

Sodium metal (0.46 g, 20.00 mmol) in ethanol (30 mL) were added to a two-necked flask in a nitrogen atmosphere. 1-Butanethiol (1.56 g, 1.47 mL, 20.00 mmol) was added to the above solution after the sodium was completely dissolved. After reacting for 15 min at room temperature, isophoroneoxide (3.08 g, 20.00 mmol) was added. The mixture was stirred at room temperature for another 1 h before compound 1 (5.87 g, 20.00 mmol) was added. After reacting for 18 hours at 65° C., it was concentrated with a rotary evaporator. The crude product was purified by column chromatography using ethyl acetate and hexane (1:10 to 1:6) as the eluent to afford the compound 2 as red oil in 78.9% yield (7.81 g, 15.95 mmol). MS (MALDI) (M$^+$, C$_{27}$H$_{43}$NO$_3$SSi): calcd: 489.79; found: 489.81. $^1$H NMR (300 MHz, CDCl$_3$) δ 7.92 (d, J=16.1 Hz, 1H, CH), 7.46 (d, J=8.6 Hz, 2H, ArH), 7.04 (d, J=16.1 Hz, 1H, CH), 6.68 (d, J=8.7 Hz, 2H, ArH), 3.80-4.02 (m, 4H, NCH$_2$, OCH$_2$), 3.48-3.60 (m, 4H, OCH$_2$, SCH$_2$), 3.04 (s, 3H, NCH$_3$), 2.59 (m, 2H, CH$_2$), 2.45 (m, 2H, CH$_2$), 1.07 (s, 6H, CH$_3$), 0.87 (s, 9H, CH$_3$), 0.01 (s, 6H, CH$_3$). $^{13}$C NMR (126 MHz, CDCl$_3$) δ 197.05, 160.19, 149.93, 138.56, 129.33, 127.09, 126.69, 123.69, 122.42, 111.62, 60.29, 60.13, 54.31, 51.45, 40.94, 38.99, 38.42, 31.96, 28.17, 25.70, 17.97, −5.45.

Synthesis of (E)-3-(4-((2-((tert-butyldimethylsilyl) oxy)ethyl)(methyl)amino)-styryl)-2-((2-((tert-butyldimethylsilyl)oxy)ethyl)thio)-5,5-dimethylcyclohex-2-en-1-one (Compound 3)

Tert-Butyldimethylsilyl chloride (3.68 g, 24 mmol) was slowly added to a solution of compound 2 (4.90 g, 10 mmol) and imidazole (1.66 g, 24 mmol) in 20 ml DMF under nitrogen. After stirring for 3 h at room temperature, it was poured into 100 mL water. The organic phase was extracted by hexane, washed with brine and dried over $MgSO_4$. After removal of the solvent with a rotary evaporator, the crude product was purified by silica chromatography, eluting with ethyl acetate/hexane (1:15 to 1:10) to give compound 3 as a red oil with 93.1% yield (5.49 g, 9.31 mmol). MS (MALDI) ($M^+$, $C_{33}H_{57}NO_3SSi_2$): calcd: 604.05; found: 603.95. $^1$H NMR (300 MHz, $CDCl_3$) δ 7.89 (d, J=16.2 Hz, 1H, CH), 7.44 (d, J=8.6 Hz, 2H, ArH), 6.98 (d, J=16.2 Hz, 1H, CH), 6.66 (d, J=8.7 Hz, 2H, ArH), 3.82-3.67 (m, 6H, $CH_2$), 3.51 (m, 2H, $CH_2$), 2.96-2.78 (m, 3H, $NCH_3$), 2.59 (s, 2H, $CH_2$), 2.39 (s, 2H, $CH_2$), 1.06 (s, 6H,$CH_3$), 0.91-0.77 (m, 18H, $CH_3$), 0.08-0.02 (m, 12H, $CH_3$). $^{13}$C NMR (126 MHz, $CDCl_3$) δ 195.67, 157.70, 150.03, 137.20, 129.20, 128.01, 123.97, 123.37, 111.84, 62.79, 60.12, 54.46, 51.87, 41.18, 39.13, 36.53, 32.14, 30.62, 28.26, 25.77, 18.14, −5.45, −5.63.

Synthesis of (E)-2-(3-((E)-4-((2-((tert-butyldimethylsilyl)oxy)ethyl)(methyl)-amino)styryl)-2-((2-((tert-butyldimethylsilyl)oxy)ethyl)thio)-5,5-dimethylcyclohex-2-en-1-ylidene)acetonitrile (Compound 4)

Under a nitrogen atmosphere, diethyl(cyanomethyl)phosphonate (1.81 mL, 1.99 g, 11.2 mmol) was slowly added to a two-necked flask charged with NaH (0.27 g, 11.2 mmol) in dry 12 mL THF. Compound 3 (1.69 g, 2.80 mmol) in THF (5 mL) was added to the mixture which was directly refluxed for 24 h after the above solution became clear. After the removal of THF with a rotary evaporator, the residue was directly purified by the column chromatography on silica gel eluting with ethyl acetate/hexane (1:15 to 1:10) to afford a red solid 4 in 73.1% yield (1.28 g, 2.04 mmol).

MS (MALDI) ($M^+$, $C_{35}H_{58}N_2O_2SSi_2$): calcd: 627.09; found: 627.13. $^1$H NMR (300 MHz, $CDCl_3$) δ 7.84 (d, J=16.1 Hz, 1H, CH), 7.38 (d, J=8.4 Hz, 2H, ArH), 6.83 (d, J=16.1 Hz, 1H, CH), 6.64 (d, J=8.4 Hz, 2H, ArH), 6.23 (s, 1H, CH), 3.82-3.61 (m, 4H, $CH_2$), 3.48 (m, 2H, $CH_2$), 2.99 (m, 3H, $NCH_3$), 2.67 (m, 2H, $CH_2$), 2.53 (s, 2H, $CH_2$), 2.43 (s, 2H, $CH_2$), 0.99 (s, 6H, $CH_3$), 0.87 (m, 18H, $CH_3$), 0.05-0.02 (m, 12H, $CH_3$). $^{13}$C NMR (126 MHz, $CDCl_3$) δ 158.13, 149.59, 148.68, 134.79, 128.63, 125.94, 124.50, 123.94, 118.84, 111.66, 94.47, 62.11, 60.34, 54.37, 38.86 30.57, 29.88 29.53, 27.84, 25.76, 22.51, 17.99, 14.01, −5.45, −5.61.

Synthesis of (E)-2-(3-((E)-4-((2-((tert-butyldimethylsilyl)oxy)ethyl)(methyl)-amino)styryl)-2-((2-((tert-butyldimethylsilyl)oxy)ethyl)thio)-5,5-dimethylcyclohex-2-en-1-ylidene)acetaldehyde (Compound 5)

A solution of compound 4 (1.25 g, 2.00 mmol) in 20.0 mL of fresh dried toluene was cooled to −78° C. under a nitrogen atmosphere, the solution of Diisobutylaluminum hydride in hexanes (1.5 M, 2.72 mL, 4.00 mmol) was added slowly. The reaction was kept at −78° C. for 2 h, wet silica gel (1.0 g) with 10.0 mL of $H_2O$ was added then. After reacting for 2 hours at 0° C., the organic products was poured into water, extracted with ethyl acetate, and then concentrated with a rotary evaporator. The residue was purified by the column chromatography on silica gel eluting with ethyl acetate/hexane (1:8 to 1:5) to afford a red solid 5 in 70.1% yield (0.88 g, 1.40 mmol). MS (MALDI) ($M^+$, $C_{35}H_{59}NO_3SSi_2$): calcd: 630.09; found: 630.15. $^1$H NMR (300 MHz, $CDCl_3$) δ 10.12 (d, J=6.4 Hz, 1H, CHO), 7.94 (d, J=16.1 Hz, 1H, CH), 7.40 (d, J=6.8 Hz, 2H, ArH), 6.98 (d, J=6.6 Hz, 1H, CH), 6.85 (d, J=16.1 Hz, 1H,CH), 6.65 (d, J=6.8 Hz, 2H, ArH), 3.72 (m, 4H, $CH_2$), 3.49 (m, 2H, $CH_2$), 3.01 (s, 3H, $NCH_3$), 2.70 (s, 2H, $CH_2$), 2.47 (s, 2H, $CH_2$), 2.11 (s, 2H, $CH_2$), 1.01 (s, 6H, $CH_3$), 0.86 (m, 18H, $CH_3$), 0.02 (s, 12H, $CH_3$). $^{13}$C NMR (126 MHz, $CDCl_3$) δ 190.77, 156.09, 149.77, 149.50, 134.66, 128.57, 127.97, 126.58, 124.35, 111.44, 62.08, 60.25, 54.48, 41.36, 39.62, 38.82, 37.39, 30.42, 29.66, 28.04, 25.51, 17.94, −5.49, −5.63.

Synthesis of (E)-2-(3-((E)-4-((2-hydroxyethyl) (methyl)amino)styryl)-2-((2-hydroxyethyl)thio)-5,5-dimethylcyclohex-2-en-1-ylidene)acetaldehyde (Compound 6)

5.60 mL of 1N HCl (5.60 mmol) was added to the solution of compound 5 (0.88 g, 1.40 mmol) in 10 mL of acetone. The solution was stirred at room temperature for 3 h, the solution was neutralized by sodium bicarbonate, and the organic solvent was concentrated with a rotary evaporator. The residue was poured into 20 mL of water and extracted with 100 mL of dichloromethane and then concentrated with a rotary evaporator, dried over Na2SO4 and concentrated. The crude product was purified via a flash chromatography on silica gel with a gradient eluent of dichloromethane/ethyl acetate (10:1 to 5:1) to obtain a red solid compound 6 in 93.1% yield (0.52 g, 1.30 mmol). MS (MALDI) ($M^+$, $C_{23}H_{31}NO_3S$): calcd: 401.56; found: 401.78. $^1$H NMR (300 MHz, $CDCl_3$) δ 10.08 (d, J=8.1 Hz, 1H, CHO), 7.94 (d, J=16.2 Hz, 1H, CH), 7.42 (d, J=8.8 Hz, 2H, ArH), 6.97 (d, J=8.1 Hz, 1H, CH), 6.86 (d, J=16.2 Hz, 1H, CH), 6.72 (d, J=8.8 Hz, 2H, ArH), 3.81 (m, 2H, OH), 3.62 (m, 2H, $NCH_2$), 3.52 (m, 2H, $OCH_2$), 3.02 (s, 3H, $NCH_3$), 2.76 (m, 4H, $SCH_2$, $OCH_2$), 2.49 (m, 2H, $CH_2$), 2.31 (m, 2H, $CH_2$), 1.02 (s, 6H, $CH_3$). $^{13}$C NMR (126 MHz, $CDCl_3$) δ 191.79 157.37, 150.83, 150.17, 135.29, 128.85 127.50, 126.49, 124.92, 124.52, 112.12, 61.06, 59.86, 54.54, 41.95, 39.78, 38.74, 38.02, 29.97, 28.17.

Synthesis of 2-(((E)-2-((E)-4-((2-((3-(anthracen-9-yl)propanoyl)oxy)ethyl)-(methyl)amino)styryl)-4,4-dimethyl-6-(2-oxoethylidene)cyclohex-1-en-1-yl) thio)ethyl 3-(anthracen-9-yl)propanoate (Compound 7a)

Under a nitrogen atmosphere, N,N.dimethylaminopyridine (0.037 g, 0.30 mmol), EDCI (0.58 g, 3.00 mmol), 3-(anthracen-9-yl)propanoic acid (0.75 g, 3.00 mmol) in 20 mL dichloromethane was cooled to 0° C. After the solution became clear, compound 6 (0.4 g, 1.00 mmol) in 10 mL dichloromethane were added. The mixture was stirred for overnight at room temperature after at 0° C. for 2 h. The crude product was then purified by silica gel chromatography eluting with ethyl acetate/hexane (1:5 to 1:3) to afford a red solid 7a in 61.1% yield (0.53 g, 0.61 mmol). MS (MALDI) ($M^+$, $C_{57}H_{55}NO_5S$): calcd: 866.12; found: 866.26. $^1$H NMR (500 MHz, $CDCl_3$) δ 10.10 (d, J=8.0 Hz, 1H, CHO), 8.27 (d, J=10.7 Hz, 2H, ArH), 8.13 (d, J=8.8 Hz, 2H, ArH), 8.09 (d, J=8.7 Hz, 2H, ArH), 7.90 (m, 5H, ArH, CH), 7.45-7.34 (m, 7H, ArH), 7.29 (d, J=8.0 Hz, 2H, ArH), 7.19 (s, 1H, CH), 6.92 (d, J=8.0 Hz, 1H, ArH), 6.76 (d, J=16.1 Hz, 1H, CH), 6.41 (d, J=8.1 Hz, 2H, ArH), 4.12 (t, J=5.4 Hz, 2H, $CH_2$), 4.07 (t, J=6.3 Hz, 2H, $CH_2$), 3.84-3.76 (m, 4H, $CH_2$), 3.34 (t, J=5.2 Hz, 2H, $CH_2$), 2.64-2.56 (m, 3H, $NCH_3$), 2.42 (m, 2H, $CH_2$), 1.18 (m, 4H, $CH_2$), 0.97 (s, 6H, $CH_3$). $^{13}C$ NMR (126 MHz, $CDCl_3$) δ 191.50, 172.79, 172.63, 156.17, 150.96, 149.31, 135.06, 132.22, 132.05, 131.44, 129.33, 129.26, 129.14, 128.76, 126.85, 126.36, 126.23, 125.90, 125.86, 124.97, 124.85, 124.71, 123.83, 123.69, 111.80, 62.92, 61.47, 50.43, 41.57, 39.78, 38.31, 35.00, 33.18, 30.02, 28.26, 23.18, 23.04.

Synthesis of 5-((2-(((E)-2-((E)-4-((2-((3,5-bis(acryloyloxy)benzoyl)oxy)ethyl)-(methyl)amino)styryl)-4,4-dimethyl-6-(2-oxoethylidene)cyclohex-1-en-1-yl)thio)-ethoxy)carbonyl)-1,3-phenylene diacrylate (Compound 7b)

The procedure for compound 7a was followed to prepare 7b from compound 6 as a red solid in 62.3% yield (0.55 g, 0.62 mmol). MS (MALDI) ($M^+$, $C_{49}H_{47}NO_{13}S$): calcd: 889.97; found: 889.73. $^1H$ NMR (300 MHz, $CDCl_3$) δ 10.18-10.11 (m, 1H, CHO), 7.92 (d, J=16.2 Hz, 1H, CH), 7.68 (dd, J=11.0, 1.5 Hz, 4H, ArH), 7.32 (d, J=8.6 Hz, 2H, ArH), 7.02 (m, 1H), 6.90-6.73 (m, 1H, ArH), 6.64 (d, J=7.5 Hz, 4H, ArH), 6.61-6.52 (m, 3H, ArH), 6.29 (m, 4H, CH, ArH), 6.04 (m, 5H, ArH), 4.49 (t, J=5.4 Hz, 2H, $CH_2$), 4.36 (t, J=6.1 Hz, 2H, $CH_2$), 3.75 (t, J=5.6 Hz, 2H, $CH_2$), 3.04 (s, 3H, $CH_3$), 2.93 (t, J=6.3 Hz, 2H, $CH_2$), 2.16 (s, 2H, $CH_2$), 2.04 (s, 2H, $CH_2$), 1.03 (s, 6H, $CH_3$). $^{13}C$ NMR (126 MHz, $CDCl_3$) δ 191.38, 164.67, 164.37, 163.72, 163.70, 156.01, 151.08, 150.82, 150.76, 149.27, 135.28, 133.46, 133.39, 131.99, 131.88, 128.86, 127.26, 127.02, 126.85, 125.12, 124.55, 120.27, 120.24, 120.17 111.94, 63.91, 62.47, 50.55, 41.57, 39.75, 38.65, 33.08, 30.04, 28.50.

Preparation of ethane-1,1,1-triyltris(benzene-4,1-diyl)tris(2-(anthracen-9-ylmethoxy)acetate) (Compound C1)

Under a nitrogen atmosphere, 2-(anthracen-9-ylmethoxy)acetic acid (0.96 g, 3.60 mmol), N,N-dimethylaminopyridine (0.045 g, 0.36 mmol) and EDCI (0.78 g, 4.00 mmol) in 20 mL dichloromethane was cooled to 0° C. Then 4,4',4"-(ethane-1,1,1-triyl)triphenol (0.31 g, 1.00 mmol) in 5 mL dichloromethane were added after the solution became clear. The mixture was stirred for overnight at room temperature after at 0° C. for 2 h. The crude product was then purified by silica gel chromatography eluting with ethyl acetate/hexane (1:5 to 1:3) to afford a pale yellow solid C1 in 71.1% yield (0.74 g, 0.71 mmol). MS (MALDI) ($M^+$, $C_{71}H_{54}O_9$): calcd: 1051.20; found: 1051.32. $^1H$ NMR (300 MHz, $CDCl_3$) δ 8.50 (s, 3H, ArH), 8.47 (d, J=5.4 Hz, 6H, ArH), 7.99 (d, J=8.4 Hz, 6H, ArH), 7.61-7.50 (m, 6H, ArH), 7.50-7.38 (m, 6H, ArH), 7.14 (d, J=8.7 Hz, 6H, ArH), 7.05 (d, J=8.7 Hz, 6H, ArH), 5.72 (s, 6H, $CH_2$), 4.43 (s, 6H, $CH_2$), 2.18 (s, 3H, $CH_3$). $^{13}C$ NMR (126 MHz, $CDCl_3$) δ 169.44, 148.41, 146.23, 131.40, 131.33, 129.80, 129.04, 128.94, 127.27, 126.57, 125.06, 124.20, 120.85, 66.94, 65.34, 51.71, 14.18.

Synthesis of 2-(((E)-2-((E)-4-((2-((3-(anthracen-9-yl)propanoyl)oxy)ethyl)-(methyl)-amino)styryl)-6-((E)-3-(4-cyano-5-(dicyanomethylene)-2-phenyl-2-(trifluoromethyl)-2,5-dihydrofuran-3-yl)allylidene)-4,4-dimethylcyclohex-1-en-1-yl)-thio)ethyl 3-(anthracen-9-yl)propanoate (Chromophore HLD1)

Compound 7a (0.35 g, 0.40 mmol) and acceptor $CF_3PhTCF$ (0.15 g, 0.48 mmol) were mixed with anhydrous ethanol (5 mL). The mixture was allowed to stir at 65° C. for 2 h. The solvent was removed under vacuum and the residual mixture was purified by flash chromatography on silica gel eluting with ethyl acetate/hexane (1:6 to 1:4) to give chromophore HLD1 as a deep green solid in 71.2% yield (0.34 g, 0.29 mmol). HRMS (ESI) ($M^+$, $C_{73}H_{61}F_3N_4O_5S$): calcd: 1163.4393; found: 1163.4368. $^1H$ NMR (500 MHz, Acetone) δ 8.43 (d, J=3.1 Hz, 2H), 8.26 (d, J=8.6 Hz, 2H), 8.20 (d, J=8.6 Hz, 2H), 8.04 (m, 5H), 7.99 (d, J=15.9 Hz, 1H), 7.73 (d, J=7.6 Hz, 2H), 7.63-7.56 (m, 4H), 7.54-7.43 (m, 9H), 7.35 (s, 1H), 7.14 (d, J=15.9 Hz, 1H), 6.82 (d, J=14.6 Hz, 1H), 6.60 (d, J=7.6 Hz, 2H), 4.23 (t, J=5.6 Hz, 2H), 4.09 (t, J=6.2 Hz, 2H), 3.92-3.86 (m, 2H), 3.83-3.78 (m, 2H), 3.55 (t, J=5.6 Hz, 2H), 2.88 (s, 3H), 2.76 (t, J=6.2 Hz, 2H), 2.72-2.67 (m, 2H), 2.62-2.54 (m, 4H), 2.35 (dd, 2H), 1.00 (s, 3H), 0.88 (s, 3H). $^{13}C$ NMR (126 MHz, $CDCl_3$) δ 175.52, 172.81, 172.53, 162.76, 157.03, 154.37, 149.98, 147.15, 138.05, 132.08, 132.03, 131.49, 131.30, 129.81, 129.62, 129.37, 129.32, 129.28, 129.09, 128.24 126.67, 126.43, 126.38, 125.94, 124.92, 124.89, 124.72, 123.74, 117.19, 111.93, 111.40, 111.12, 110.64, 62.78, 61.42, 58.38, 50.44, 41.71 41.09, 38.36, 35.10, 33.92, 30.94, 30.38, 28.53, 27.83, 23.20 23.07.

Synthesis of 5-((2-(((E)-2-((E)-4-((2-((3,5-bis(acryloyloxy)benzoyl)oxy)-ethyl)-(methyl)amino)styryl)-6-((E)-3-(4-cyano-5-(dicyanomethylene)-2-phenyl-2-(trifluoromethyl)-2,5-dihydrofuran-3-yl) allylidene)-4,4-dimethylcyclohex-1-en-1-yl)thio) ethoxy)carbonyl)-1,3-phenylene diacrylate (Chromophore HLD2)

The procedure for compound Chromophore HLD1 was followed to prepare Chromophore HLD2 from compound 7b as a deep green solid in 70.1% yield (0.33 g, 0.28 mmol). HRMS (ESI) ($M^+$, $C_{65}H_{53}F_3N_4O_{13}S$): calcd: 1187.3360; found: 1187.3362. $^1H$ NMR (500 MHz, Acetone) δ 8.06 (d, J=16.0 Hz, 1H), 8.00-7.92 (m, 1H), 7.78 (d, J=7.6 Hz, 2H), 7.67 (m, 7H), 7.62 (d, J=12.4 Hz, 1H), 7.44 (t, J=2.2 Hz, 1H), 7.42-7.36 (m, 3H), 7.13 (d, J=16.0 Hz, 1H), 6.78 (t, 3H), 6.64-6.58 (m, 4H), 6.40 (m, 4H), 6.18-6.14 (m, 4H), 4.58 (t, J=5.6 Hz, 2H), 4.42 (t, J=5.8 Hz, 2H), 3.93 (t, J=5.6 Hz, 2H), 3.15 (s, 3H), 3.08 (t, J=5.8 Hz, 2H), 2.61 (d, J=6.0 Hz, 2H), 2.35 (dd, 2H), 1.03 (s, 3H), 0.91 (s, 3H). $^{13}C$ NMR (126 MHz, $CDCl_3$) δ 175.61, 164.72, 164.35, 163.74, 162.79, 157.03, 154.34, 150.87, 150.84, 150.02 147.21, 138.10, 133.56, 133.51, 131.81, 131.32, 129.90, 129.73, 129.63, 128.95, 128.18, 127.27, 127.22, 126.76, 125.05, 124.57, 120.30, 120.23, 117.24, 112.05, 111.16, 110.71, 110.65, 63.66, 62.39, 58.13, 50.64, 41.69, 41.04, 38.91, 33.90, 30.92, 30.37, 28.56, 27.78.

Exemplary Device Fabrication and Testing

To study poling and EO properties of these cross-linkable dendrimers, solutions of individual chromophore HLD1, HLD2, HLD1/HLD2 with different weight ratios (1:1 and 2:1), HLD2/C1 (1:1) and HLD2/P1(1:3) were filtered through a 0.2 μm syringe filter and the EO material was spin cast onto ITO-coated glass, and then vacuum dried to remove solvent, followed by gold sputter coating. Some devices also used a benzocyclobutene charge injection barrier layer between the ITO and the EO material using a previously described technique. In general, for electro-optic thin films without crosslinking, the electric field poling is conducted by applying an electric field at room temperature, heating the sample to its $T_g$ and holding at that temperature for a few minutes until molecular orientation is complete, cooling to room temperature, and then removing the electric field. During poling, current, voltage, temperature, and relative $r_{33}$ were measured real-time, which allowed to fine-tune and optimize the poling and crosslinking conditions.

As for the crosslinked film, to avoid cracking, a step-poling technique adapted from a previous chromophore crosslinking procedure was developed. For example: Vacuum dry film 2:1 HLD1:HLD2 at 65° C. for 6 hr, then apply 18V/μm, heat to 101° C., increase to desired E-field (30-100 V/μm) and hold at 101° C. for 5 min, 110° C. for 5 min, 120° C. for 5 min, 130° C. for 5 min, 140° C. for 5 min, 150° C. for 10 min and 160° C. for 10 min and then the sample was cooled to room temperature under loading voltage. The poling conditions for un-crosslinked 2:1 HLD1:HLD2: Vacuum dry 2:1 EO at 65° C. for 6 hr, Pole at 104° C. for 5-10 min.

Results and Discussion

Design and Synthesis of Chromophores

Figure 2:
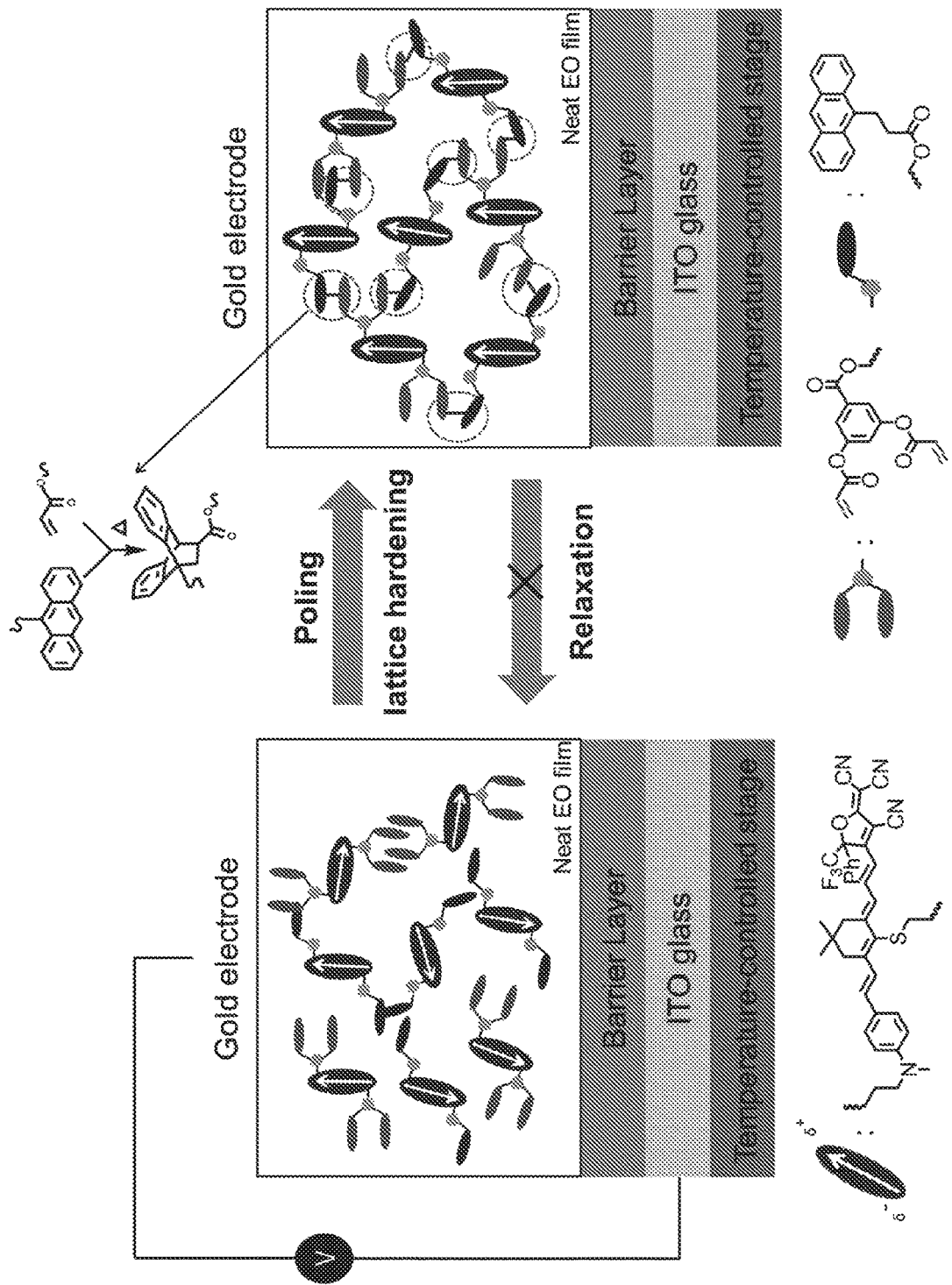
FIG. 2 is an artist's concept of poling and Diels-Alder crosslinking of exemplary crosslinkable electro-optic (EO) chromophores HLD1 and HLD2.

The HLD binary chromophore material is designed to be both the EO-active component and a crosslinker. In some instances, no additional, e.g., polymer crosslinker, is needed, which is advantageous as it allows maintaining a high chromophore loading, and $r_{33}$ is roughly proportional to chromophore concentration. The EO molecules in this disclosure are based on a high hyperpolarizability (β) donor-bridge-acceptor thiolated YLD124 analog with a reported hyperpolarizability at 1907 nm of $10200 \times 10^{-30}$ esu as determined by hyper-Rayleigh scattering. Crosslinking units are attached to both the donor and bridge of the chromophore for a total of two or four crosslinkers per molecule, sufficient to generate a 3-D crosslinked network. HLD1 contains one of the components of the DA reaction (the "diene") and HLD2 contains the other component (the "dieneophile"). The attachment points and tethers are carefully designed to provide site isolation to reduce aggregation and anti-parallel dipolar coupling in these high dipole moment molecules. The expectation is that the $T_g$ (poling temperature) will be ≲ 110° C., and the crosslinking process, though it occurs over a broad range, will be rapid ≳110° C. (FIG. 2). This will allow for efficient poling before crosslinking reaches a high level. The composition of the neat, crosslinkable EO formulation is all active EO materials called "chromophoric crosslinkers," as compared to traditional "passive crosslinkers" with no active EO components, such as P1 and C1 (FIG. 1). C1 is a trifunctional small molecule crosslinker and P1 is a multifunctional polymeric crosslinker. C1 and P1 have anthracene units that can crosslink with the acrylate units of HLD2. Blend ratios reported in this disclosure are weight ratios, but because the molecular weights of HLD1 and HLD2 are similar (1163.4 g/mol and 1187.2 g/mol, respectively), weight ratios of HLD1:HLD2 are approximately equal to molar ratios.

The synthesis of chromophores HLD1 and HLD2 is depicted in FIG. 3. HLD1 and HLD2 were synthesized in good overall yields through seven reaction steps. The synthesis is streamlined by using a common late-stage intermediate, compound 6, which enables a divergent synthesis of both HLD chromophores. First, in the presence of sodium ethoxide base, 2-mercaptoethanol can be easily deprotonated to form a nucleophilic thiolate which underwent ring-opening addition to epoxyisophorone to selectively generate 2-mercaptoethanol-substituted isophorone after water elimination. This intermediate can be reacted directly with compound 1 in one-pot via the Knoevenagel condensation to furnish compound 2 with a high two-step yield. The hydroxyl group of compound 2 was protected with a tert-butyldimethylsilyl (TBDMS) group to afford compound 3. By using the Wittig-Homer reaction, compound 3 was reacted with diethyl(cyanomethyl)phosphonate and sodium hydride base to produce trienenitrile 4. The reduction with DIBAL-H followed by hydrolysis converted the nitrile group on 4 into the corresponding aldehyde 5. Following hydrolysis of the TBDMS protecting groups, the product 6 was split into two batches, and the crosslinking units $R_1$ or $R_2$ were attached by Steglich esterification using 1-(3-dimethylaminopropyl)-3-ethylcarbodiimide hydrochloride and 4-dimethylaminopyridine to generate 7a or 7b. The initial plan was to attach the anthracene unit through a shorter tether using 9-anthracenecarboxylic acid, but this reagent was too bulky to attach by esterification, so 3-(9-anthracenyl)propionic acid ($R_1CO_2H$) was used instead, giving a tether that is two carbons longer. In the final step, $CF_3PhTCF$ acceptor was attached to 7 producing HLD1 and HLD2 as green solids that were soluble in common organic solvents such as dichloromethane, chloroform, toluene, acetonitrile, and acetone. All of the chromophores and new intermediates were fully characterized by $^1$H-NMR, $^{13}$C-NMR and HRMS.

UV-Vis Absorption and Optical Constants

Figure 5A:
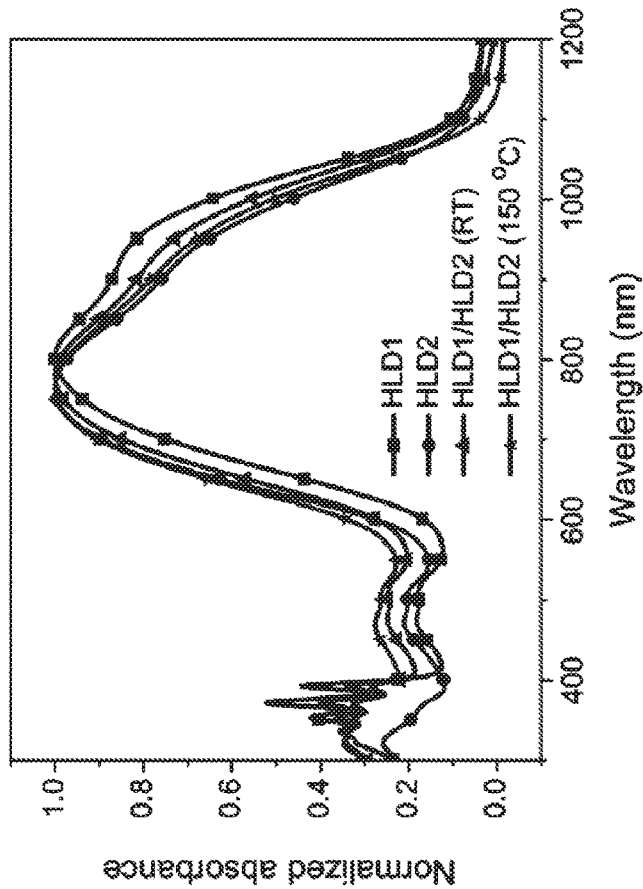
FIGS. 5A and 5B show UV-visible absorption spectra of HLD1, HLD2, 2:1 HLD1:HLD2, 1:1 HLD2:C1, and 1:3 HLD2:P1 in exemplary films before or after crosslinking at 150° C. for 30 min, respectively.
Figure 5B:
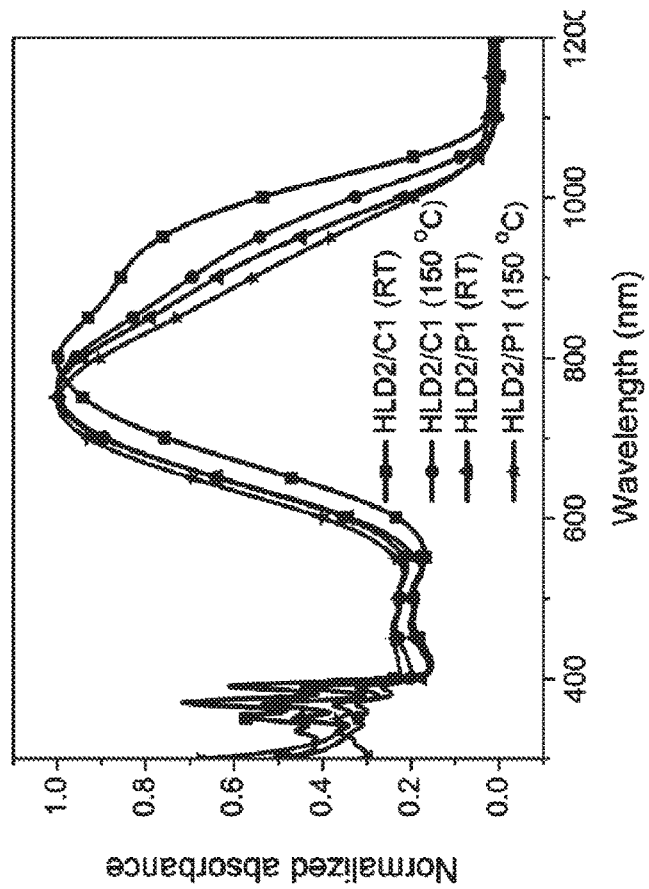
Figure 6A:
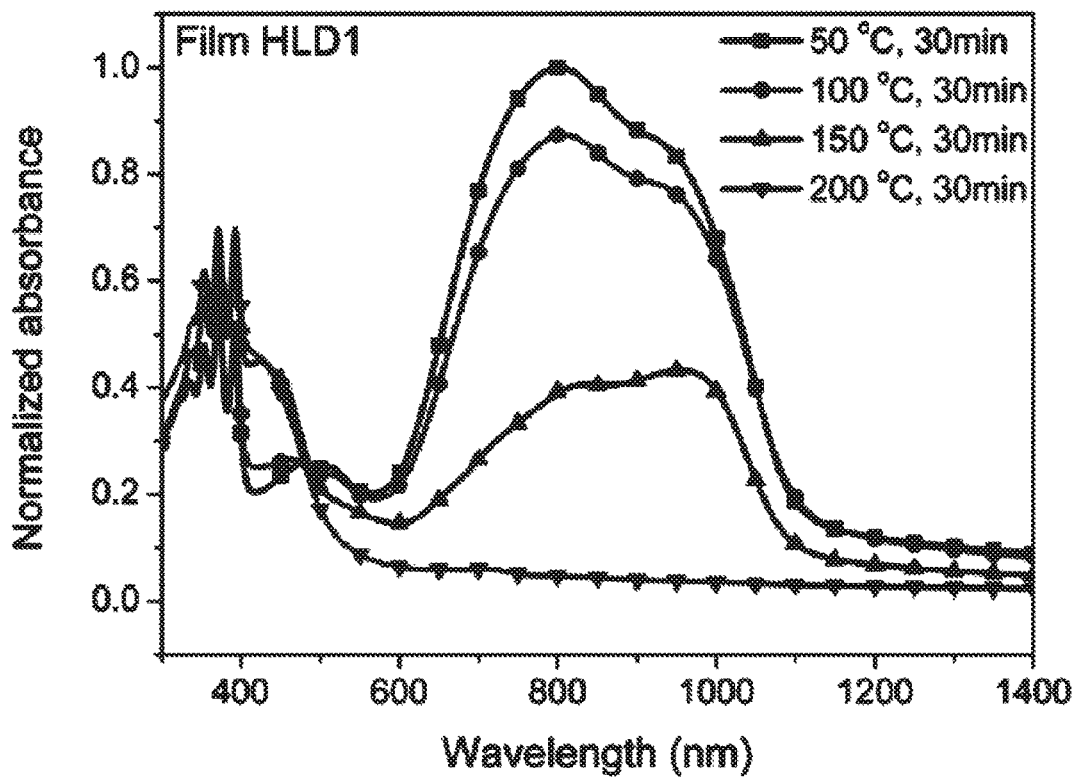
FIGS. 6A-C are UV-vis-NIR absorption spectra of exemplary thin films HLD1 (6A), HLD2 (6B), and 2:1 HLD1:HLD2 (6C) upon thermal curing.
Figure 6B:
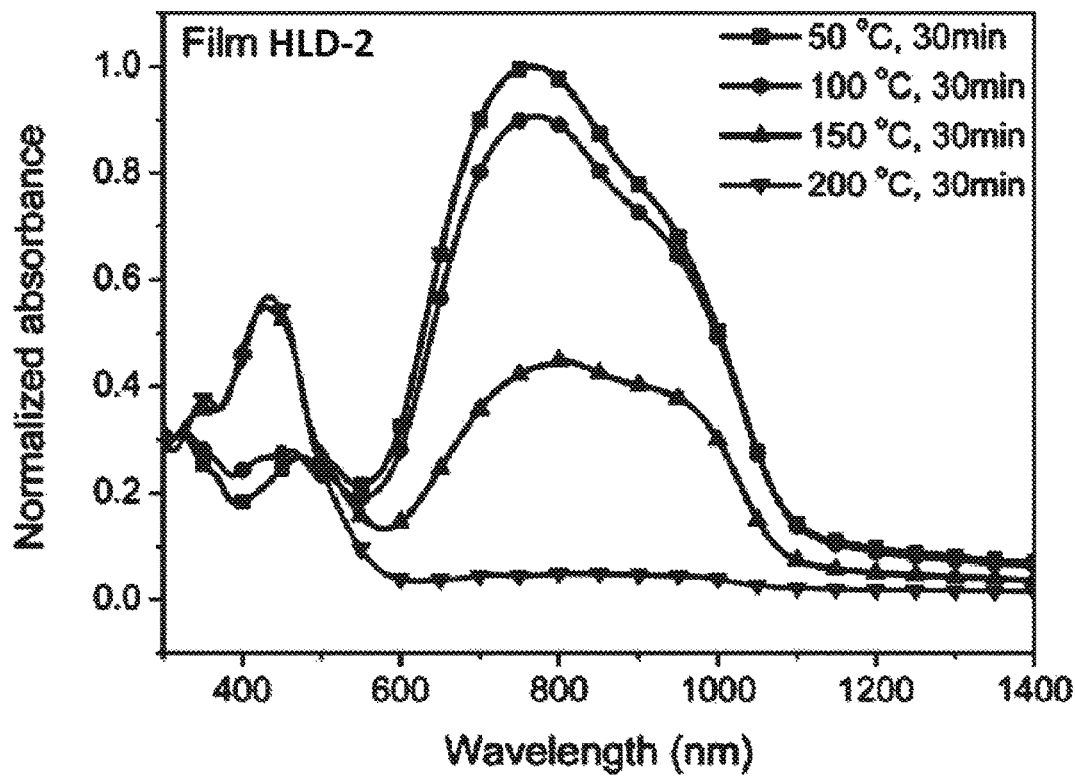
Figure 6C:
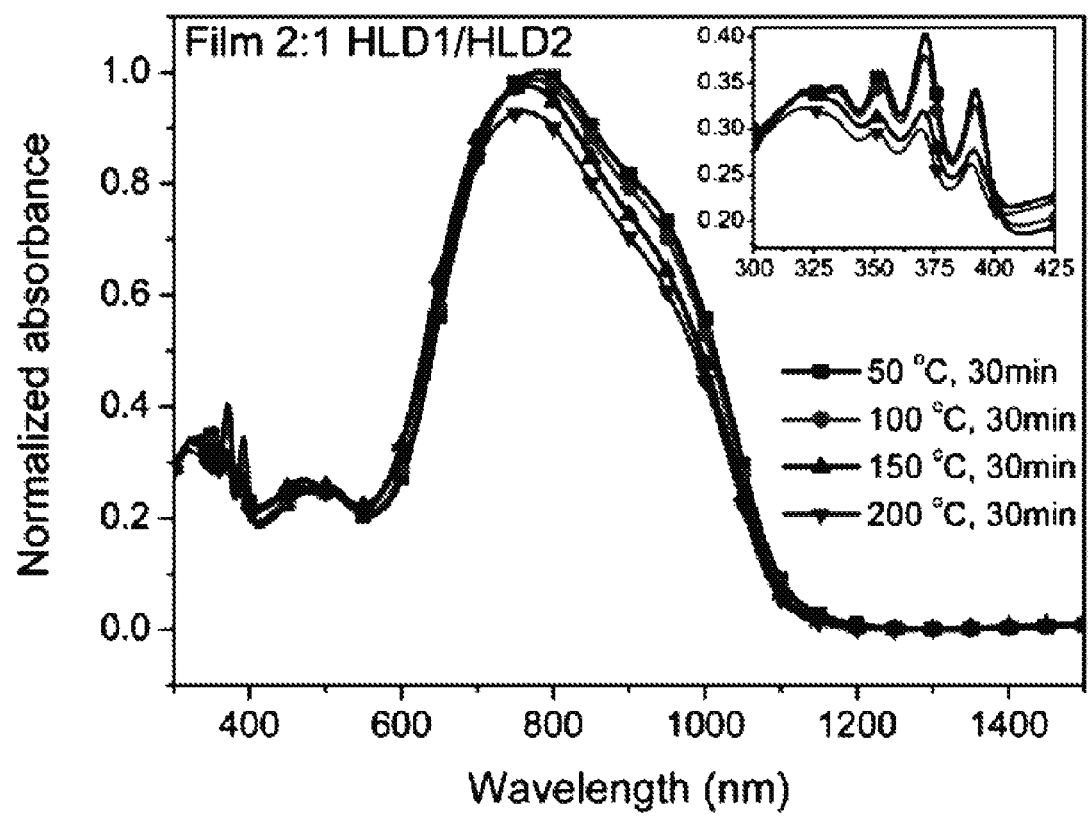

UV-Vis absorption spectra of the two chromophores were measured in a series of solvents with different dielectric constants and in thin films and compared with YLD124—a well-studied chromophore that is nearly identical except for the side chain functionalizations (FIGS. 4 and 5 and Table 1). The absorption maxima ($\lambda_{max}$) of HLD1 and HLD2 are located at 745 nm and 742 nm, respectively, in chloroform. The absorbance was slightly blue-shifted relative to YLD124 in chloroform (786 nm), which suggests that HLD1 and HLD2 may have slightly lower hyperpolarizabilities; this possibility was examined by DFT calculations discussed later in this disclosure. Thin films of chromophores and blends with passive crosslinkers were prepared by spin casting, producing high optical quality films. The thin film $\lambda_{max}$ values ranged from 757-799 nm for HLD1, HLD2, 2:1 HLD1:HLD2, 1:1 HLD2:C1, and 1:3 HLD2:P1 (ratios by weight). The variability is presumably due to differences in aggregation, local conformations, and local dielectric environments. The main absorbance band for all of the samples had long wavelength shoulders, as do films of YLD124 and other similar chromophores, which have been attributed to the formation of aggregates. The film of 2:1 HLD1/HLD2 showed absorption maxima at 782 nm. By baking at 150° C. under vacuum for 30 min to induce crosslinking (crosslinking confirmed by differential scanning calorimetry), the $\lambda_{max}$ blue-shifted to 761 nm. By comparison, the $\lambda_{max}$ for 1:1 HLD2/C1 blue-shifted 34 nm to 761 nm after the thermal curing, and 1:3 HLD2/P1 blue-shifted 17 nm to 740 nm. (FIG. 5). The absorption spectra of thin films after isothermal heating were measured at different temperatures to compare the high temperature stabilities of HLD1, HLD2 and 2:1 HLD1:HLD2. As shown in FIG. 6, the thin film of 2:1 HLD1:HLD2 showed <10% of decrease in absorbance after being cured at 200° C. for 30 min as opposed to ~90% of absorbance decrease when HLD1 or HLD2 was cured using the same procedure. This indicates that the DA lattice hardening can greatly improve the thermochemical stability of the film material. Upon curing, the intensity of typical anthracenyl absorption bands located at around 350, 370, and 390 nm also decreased considerably, suggesting good efficiency of DA crosslinking: for example, for 2:1 HLD1:HLD2, it is estimated that 73% of the anthracenyl units crosslink upon heating to 50° C., 100° C., 150° C., and 200° C. for 30 min each (FIG. 6, inset).

TABLE 1

Thermodynamic and UV-Vis data

| Chromophore | $\lambda_{max}$ in CHCl$_3$ (nm) | Film $\lambda_{max}$ (nm) | Film $\lambda_{max}$ after crosslinking (nm) | $T_d{}^a$ (° C.) |
|---|---|---|---|---|
| HLD1 | 745 | 799 | — | 231 |
| HLD2 | 742 | 766 | — | 317 |
| 2:1 HLD1:HLD2 | — | 782 | 761 | — |
| 1:1 HLD2:C1 | — | 795 | 761 | — |
| 1:3 HLD2:P1 | — | 757 | 740 | — |

$^a$Decomposition temperature measured by TGA.

Figures 7A, 7B:
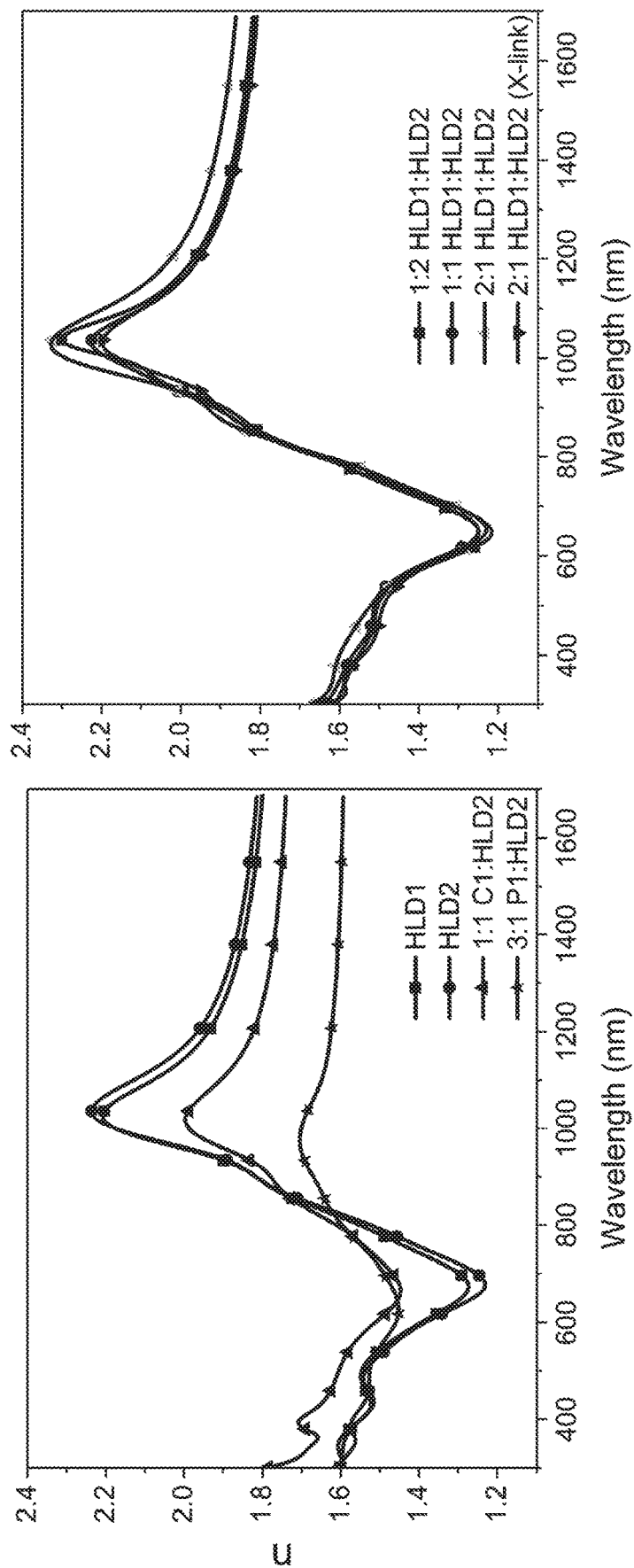
FIGS. 7A and 7B show index of refraction (n) of HLD1, HLD2, C1, P1 and their blends.
Figure 8B:
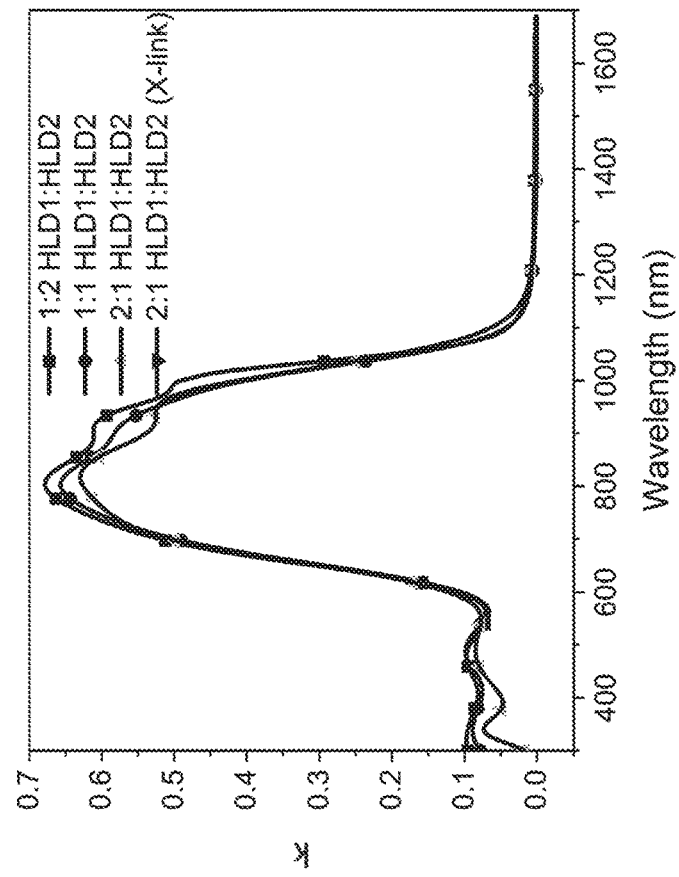
FIGS. 8A and 8B show Extinction Absorption coefficient (k) of HLD1, HLD2, C1, P1 and their blends.
Figure 8A:
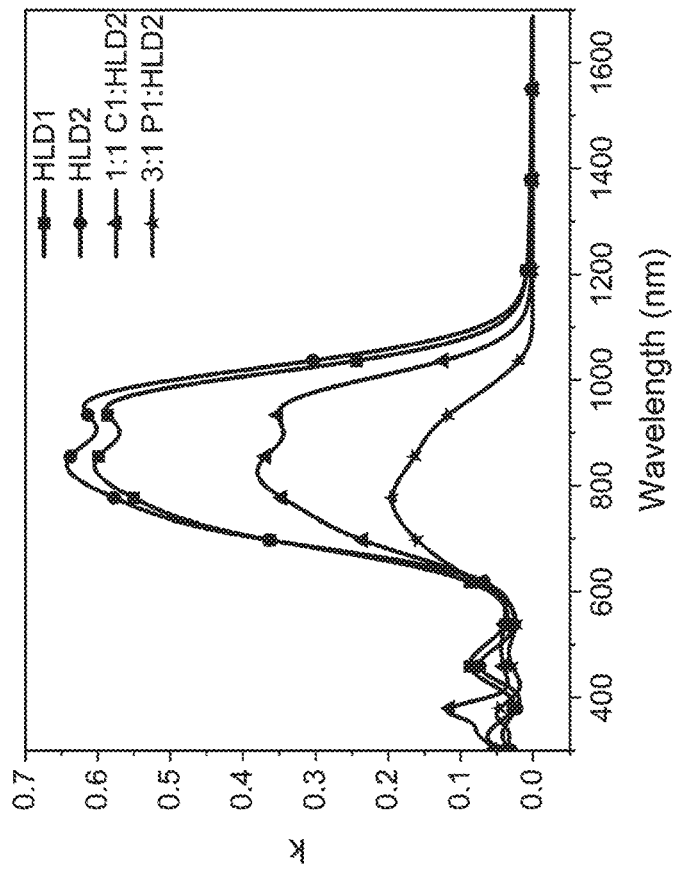

The real index of refraction (n) of unpoled chromophore films was measured using variable angle spectroscopic ellipsometry (VASE) and are shown in FIG. 7 and summarized in Table 2. The n value at the most important two telecommunications bands, 1310 nm and 1550 nm, are reported in Table 3. $n_{1310}$ ranges from 1.95-1.88, and $n_{1550}$ ranges from 1.88-1.82 for the chromophores HLD1, HLD2 and their blends. EO blends with passive crosslinkers (1:1 HLD2:C1 and 1:3 HLD2:P1) had lower n values of 1.79-1.75 and 1.61-1.60, respectively. The higher index of HLD1/HLD2 is due to the higher $\rho_N$ of ~5.1×10$^{20}$ molecules cm$^{-3}$, compared with $\rho_N$~2.5×10$^{20}$ molecules cm$^{-3}$ for 1:1 HLD2:C1 and $\rho_N$~1.3×10$^{20}$ molecules cm$^{-3}$ for 1:3 HLD2:P1. The crosslinked 2:1 HLD1/HLD2 had similar n values to the non-crosslinked version indicating that the effect of crosslinking on n is minute. The higher index of HLD1/HLD2 is significant in that the Mach-Zehnder modulator figure-of-merit $n^3r_{33}$ has a cubic dependence on n, such that small index increases can lead to large increases in performance Extinction coefficients (k) of the films were measured (Table 2 and FIG. 8), and at wavelengths above 1200 nm the k values are very low (<0.01), which is typical for this class of OEO materials, even at high density.

TABLE 2

Index of refraction (n) and Absorption coefficient (k) of of Chromophore and Chromophore Blends

| | n | | k | |
|---|---|---|---|---|
| Chromophore | 1310 nm | 1550 nm | 1310 nm | 1550 nm |
| HLD1 | 1.88 | 1.82 | 0.003671 | 0.000831 |
| HLD2 | 1.89 | 1.83 | 0.004632 | 0.002049 |
| 1:2 HLD1:HLD2 | 1.90 | 1.84 | 0.004080 | 0.002691 |
| 1:1 HLD1:HLD2 | 1.89 | 1.83 | 0.002015 | 0.000668 |
| 2:1 HLD1:HLD2 | 1.95 | 1.88 | 0.0013 | 0.000091 |
| 2:1 HLD1:HLD2$^a$ | 1.89 | 1.83 | 0.0020 | 0. 00017 |
| 1:1 HLD2:C1 | 1.79 | 1.75 | 0.000347 | 0.000031 |
| 1:3 HLD2:P1 | 1.61 | 1.60 | 0.000099 | 0.000002 |

$^a$After crosslinking at 150° C. for 30 min.

Electronic Structure Calculations

Figure 9:
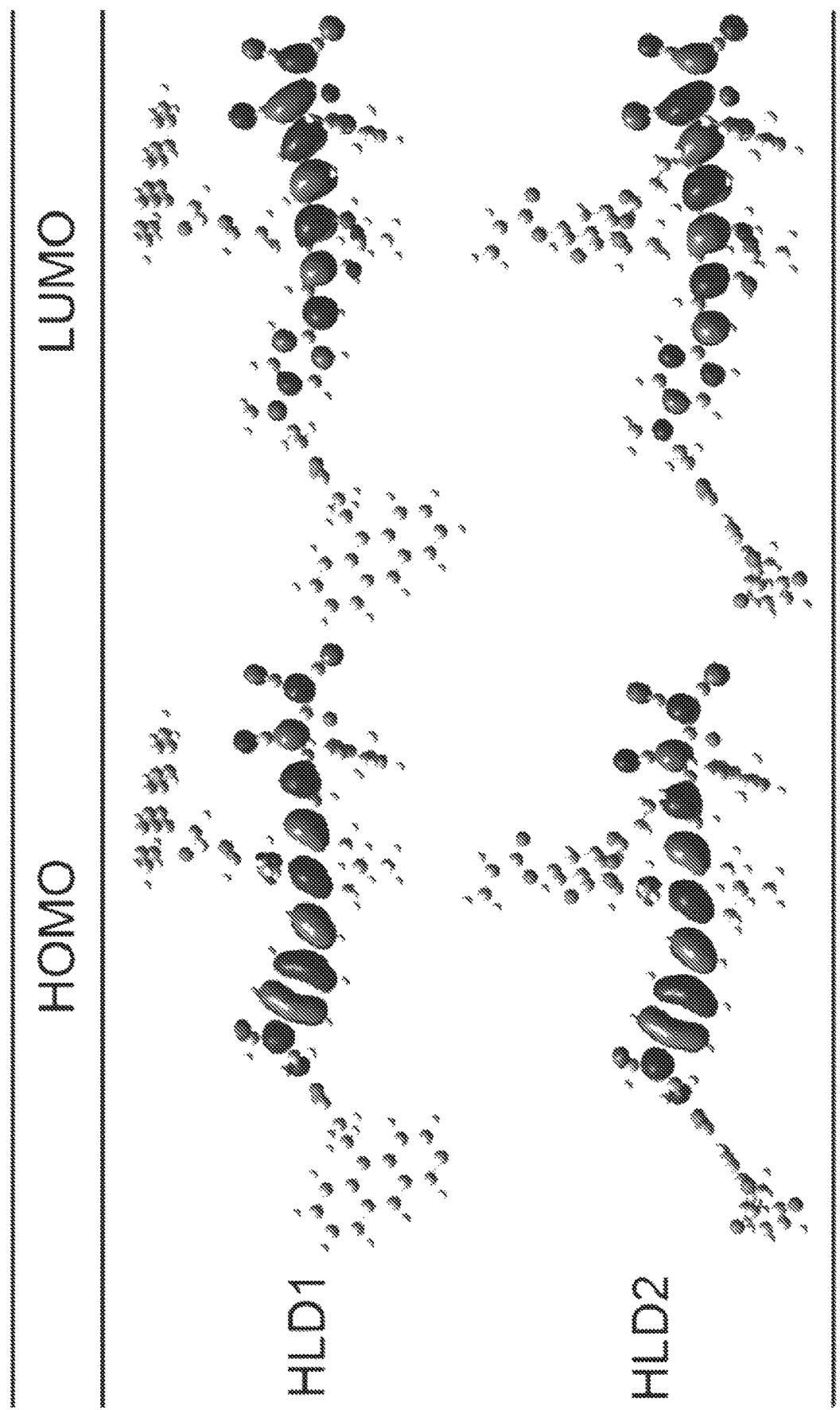
FIG. 9 shows frontier molecular orbitals HOMO and LUMO of chromophores HLD1 and HLD2.

Two sets of DFT calculations were carried out to understand the ground-state polarization and molecular linear and nonlinear optical properties of the chromophores. DFT calculations were performed using the Gaussian 09 package. The first set of calculations examined localization of frontier orbitals and was performed on the entire HLD1 and HLD2 complexes. The geometry of each molecule, in an all-trans configuration, was optimized at the B3LYP/6-31G level of theory in the gas phase; the small basis set was used due to the large size of the functionalized chromophores. FIG. 9 depicts the electron density distribution of the HOMO and LUMO for HLD1 and HLD2. The frontier orbitals are asymmetric along the dipole axis of the chromophore, with greater HOMO density towards the donor and greater LUMO density towards the acceptor. The HOMO-LUMO energy difference $E_g$ between HLD1 and HLD2 is <0.01 eV (Table 4), suggesting that the substitution schemes used for HLD1 and HLD2 have equivalent effect on the conjugated systems. These calculations further indicate that the frontier orbitals do not extend more than two atoms beyond the conjugated system, enabling truncated structures to be used for higher-level calculations to obtain optical properties.

Figure 19:
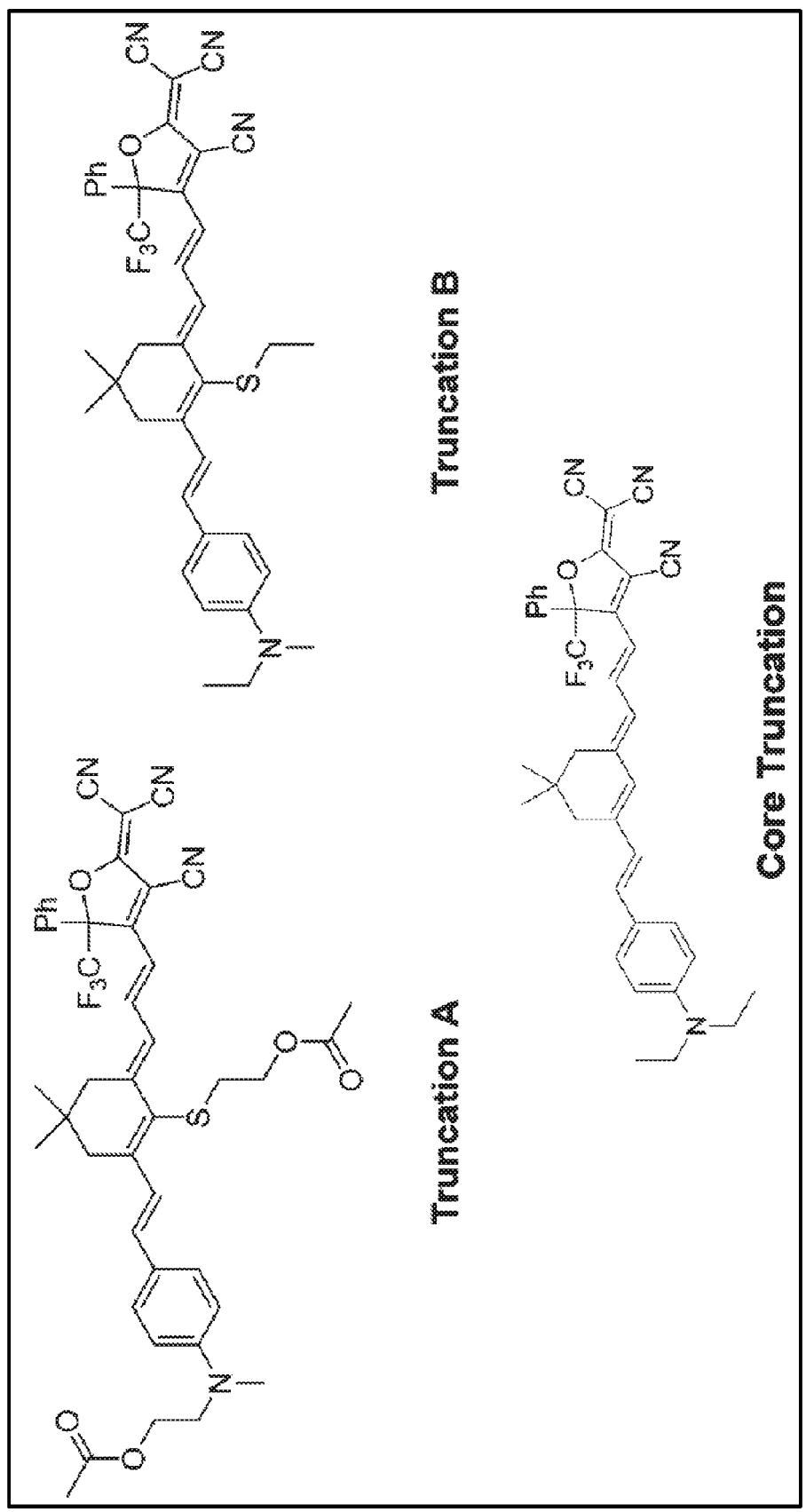
FIG. 19 shows chemical structure for Truncation A and Truncation B.
Figure 20A:
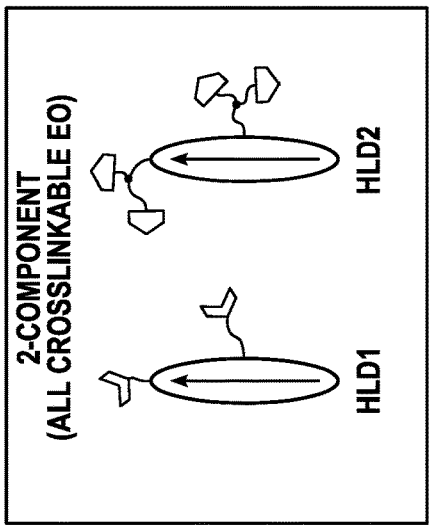
FIGS. 20A-F depict exemplary methods of forming exemplary films.
Figure 20B:
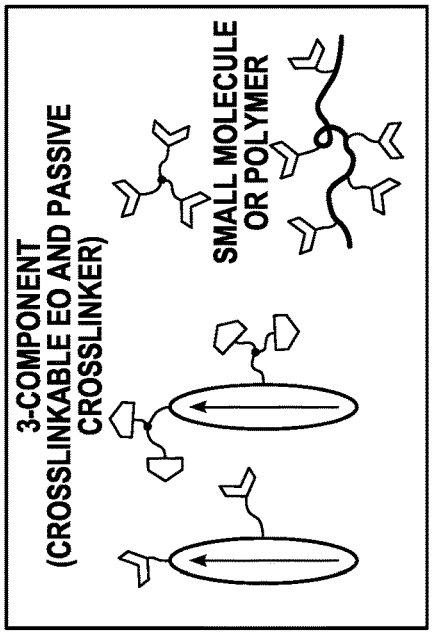
Figure 20C:
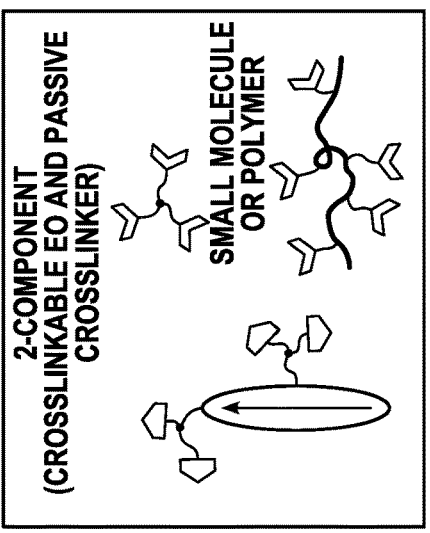
Figure 20D:
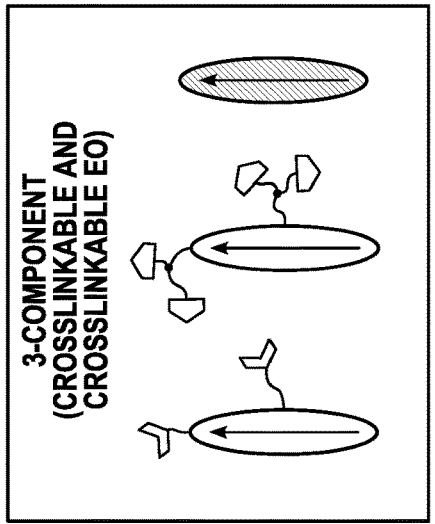
Figure 20E:
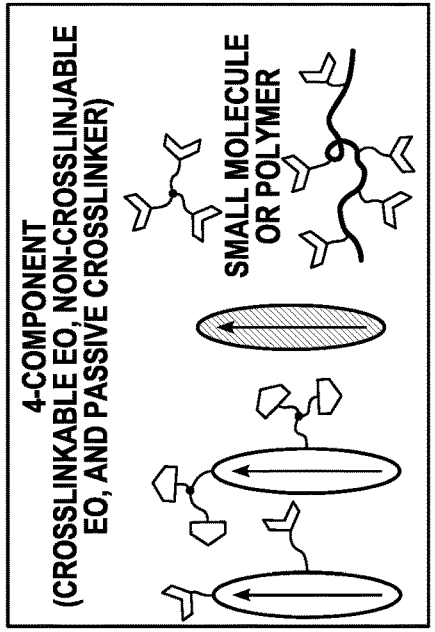
Figure 20F:
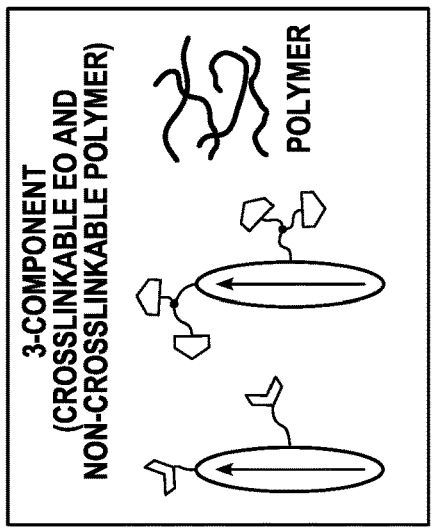

Larger-basis M062X/6-31+G(d) calculations were performed in a chloroform implicit solvent environment (polarizable continuum model) on two truncations of the HLD1 structure as well as on the CLD-like core structure with a diethylamine donor (core truncation). Calculations were performed using previously published methods. The first truncation (A) replaces the portion of the pendant groups beyond the ester carbonyl with methyl groups, and the second, tighter truncation (B) removes the entire pendant group, with a hydrogen replacing the ester oxygen (FIG. 19). Since the truncated versions of HLD1 and HLD2 are equivalent, and as discussed above, the overall electronic effects of each type of pendant group are nearly equivalent, a separate set of calculations was not needed for HLD2. Truncation A incorporates the inductive effects of the electron-withdrawing ester groups, while truncation B only incorporates modifications directly adjacent to the conjugated system (alkanethiol and asymmetric donor). Since calculations are performed on only a single configuration of the molecule and the presence of the pendant groups can shift the dipole axis, the hyperpolarizability metric used to examine the effect of the pendant groups is $|\beta|=\sqrt{\beta_x^2+\beta_y^2+\beta_z^2}$. While not directly comparable with an experiment, unlike $\beta_{HRS}$, it provides a good estimate of the nonlinearity of the system. Static hyperpolarizabilities ($\beta_0$) were calculated to compare the effects of substitution on the ground state in the absence of resonance effects. Results are shown in Table 3.

TABLE 3

Calculated dipole moments and optical properties for truncated HLD structures

| Truncation | $\mu$ (D) | $\lambda_{max}$ (nm) | $\Delta\lambda$ vs core (nm) | $|\beta_0|$ (10$^{-30}$ esu) | Rel. $|\beta_0|$ |
|---|---|---|---|---|---|
| A (post-ester) | 28.6 | 598 | −44 | 1224 | 0.76 |
| B (pre-ester) | 28.4 | 618 | −24 | 1407 | 0.87 |
| Core (diethyl donor) | 31.0 | 642 | 0 | 1616 | 1.0 |

The modifications needed for the pendant groups slightly reduce the dipole moment of the chromophore compared to the reference diethyl-substituted core. The inductive effects from the ester groups are substantial, with a loss of 24% of the molecule's hyperpolarizabilty and a substantial blue shift; the blue-shift ($\Delta\lambda$) is consistent with that observed between YLD124 (which shares the same conjugated core with HLD but lacks the pendant groups) and the HLD chromophores. A much weaker effect is observed when the ester groups are removed. The observed effects are consistent with the blueshift observed in the UV/Visible spectra discussed in the previous section. It is possible that these all-trans calculations represent maximum values for inductive effects from the side-chains and average values are lower, but a rigorous determination would require either calculations sampling over many chromophores or Hyper- Rayleigh scattering experiments. The large fraction of the hyperpolarizability that is retained, combined with the high number density are not only noteworthy for the HLD chromophores, but suggest that further improvements could be realized by modification of the donor.

Thermal Properties

Figure 10:
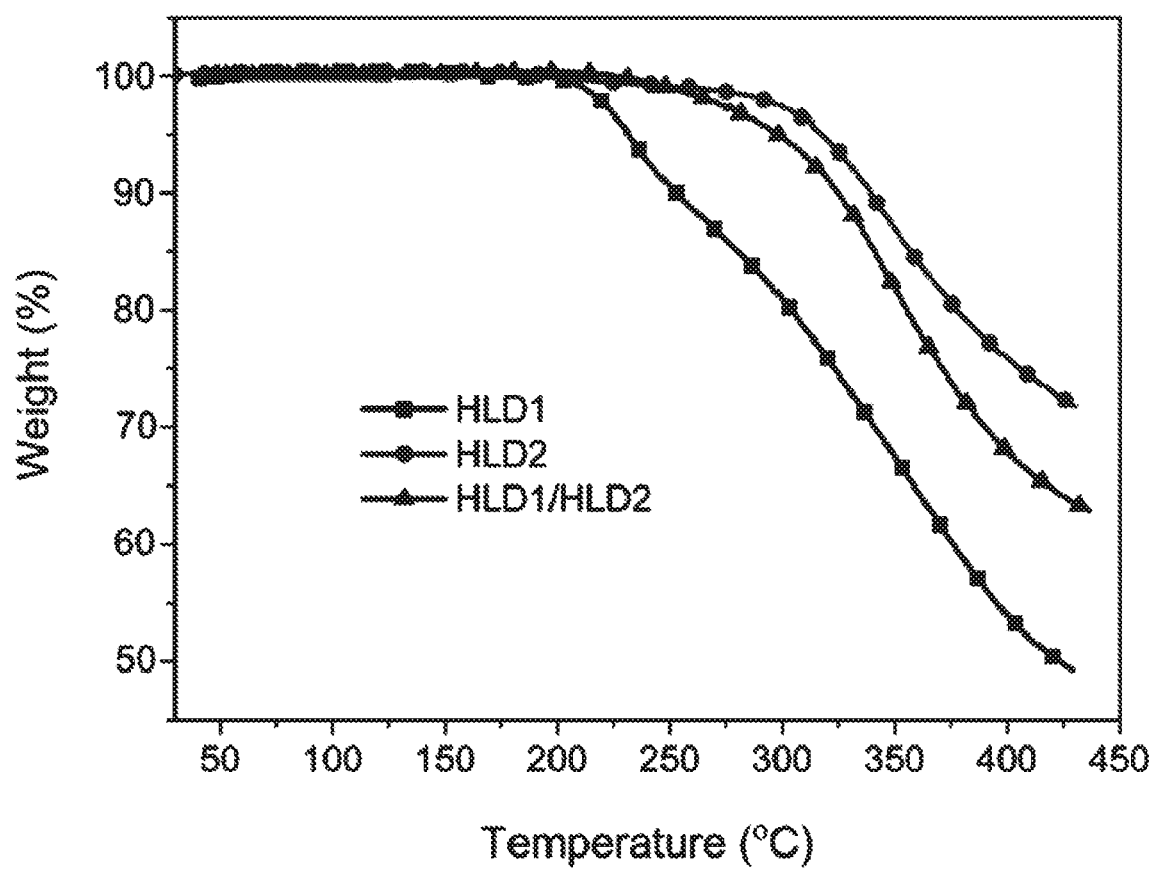
FIG. 10 is TGA curves of chromophores HLD1, HLD2 and 2:1 HLD1:HLD2 with a heating rate of 10° C. min$^{-1}$ in a nitrogen atmosphere.
Figure 11B:
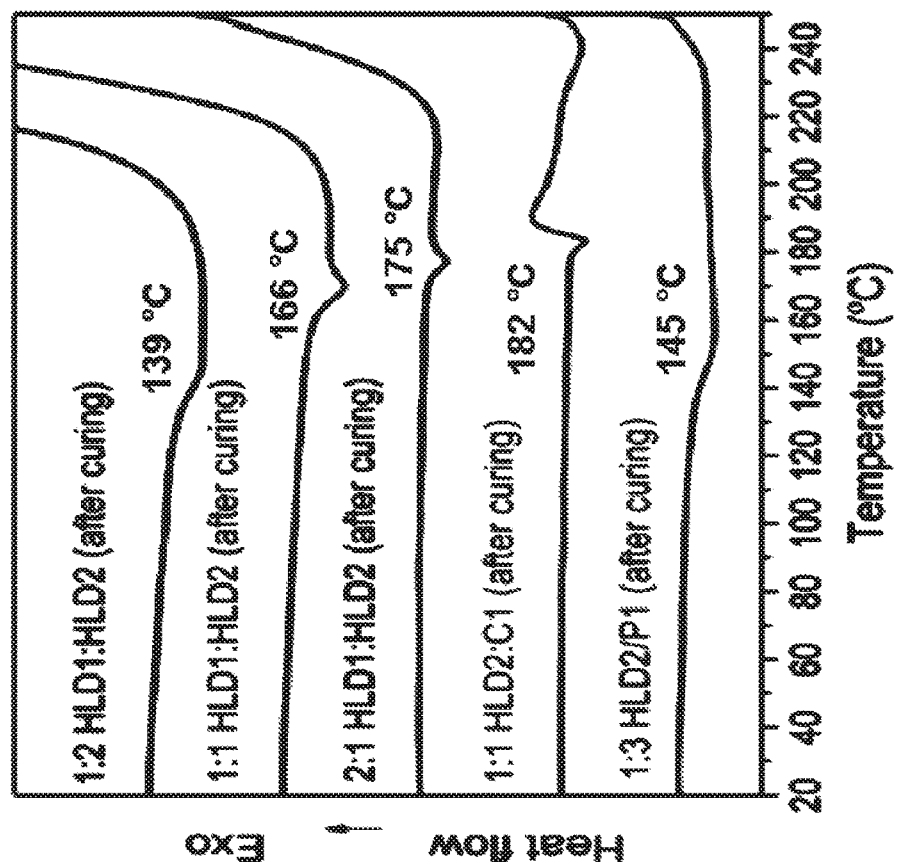
FIGS. 11A and 11B show DSC curves of chromophores HLD1, HLD2, C1, P1 and their blends.
Figure 11A:
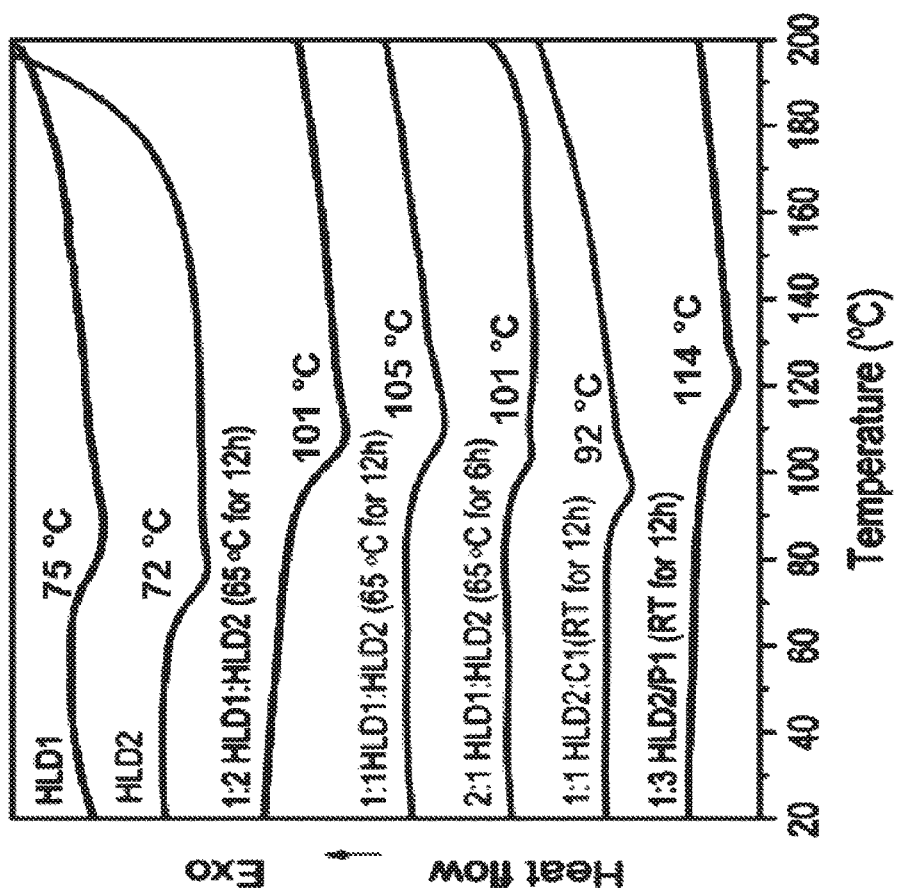

The thermal characteristics of the chromophore HLD1, HLD2 and HLD1/HLD2 were investigated using thermogravimetric analysis (TGA) and differential scanning calorimetry (DSC) under nitrogen (see FIGS. 10 and 11). All the chromophores exhibited good thermal stabilities with the decomposition temperatures ($T_d$) higher than 230° C. The $T_g$ of HLD1 and HLD2 are 72° C. and 75° C., respectively. For HLD1:HLD2 blends, the crosslinking occurs over a very broad range of temperatures, rather than having a sharp onset temperature; the crosslinking is rapid above 120° C., but it occurs slowly at the temperature used for drying the solvent cast films (~65° C.). The crosslinking reaction offers a good way of adjusting the $T_g$ of the HLD1:HLD2 blend by controlling the degree of crosslinking: a low degree of crosslinking can be achieved during drying and increases the $T_g$ by ~20-40° C., but does not inhibit poling. When dried in vacuo at 65° C. for 12 hours, the $T_g$s of 1:2, 1:1, and 2:1 HLD1:HLD2 rise to 101-105° C. This slight degree of crosslinking that occurs during drying is referred to herein as "pre-crosslinking" as it precedes the poling step, but does not significantly inhibit the ability of chromophores to align during poling, as discussed below in the poling section. The pre-crosslinking is beneficial as the higher $T_g$ means that the poling temperature and crosslinking temperature are closer together. Also, crosslinking increases dielectric strength of the composite material, and thus increases the electric field strength that can be applied to the film without dielectric breakdown.

Figure 16A:
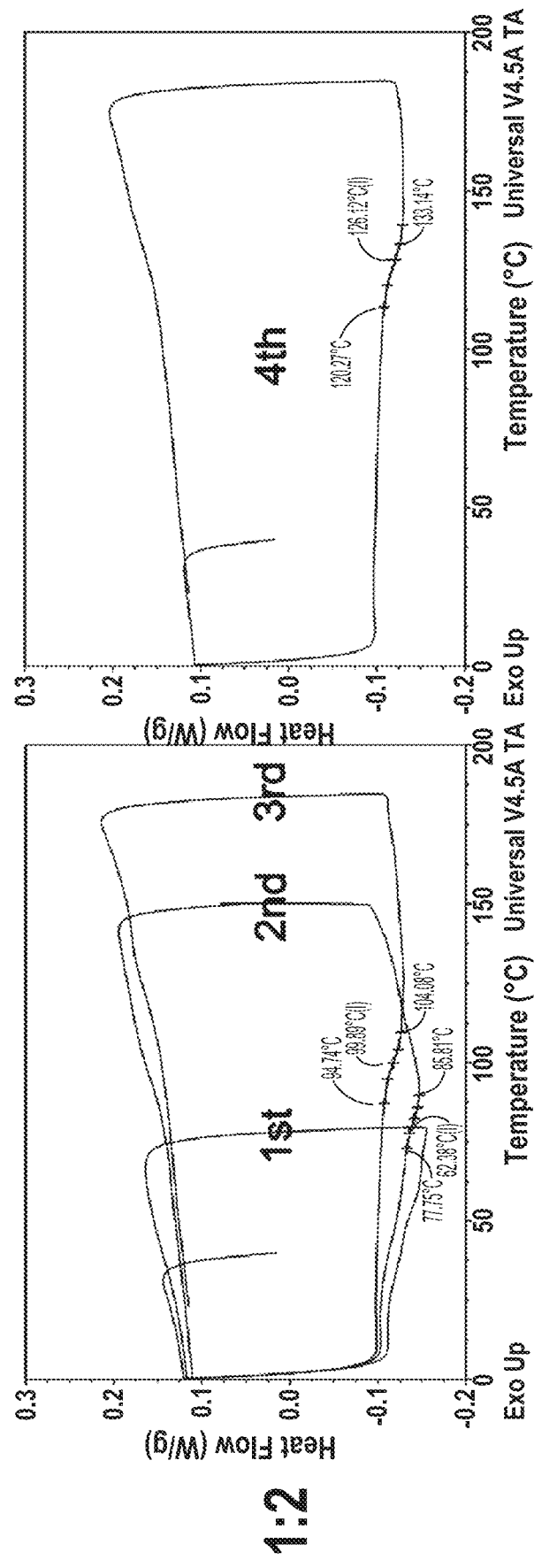
FIGS. 16A-C show DSC curves for crosslinking exemplary chromophores with different ratios. The samples were dried in vacuum oven for 12 h at room temperature, then heated to 80° C., 150° C., 185° C. and 200° C., respectively. Both heating and cooling rates were 10° C./min. There was no isothermal time.
Figure 16B:
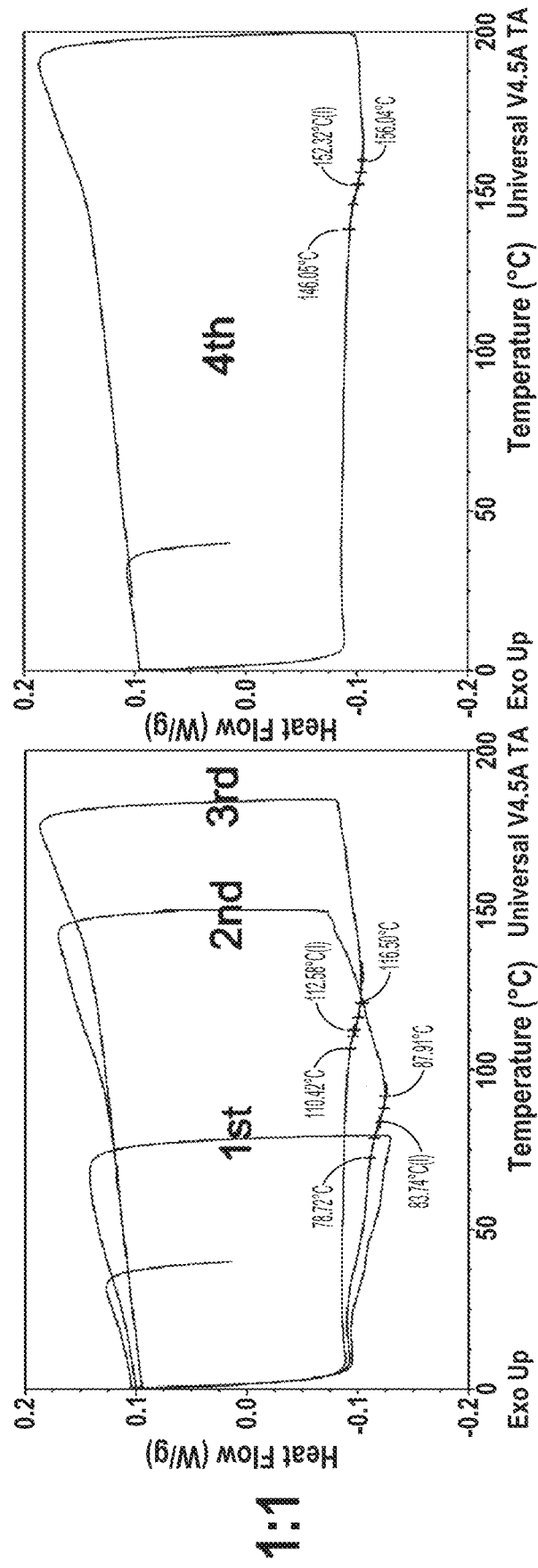
Figure 16C:
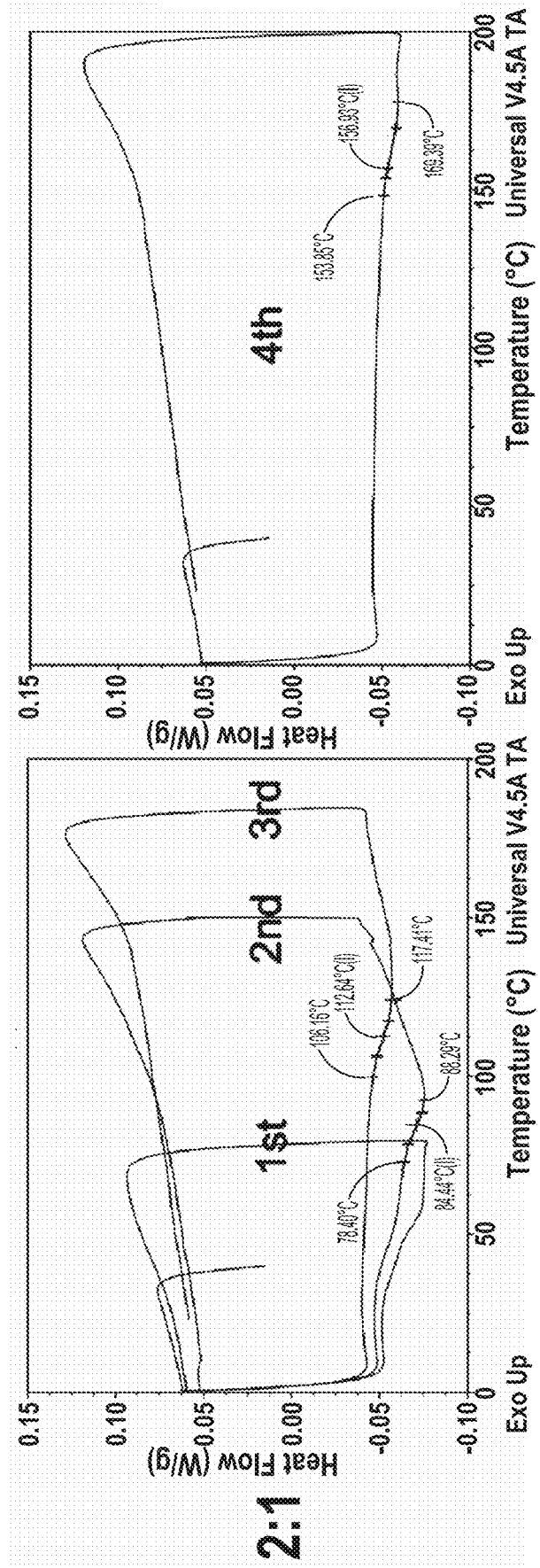
Figures 17A, 17B:
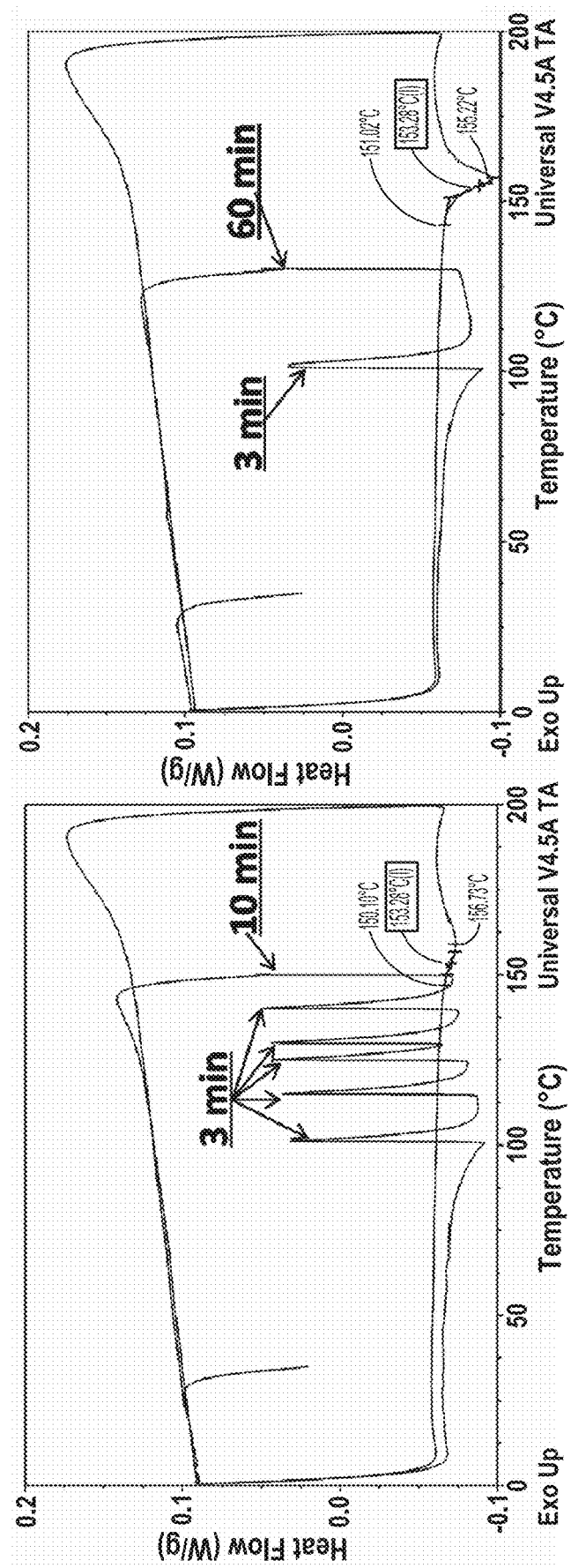
FIGS. 17A and 17B show DSC curves (HLD1:HLD2=2:1): Moderate crosslinking temperature for a long period of time vs. higher crosslinking temperature for a shorter period of time.
Figure 18A:
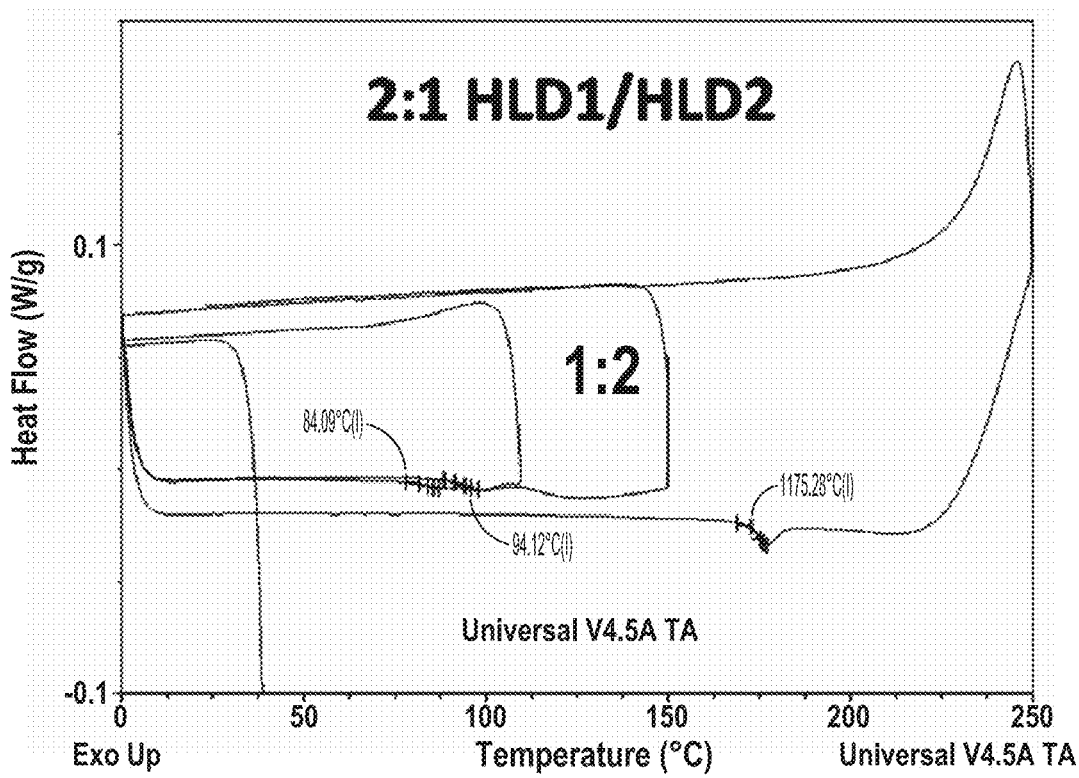
FIGS. 18A-D demonstrate crosslinking tests. The samples were dried in vacuum oven for 6 h at 65° C., then heated to 150° C. for 60 min.
Figure 18B:
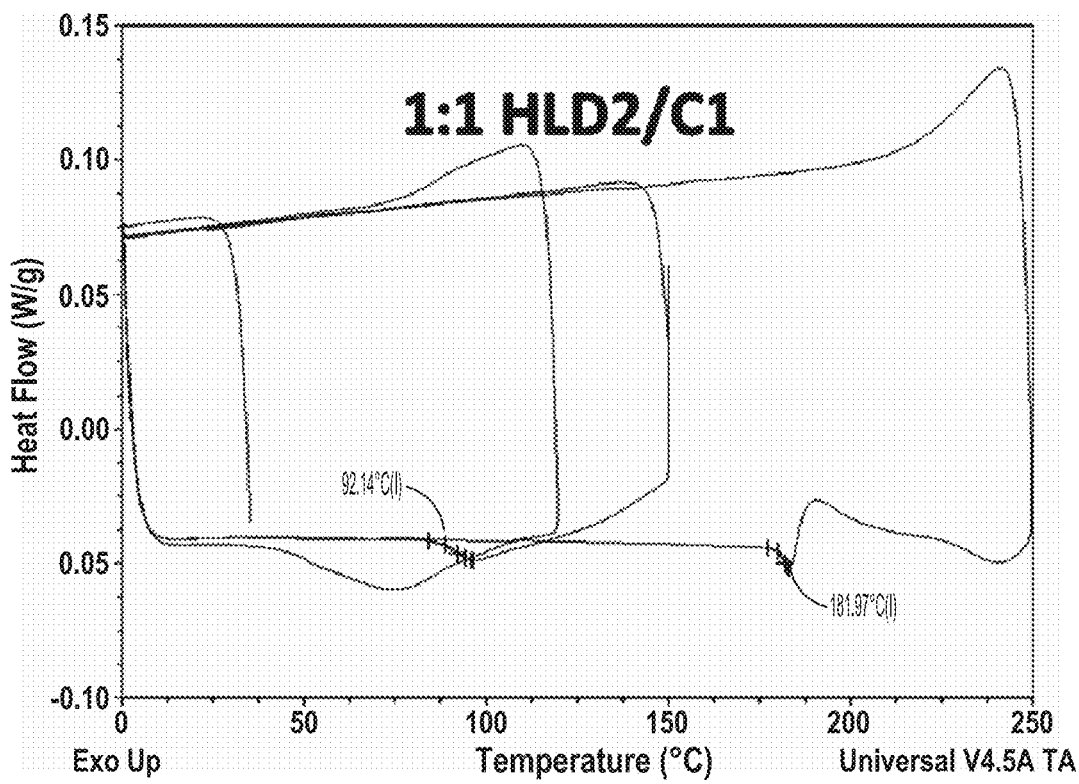
Figure 18C:
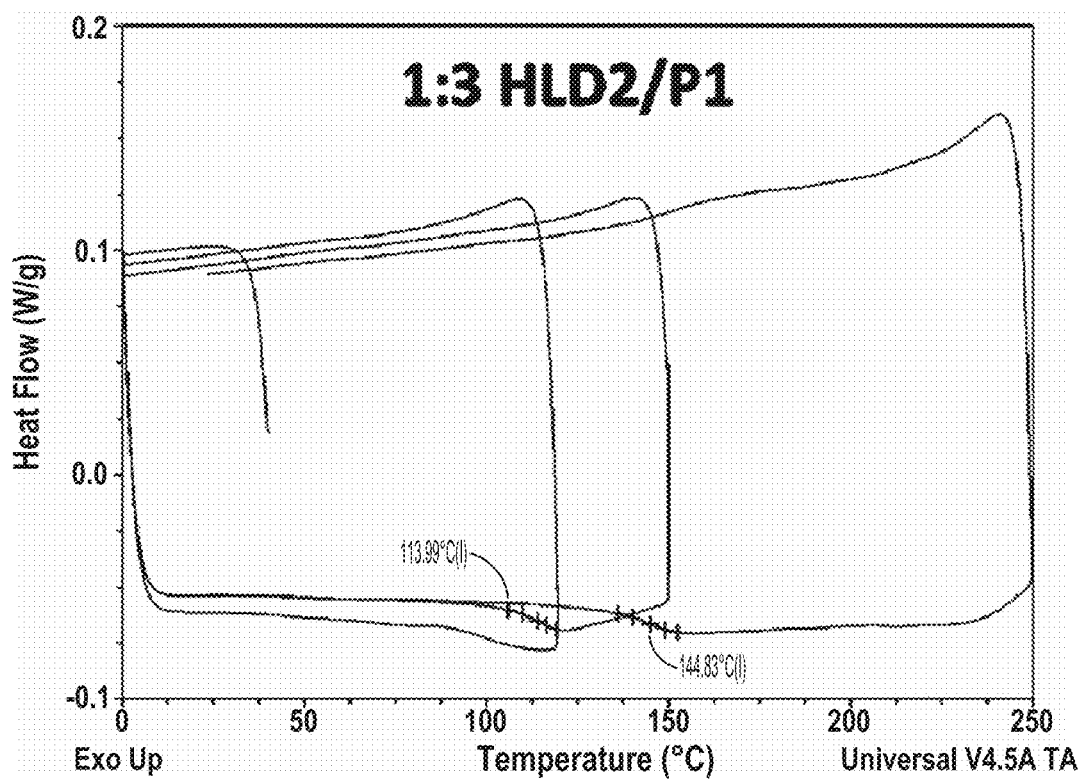
Figure 18D:
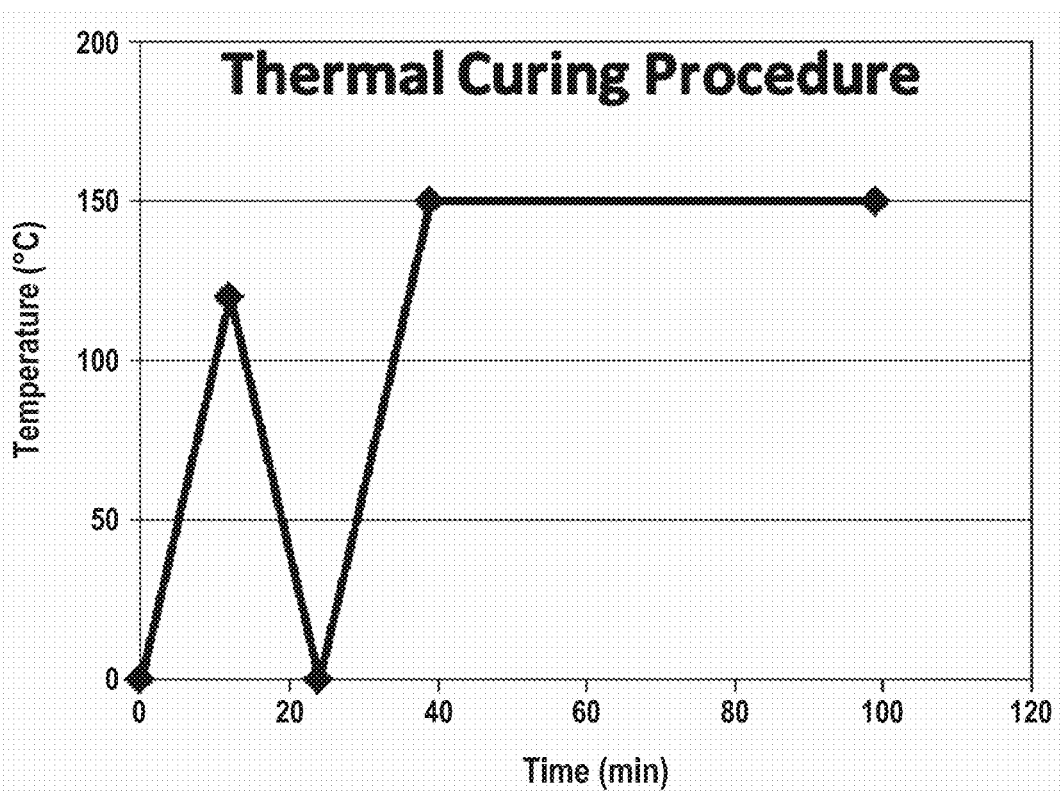

Multiple thermal measurements show that crosslinking-induced $T_g$ has a time-temperature relationship in that the same $T_g$ can be achieved by heating the crosslinkable materials to a moderate temperature for a long period of time or to a higher temperature for a shorter period of time (see FIGS. 16 and 17). However, there is a maximum $T_g$ that can be achieved, and it depends on the blend ratio or passive crosslinker composition. Results from DSC showed that the maximum $T_g$ of 1:2, 1:1 and 2:1 HLD1/HLD2 after thermal curing (150° C. for 60 min) is 139° C., 166° C. and 175° C., respectively (FIG. 11 and FIG. 18). It reflects the gradual enhancement of the degree of crosslinking and shows that 1:1 and 2:1 are more suitable ratios for achieving highest $T_g$. Since HLD2 has twice as many crosslinkable groups as HLD1, 2:1 HLD1:HLD2 has an approximately 1:1 molar ratio of crosslinkable units, so this ratio is expected to have the highest crosslink density and $T_g$. The $T_g$ of 2:1 HLD1/HLD2 is ~100° C. higher than that of chromophore HLD1 or HLD2, indicating that the anthracene/acrylate Diels-Alder pair is a good choice for improving thermal stability of materials upon crosslinking. After crosslinking (150° C. for 60 min) using the small molecule passive crosslinker C1, the $T_g$ of 1:1 HLD2/C1 is as high as 182° C. which is a little higher than 2:1 HLD1/HLD2 after the same thermal curing procedure (see FIG. S3 in SI). Using the polymeric passive crosslinker P1, 1:3 HLD2/P1 has a $T_g$ of 145° C. after the same crosslinking conditions, which is the lowest among the crosslinked chromophores in this study.

Electric Field Poling and Electro-Optic Performance

Layered thin film devices—with the organic EO material sandwiched between ITO and gold electrodes—were fabricated for poling studies and EO measurements. Some devices also used a benzocyclobutene charge injection barrier layer between the ITO and the EO material using a previously described technique. During poling, current, voltage, temperature, and relative $r_{33}$ were measured real-time, which allowed us to fine-tune and optimize the poling and crosslinking conditions. EO activities ($r_{33}$) of the poled/cured films were measured using the Teng-Man simple reflection technique at 1310 nm after the samples were cooled to room temperature. The poling performance of neat individual chromophore HLD1 or HLD2 was tested first, and poling curves of $r_{33}$ vs. poling field are shown in FIG. 12. It should be noted that the poling field plotted in FIG. 12 is the peak poling field during each run. The average poling efficiencies ($r_{33}$/poling field or $r_{33}/E_p$) of HLD1 and HLD2 were 2.60±0.08 nm$^2$ V$^{-2}$ and 2.47±0.09 nm$^2$ V$^{-2}$, respectively. Poling efficiency is a good metric by which to compare organic EO materials as it is an average of multiple poling experiments and independent of poling field.

FIG. 12 shows poling curves (plots of $r_{33}$ vs poling field) of exemplary films. Average $r_{33}$/Ep±standard errors are shown. In f, black circle symbols represent poling method A (the desired poling field was applied, then heated at 10° C./min to 130° C. for 10 min, 140° C. for 10 min, 150° C. for 10 min, then cooled), red circles represent poling method B (the desired poling field was applied, then heated at 10° C./min to 100° C. for 5 min, 110° C. for 5 min, 120° C. for 5 min, 130° C. for 5 min, 140° C. for 5 min, 150° C. for 10 min, then cooled), pink circles represent poling method C (the desired poling field was applied, then heated at 10° C./min to 100° C. for 30 min, 110° C. for 30 min, 120° C. for 30 min, 130° C. for 60 min, then cooled).

TABLE 4

Electric Field Poling Data for EO Chromophores in Bulk Devices

| Chromophore | poling temp (° C.) | $\rho_{N\text{-}ave}$ ($\times 10^{20}$ molecules cm$^{-3}$)[a] | $r_{33}/E_p$ (nm$^2$ v$^{-2}$)[b] | max. $r_{33}$ (pm V$^{-1}$) |
|---|---|---|---|---|
| HLD1 | 85 | 5.18 | 2.60 ± 0.08 | 218.3 |
| HLD2 | 82 | 5.07 | 2.47 ± 0.09 | 203.1 |
| 1:2 HLD1:HLD2[c] | 103 | 5.11 | 3.04 ± 0.08 | 179 |
| 1:1 HLD1:HLD2[c] | 108 | 5.13 | 2.93 ± 0.08 | 396.7 |
| 2:1 HLD1:HLD2[c] | 104 | 5.14 | 3.23 ± 0.08 | 456.4 |
| 1:2 HLD1:HLD2 (crosslinked)[d] | 103-160 | 5.11 | 2.5 ± 0.1 | 150 |
| 1:1 HLD1:HLD2 (crosslinked)[d] | 105-160 | 5.13 | 2.36 ± 0.10 | 255.1 |
| 2:1 HLD1:HLD2 (crosslinked)[d] | 101-160 | 5.14 | 2.29 ± 0.11 | 286.2 |
| 1:1 HLD2:C1 (crosslinked)[d] | 92-160 | 2.54 | 1.18 ± 0.12 | 131.3 |
| 1:3 HLD2:P1 (crosslinked)[d] | 114-160 | 1.27 | 0.77 ± 0.11 | 90.3 |

[a]Number density (assumes mass density of 1 g/cm$^3$).
[b]Poling efficiency ± standard error.
[c]Dried at 65° C. for 12 h in a vacuum oven.
[d]Dried at 65° C. for 6 h in a vacuum oven.

Figure 12A:
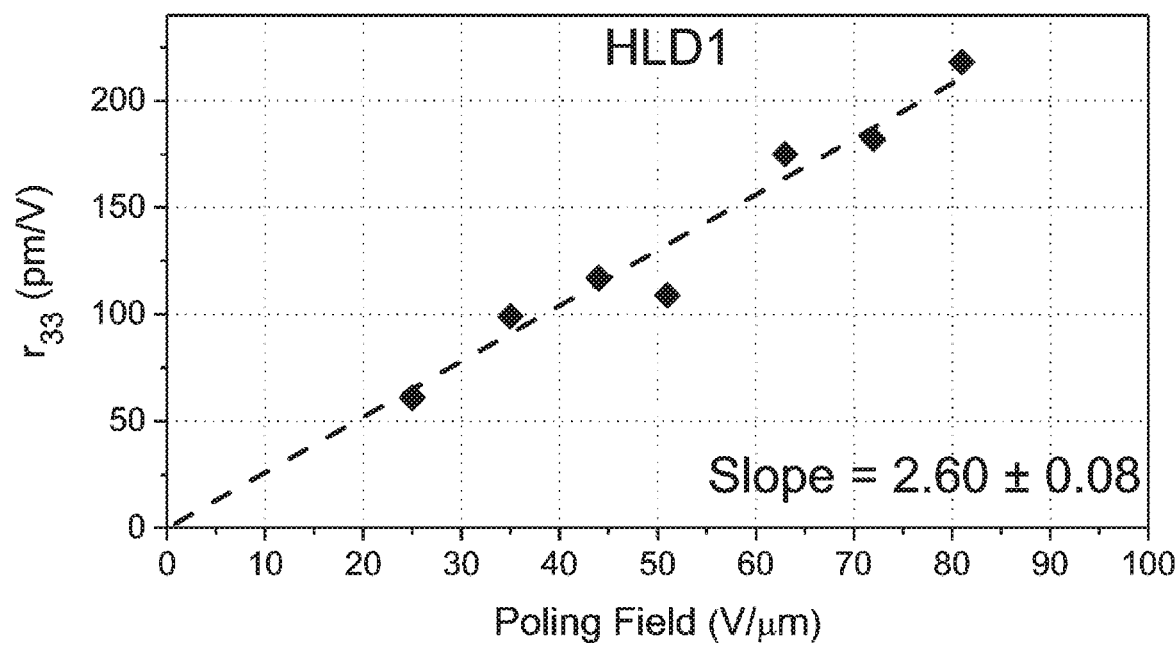
FIGS. 12A-H show poling curves (plots of $r_{33}$ vs poling field). Average $r_{33}$/Ep±standard errors are shown. In 12H, black circle symbols represent poling method A (the desired poling field was applied, then heated at 10° C./min to 130° C. for 10 min, 140° C. for 10 min, 150° C. for 10 min, then cooled), medium-grey circles represent poling method B (the desired poling field was applied, then heated at 10° C./min to 100° C. for 5 min, 110° C. for 5 min, 120° C. for 5 min, 130° C. for 5 min, 140° C. for 5 min, 150° C. for 10 min, then cooled), light grey circles represent poling method C (the desired poling field was applied, then heated at 10° C./min to 100° C. for 30 min, 110° C. for 30 min, 120° C. for 30 min, 130° C. for 60 min, then cooled).
Figure 12B:
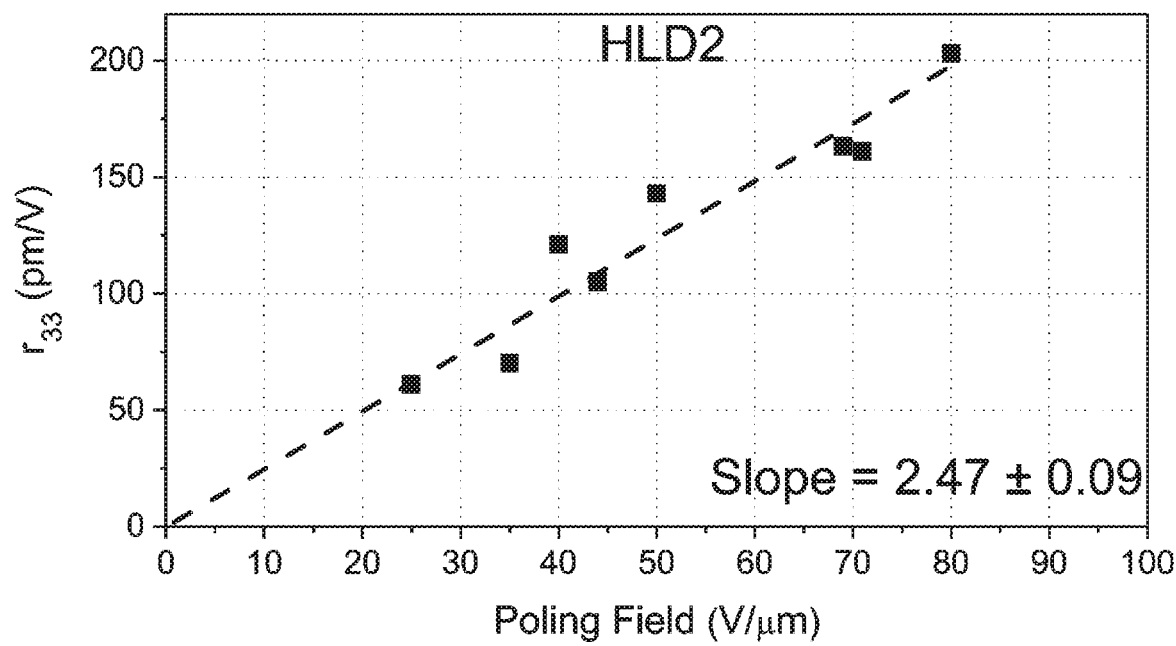
Figure 12C:
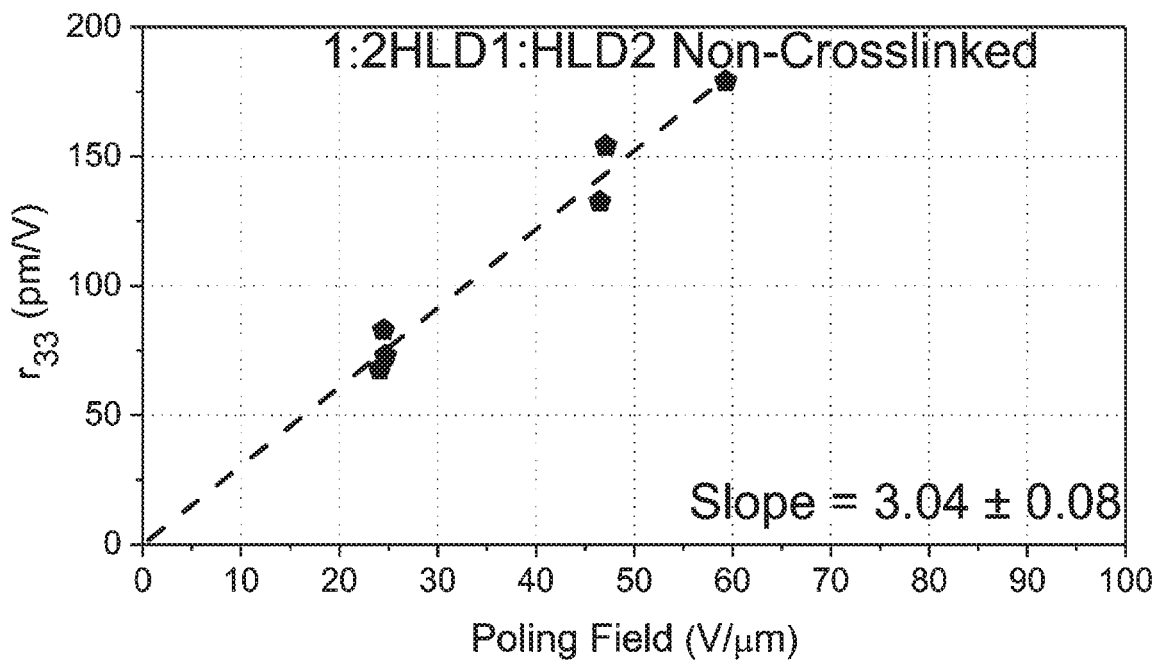
Figure 12D:
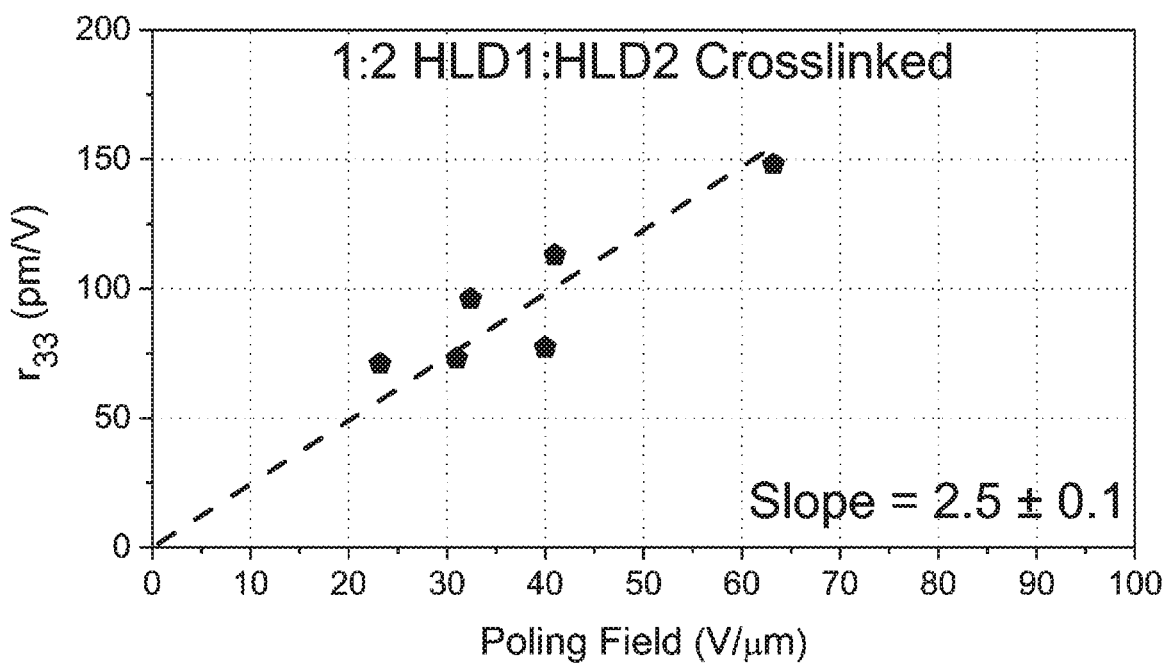
Figure 12E:
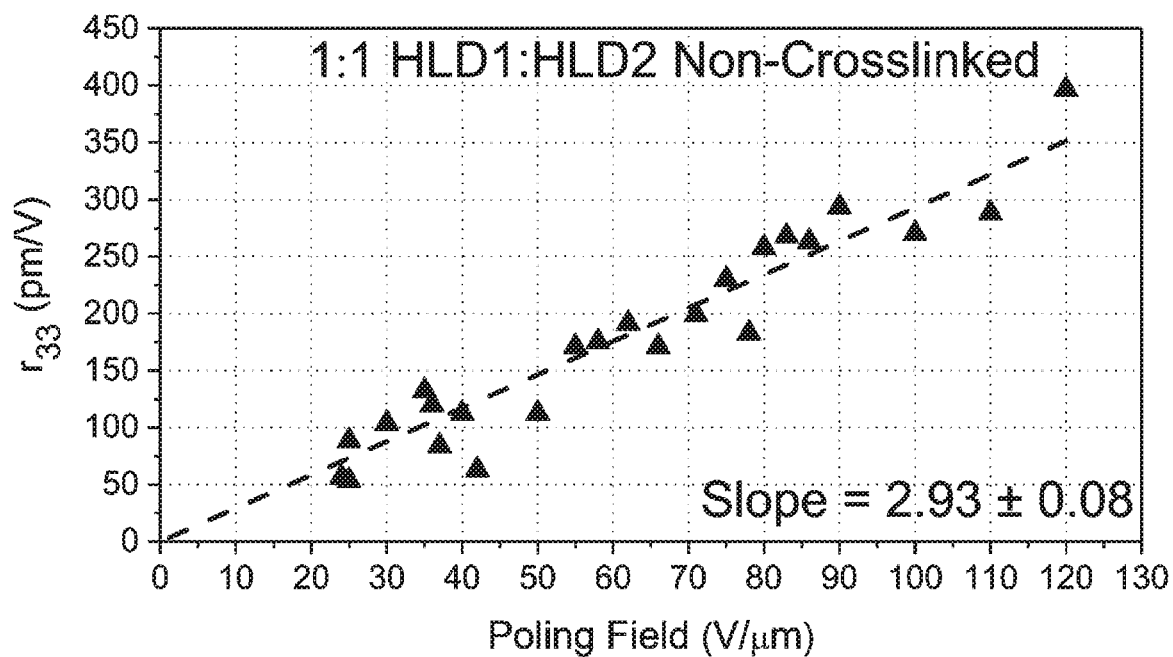
Figure 12F:
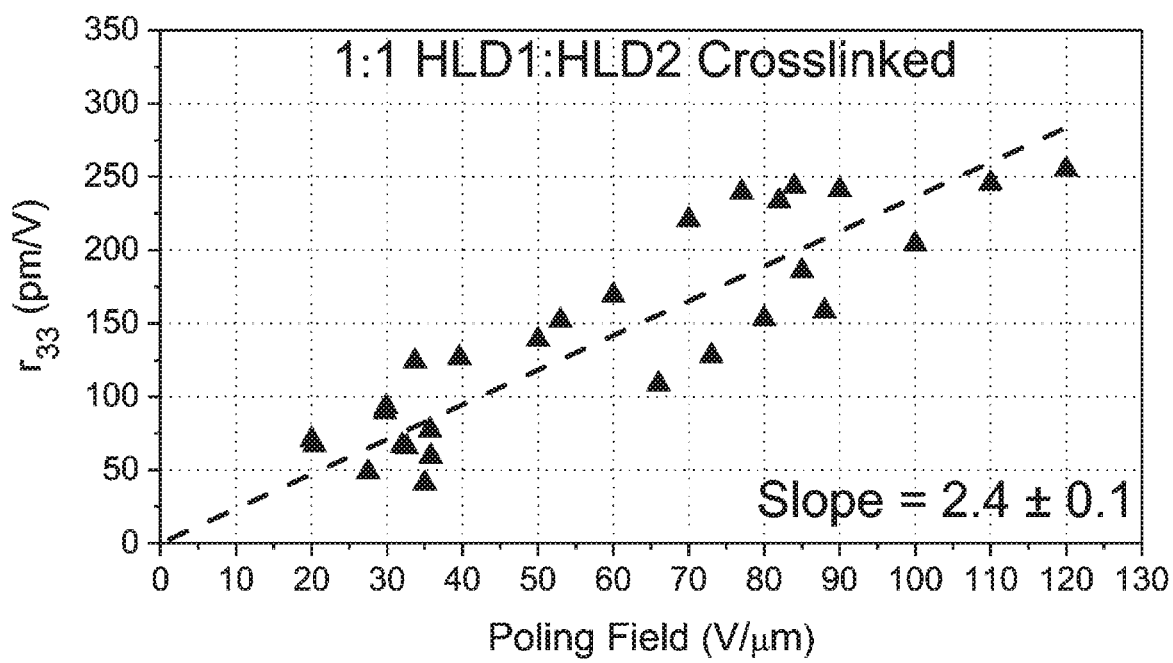
Figure 12G:
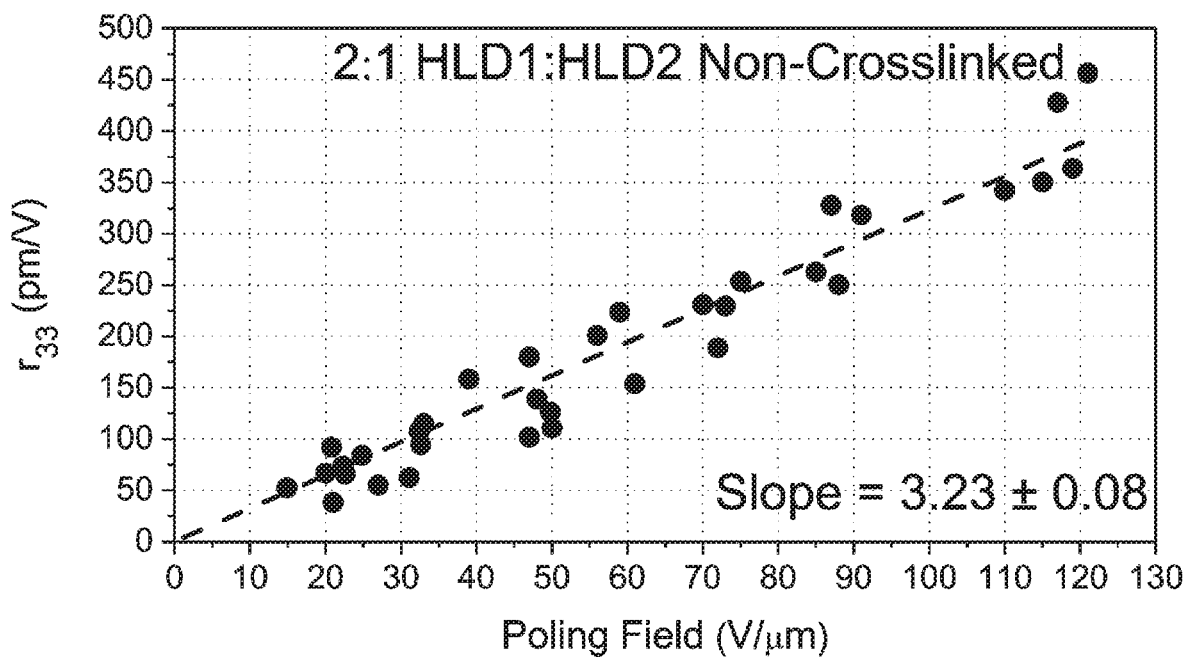
Figure 12H:
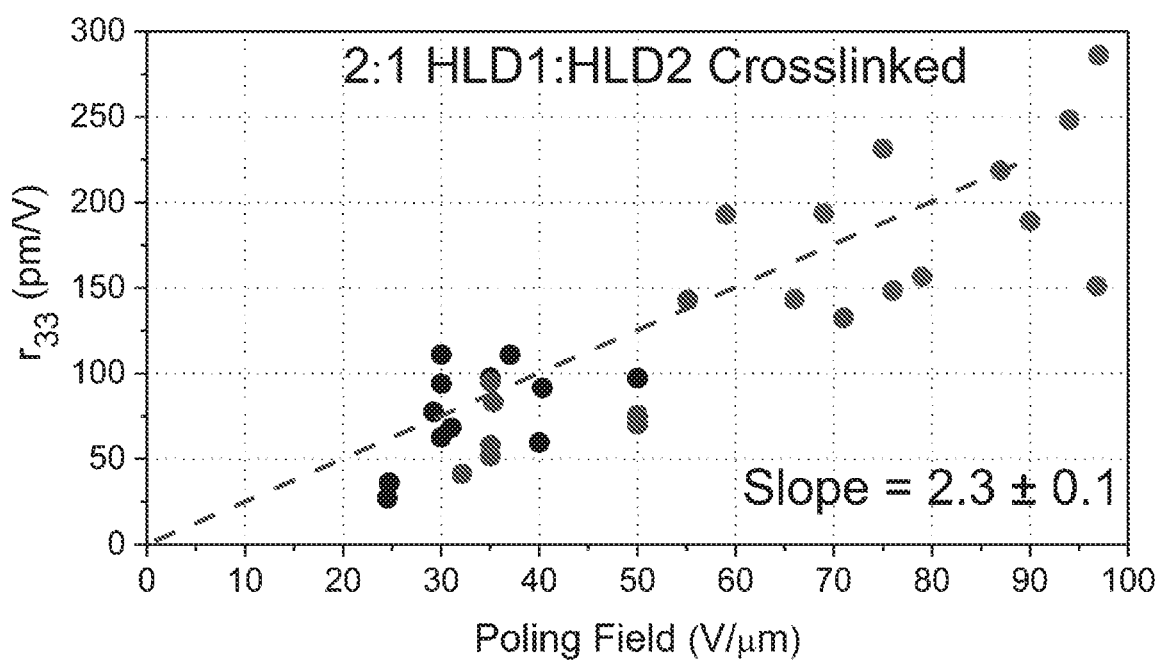
Figure 13A:
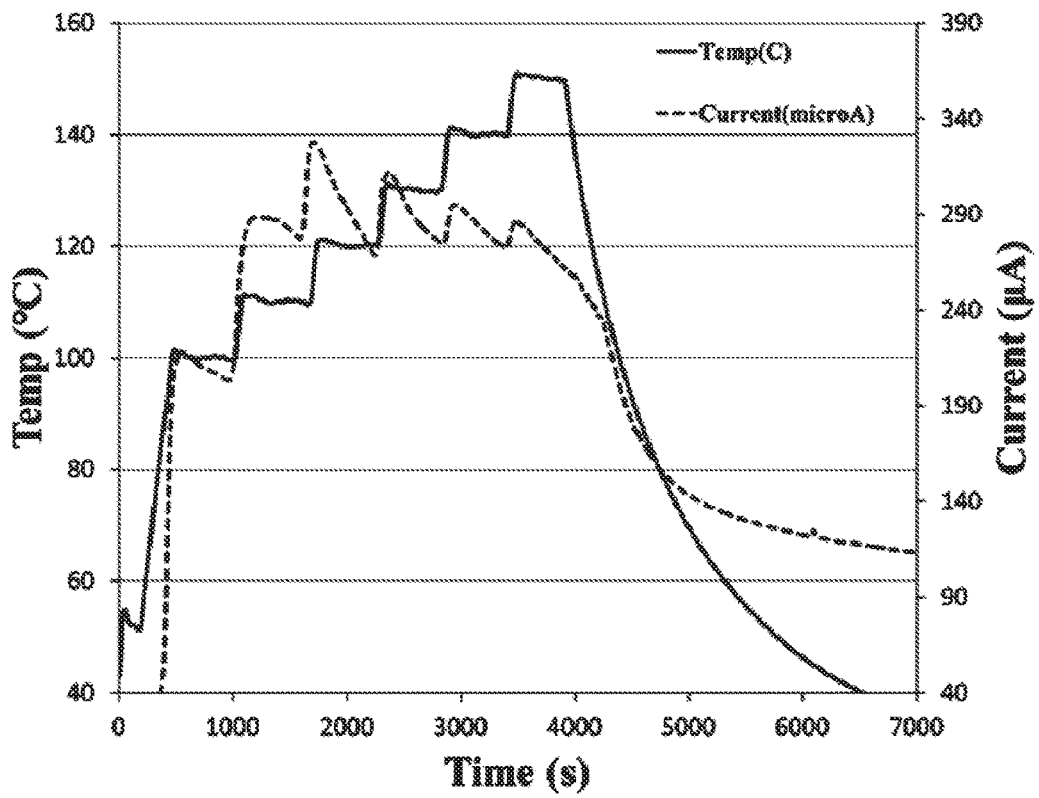
FIGS. 13A and 13B depict the profile of temperature, current flow and poling field during poling/crosslinking for 2:1 HLD1/HLD2.
Figure 13B:
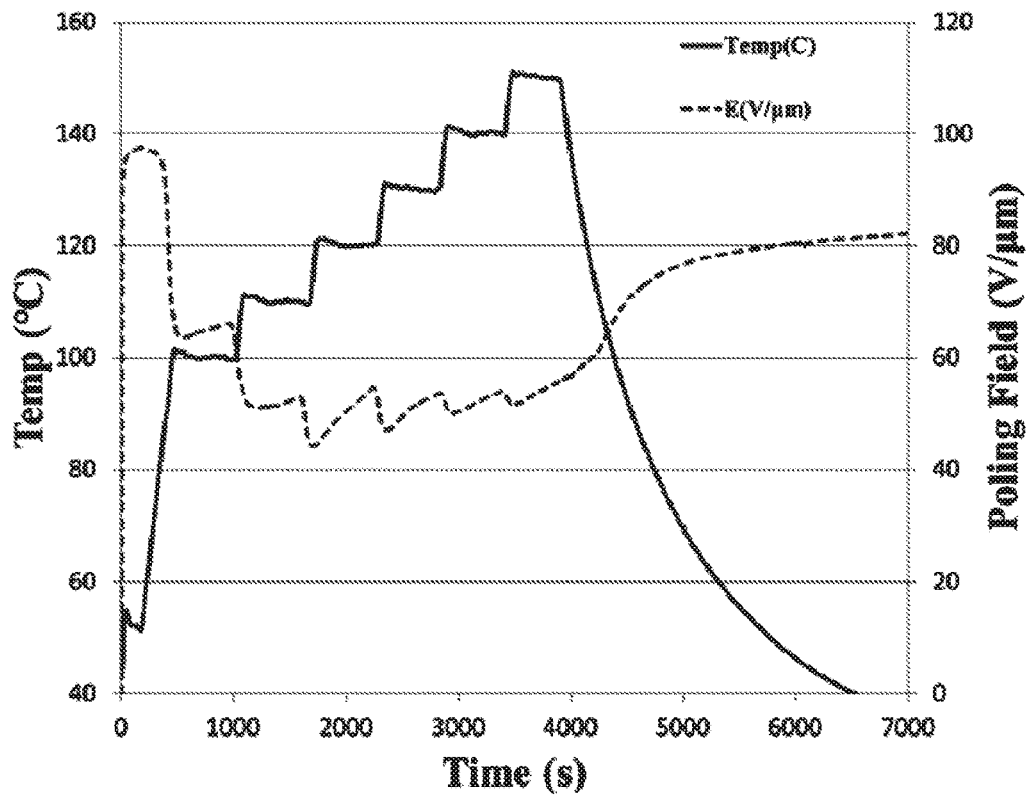

The poling performance of HLD1:HLD2 blends at 1:1 and 2:1 mass ratios were also measured. As mentioned previously, there is a small amount of pre-crosslinking that occurs when a HLD1/HLD2 blend is dried in vacuo at 65° C., increasing the $T_g$. After 6 h or 12 h at 65° C. (higher temperatures and longer times are not used because too much crosslinking will occur prior to poling), the $T_g$ of these films increases to 101-105° C. The poling/crosslinking system is designed such that poling can be initiated at the $T_g$, the voltage is held constant until the EO activity reaches a maximum, then the temperature is increased to where crosslinking is rapid (120-150° C.) and held there for a period of time pre-determined by DSC to crosslink to a level of polymerization with a specific $T_g$, then the sample is cooled to near room temperature, and the poling field is removed. However, it was observed that when heating at a typical rate (~10° C. min$^{-1}$) from the poling temperature to the cross-linking temperature, cracking of the EO film often occurred due to a rapid and dramatic DA cross-linking reaction. To avoid the cracking, three different stepwise poling methods adapted from a previous chromophore crosslinking procedure were tested. In general, the desired poling field (30-100 V/μm) was applied at the start, the film precursor was heated to the poling temperature, and then the temperature was slowly increased in a stepwise fashion to induce crosslinking. Specifically, they are Method A (the desired poling field was applied, then heated at 10° C./min to 130° C. for 10 min, 140° C. for 10 min, 150° C. for 10 min, then cooled), Method B (the desired poling field was applied, then heated at 10° C./min to 100° C. for 5 min, 110° C. for 5 min, 120° C. for 5 min, 130° C. for 5 min, 140° C. for 5 min, 150° C. for 10 min, then cooled), and Method C (the desired poling field was applied, then heated at 10° C./min to 100° C. for 5 min, 110° C. for 30 min, 120° C. for 30 min, 130° C. for 60 min, then cooled). These three methods gave similar poling efficiencies (as can be seen in FIG. 12H), similar $T_g$s (FIG. 17), and all avoided the cracking problem, though Method C was most successful at high poling fields. FIG. 18 shows plots of the current, voltage, and temperature versus time for a representative poling/crosslinking run using Method B. It can be seen that each time the temperature is increased, the current increases, and the voltage decreases. This is typical for poling of high $\rho_N$ chromophores, as the high concentration of π-bonds results in a high conductance. When temperature is held constant for a period of minutes at each step, the current steadily decreases and voltage increases, indicating that the resistivity of the film increases as the crosslinking reaction proceeds. As the resistance increases, the temperature (or poling field) can be increased to enhance the crosslinking (or poling) even further.

The average poling efficiencies of HLD1/HLD2 (1:1) and HLD1/HLD2 (2:1) after poling/crosslinking were 2.36±0.10 nm$^2$ V$^{-2}$ and 2.29±0.11 nm$^2$ V$^{-2}$, respectively. A very high maximum $r_{33}$ value of 286 μm V$^{-1}$ was achieved, which is the highest value reported for a neat crosslinkable EO chromophore system. The poling efficiencies of HLD2/C1 (1:1) and HLD2/P1 (1:3) after crosslinking are only 1.18±0.12 nm$^2$ V$^{-2}$ and 0.77±0.11 nm$^2$ V$^{-2}$, respectively. The poling efficiency of film crosslinked HLD1/HLD2 is much higher than that of HLD2 with C1 or P1 and higher than the previously reported crosslinked EO systems using passive crosslinkers, partially because of the higher chromophore content. The chromophore number density of HLD1/HLD2 is more than 5.1×10$^{20}$ molecules/cm$^3$, while that in traditional system is usually less than 2.7×10$^{20}$ molecules/cm$^3$. The molecular design of the crosslinkable HLD chromophores, the similar $T_g$ of chromophores HLD1 and HLD2, the pre-crosslinking process and the step-poling procedure are all key to achieving large electro-optic coefficients in a high $\rho_N$ crosslinked system.

Figure 14:
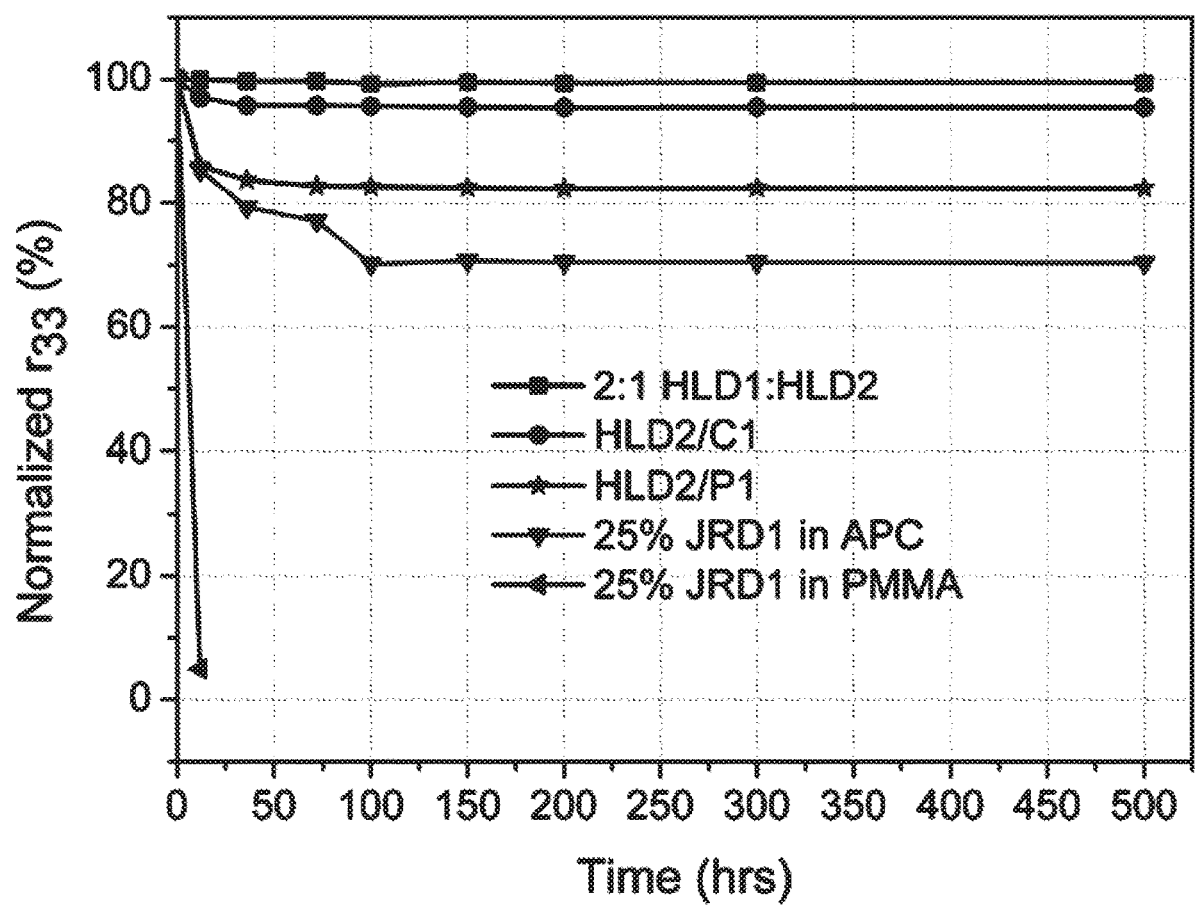
FIG. 14 demonstrates the temporal stability of the poled exemplary films HLD1/HLD2, HLD2/C1, HLD2/P1, JRD1/APC, and JRD1/PMMA at the accelerated aging temperature of 85° C.

Long-term, high temperature alignment stability was tested for the poled and crosslinked films. To do this, after initial poling/crosslinking and $r_{33}$ measurement, devices were placed in an oven at 85° C. under vacuum, and then taken out periodically to re-measure the $r_{33}$. After the poled/crosslinked sample of 2:1 HLD1:HLD2 was heated at 85° C. for 500 h, about 99% of the initial $r_{33}$ value was maintained (FIG. 14). By comparison, only 70% of the initial $r_{33}$ value was maintained for JRD1/APC (amorphous polycarbonate, $T_g$~140° C.) and only 5% of the initial $r_{33}$ for JRD1/PMMA (polymethylmethacrylate, $T_g$~100° C.) guest/host system. It demonstrates that the molecular-engineered crosslinkable chromophores can facilitate poling and lattice hardening to improve both EO activities and thermal stability. In previous reports, although the introduction of additional chromophores (without crosslinkable pendant groups) into an in situ crosslinked NLO polymer network can greatly increase the electro-optic coefficient of the chromophore/crosslinker blend, the thermostability is greatly reduced (only 75% of the EO activity could be maintained after 500 h at 85° C.). It highlights the advantages of this new crosslinkable binary chromophore system which can not only provide large electro-optic coefficients>250 μm V$^{-1}$, but also excellent alignment thermostability and high index of refraction>1.8.

Figure 15:
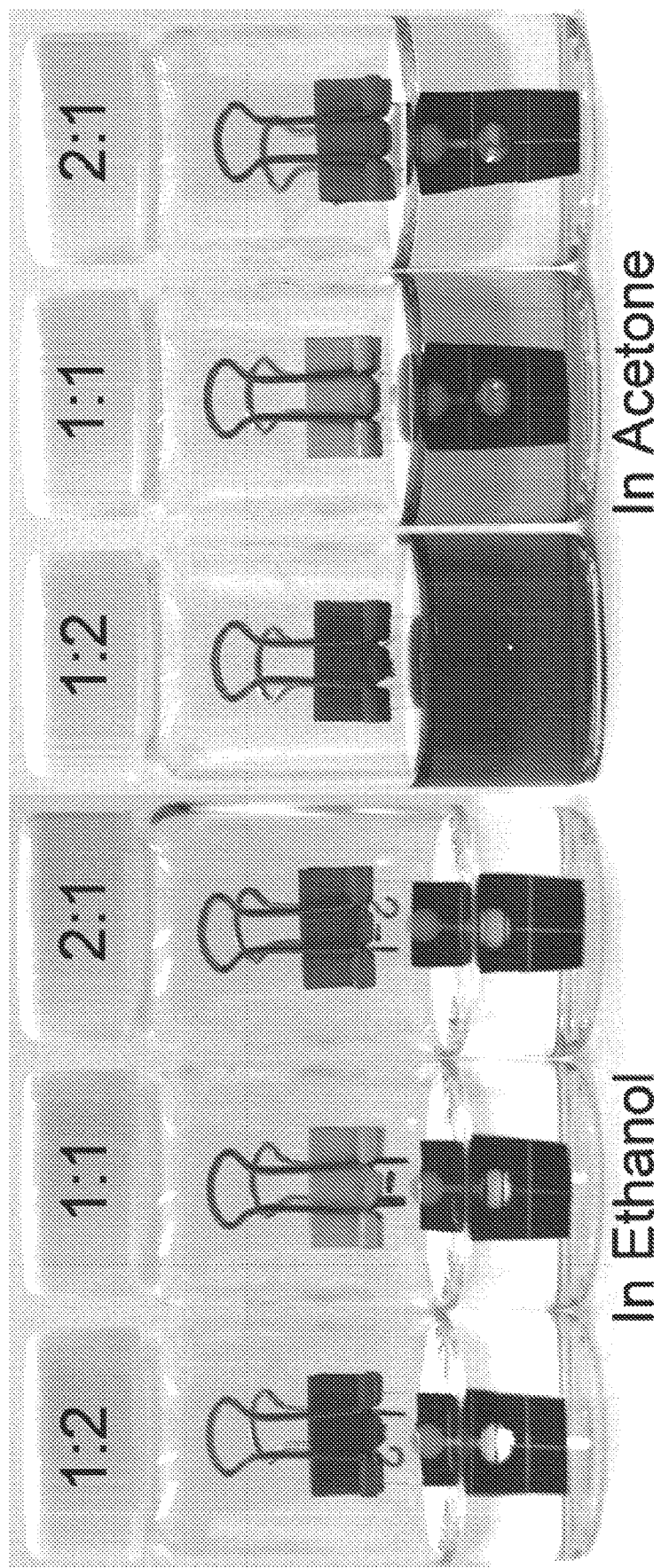
FIG. 15 shows the exemplary crosslinked electro-optic films HLD1/HLD2 with different ratios placed in organic solvents for 12 hours.

Solvent resistance of HLD1:HLD2 was tested by submerging crosslinked films (stepwise crosslinking, $T_g$ is ~155-165° C.) in ethanol or acetone for 12 hr and monitoring for dissolution. As shown in FIG. 15, all of the crosslinked HLD1:HLD2 films showed very good solvent resistance toward ethanol. After being placed in acetone for 12 hours, 1:2 HLD1:HLD2 almost completely dissolved, 1:1 HLD1:HLD2 partially dissolved and dissolution for 2:1 HLD1:HLD2 was hardly detectable. The superior solvent resistance of 2:1 HLD1:HLD2 is indicative of a higher crosslink density. Solvent resistance of poled OEO materials opens the door to additional processing conditions when integrating into SOH, POH, and more complicated EO device structures and processing conditions.

When poling HLD1/HLD2 and the temperature is kept below 110° C., the degree of crosslinking is very low, and the film could be viewed as an ordinary binary chromophore blend. Under the conditions of poling without crosslinking (poling temperature below 110° C., poling time about 5-10 min), the average $r_{33}/E_p$ of 1:1 HLD1/HLD2 and 2:1 HLD1/HLD2 were 2.93±0.08 nm$^2$ V$^{-2}$ and 3.23±0.08 nm$^2$ V$^{-2}$, respectively, which is one of the highest values reported. These values are higher than for single chromophores HLD1 and HLD2, indicating that the binary chromophore system results in an enhanced EO coefficient. They are consistent with the electro-optic activity achieved for neat JRD1, which has a similar chromophore number density, indicating that if HLD has a similar or lower hyperpolarizability value, its degree of poling-induced order is greater than or equal to that of JRD1. It is notable that film HLD1/HLD2 (2:1) achieved a very high maximum $r_{33}$ value of 456 μm V$^{-1}$ which is one of the largest electro-optic coefficients reported in the literature. This corresponds to a maximum modulator figure of merit n$^3$r$_{33}$ of 3079 μm/V, which is also among the highest reported. As with other EO molecules with ultrahigh EO coefficients, sterically bulky side chains seem to be key to achieving the excellent performance by providing sufficient site isolation to inhibit dipole-dipole coupling common to high dipole moment molecules.

Conclusion

Exemplary novel Diels-Alder cycloaddition crosslinkable binary chromophore organic glasses or films with enhanced EO coefficient, index of refraction, and thermal stability of poling-induced order have been developed. One such exemplary binary organic glass consists of the anthracene-containing Compound of Formula I or II (chromophore HLD1) and acrylate-containing Compound of Formula I or II (chromophore HLD2), which can be crosslinked to each other without requiring any polymer or small molecule crosslinker. The density of the NLO active portion of HLD1/

HLD2 (2:1) in neat EO film was larger than $5.1 \times 10^{20}$ molecules/cm$^3$. All of the films pre-reacted during drying at low temperature to a certain extent to increase the $T_g$ of the binary blend thus reducing the temperature gap between poling temperature and crosslinking temperature to facilitate processing. Film cracking during poling and crosslinking was initially an issue, but a step-poling procedure was developed so that mechanical stability was maintained during poling and crosslinking in spite of the high chromophore density. 2:1 HLD1/HLD2 achieved a very high maximum $r_{33}$ value of 286 μm V$^{-1}$ after crosslinking which is among the highest for crosslinkable chromophore systems and is enabled by high chromophore loading. After Diels-Alder cycloaddition, the glass transition temperature of the EO film increased by up to 100° C. to 175° C. which is desired for long-term stability during device operation. After annealing at 85° C., 99% of the initial $r_{33}$ value could be maintained for over 500 h. Collectively, high electro-optic activity, high index of refraction, and long-term alignment stability of these materials are a new breakthrough in organic EO materials, making HLD1/HLD2 a very promising candidate for practical applications in photonic and plasmonic devices. Furthermore, HLD1/HLD2 can be poled without crosslinking to achieve even higher EO performance 2.1 HLD1:HLD2 achieved a large poling efficiency of 3.23±0.08 nm$^2$ V$^{-2}$, $r_{33}$ as high as 456 μm V$^{-1}$, and n$^3$r$_{33}$ as high as 3079 μm/V (1310 nm).

While illustrative embodiments have been illustrated and described, it will be appreciated that various changes can be made therein without departing from the spirit and scope of the invention.

The invention claimed is:

1. A film having an electro-optic activity formed by a (4+2) cycloaddition reaction between (a) a first polarizable chromophore comprising at least two first reactive groups crosslinkable by (4+2) cycloaddition and (b) one or more compounds comprising at least two counterpart reactive groups, wherein the film has an $r_{33}$ value of about 150 μm/V or greater and a $T_g$ of about 130° C. or greater.

2. The film of claim 1, wherein the film has an index of refraction at 1310 nm of about 1.75 or greater.

3. The film of claim 1, wherein the film has a poling efficiency of about 2 nm$^2$/V$^2$ or greater.

4. The film of claim 1, wherein the one or more compounds comprising at least two counterpart reactive groups is a crosslinking agent, a polymer, a second polarizable chromophore, or a combination thereof.

5. The film of claim 1, wherein the first reactive groups crosslinkable by (4+2) cycloaddition are diene groups and the counterpart reactive groups are dienophile groups.

6. The film of claim 1, wherein the first reactive groups crosslinkable by (4+2) cycloaddition are dienophile groups and the counterpart reactive groups are diene groups.

7. The film of claim 1, wherein the film further comprises a third polarizable chromophore non-covalently associated within the film, wherein the third polarizable chromophore does not comprise a (4+2) cycloaddition reactive group.

8. The film of claim 1, wherein the first polarizable chromophore is a compound of Formula (I):

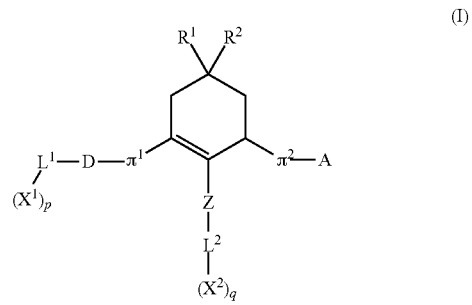

wherein
D is a π-electron donor group;
A is a π-electron acceptor group;
L$^1$ is a linker moiety selected from non-substituted or substituted C1-C20 alkylene, non-substituted or substituted C1-C20 heteroalkylene, non-substituted or substituted C6-C10 aryl, non-substituted or substituted C5-C10 heteroarylene, and combinations thereof;
L$^2$ is a linker moiety selected from non-substituted or substituted C1-C20 alkylene, non-substituted or substituted C1-C20 heteroalkylene, non-substituted or substituted C6-C10 aryl, non-substituted or substituted C5-C10 heteroarylene, and combinations thereof;
R$^1$ and R$^2$ are independently H or non-substituted or substituted C$_1$-C$_6$ alkyl;
Z is S, O, or CH$_2$;
π$^1$ and π$^2$ are independently a π bridge electronically conjugating the groups attached thereto;
X$^1$ is a group crosslinkable by (4+2) cycloaddition;
X$^2$ is a group crosslinkable by (4+2) cycloaddition;
p is 1 or 2; and
q is 1 or 2.

9. The film of claim 1, wherein the first polarizable compound has a structure represented by formula (II):

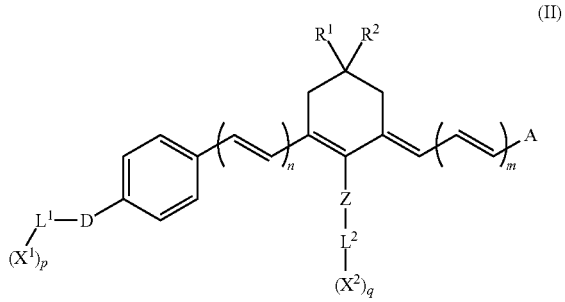

wherein
D is a π-electron donor group;
A is a π-electron acceptor group;
R$^1$ and R$^2$ are independently H or non-substituted or substituted C1-C6 alkyl;
Z is S or O;
L$^1$ is a linker moiety selected from non-substituted or substituted C1-C20 alkylene, non-substituted or substituted C1-C20 heteroalkylene, non-substituted or substituted C6-C10 aryl, non-substituted or substituted C5-C10 heteroarylene, and combinations thereof;

$L^2$ is a linker moiety selected from non-substituted or substituted C1-C20 alkylene, non-substituted or substituted C1-C20 heteroalkylene, non-substituted or substituted C6-C10 aryl, non-substituted or substituted C5-C10 heteroarylene, and combinations thereof;

$X^1$ is a group crosslinkable by (4+2) cycloaddition;
$X^2$ is a group crosslinkable by (4+2) cycloaddition;
n is 1, 2, or 3;
m is 1, 2, or 3;
p is 1 or 2; and
q is 1 or 2.

10. The film of claim 8, wherein group crosslinkable by (4+2) cycloaddition is an anthracenyl group or an acrylate group.

11. The film of claim 8, wherein p is 2 and q is 2.

12. The film of claim 8, wherein $L^1$-$(X^1)$ p and $L^2$-$(X^2)_q$ are

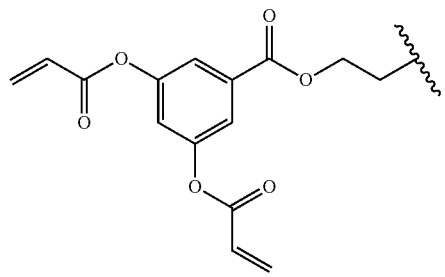 [SMILES: *CCOC(=O)c1cc(OC(=O)C=C)cc(OC(=O)C=C)c1]

13. The film of claim 8, wherein $L^1$-$(X^1)$ p and $L^2$-$(X^2)_q$ are

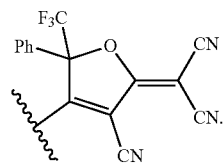

14. The film of claim 8, wherein Z is S.
15. The film of claim 8, wherein $R^1$ is $CH_3$.
16. The film of claim 8, wherein $R^2$ is $CH_3$.
17. The film of claim 8, wherein D is $NR^3$, wherein $R^3$ is an optionally a non-substituted or substituted $C_1$-$C_{10}$ alkyl or $C_1$-$C_{10}$ heteroalkyl.
18. The film of claim 8, wherein D is $NCH_3$.
19. The film of any claim 8, wherein A is

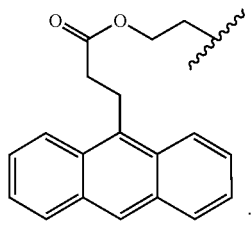 [SMILES: *CCOC(=O)CCc1c2ccccc2cc2ccccc12]

20. The film of claim 1, wherein first polarizable chromophore is a compound of formula IIA or IIB:

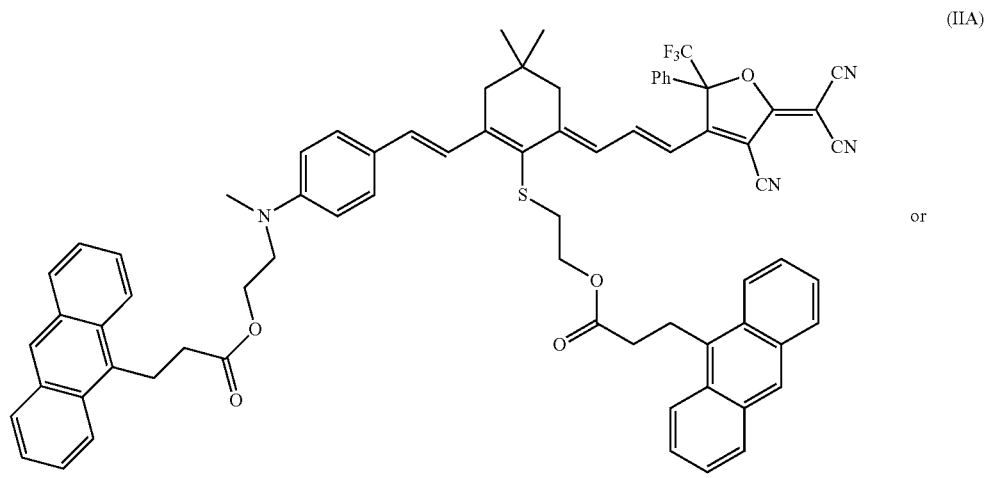

(IIB)
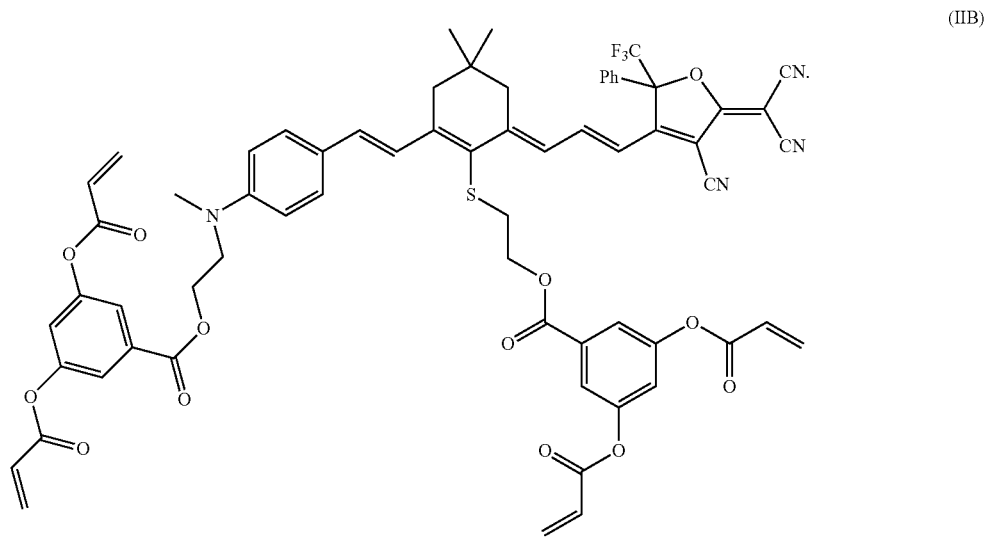
21. The film of claim 1, wherein first polarizable chromophore is a compound of formula IIA:
(IIA)
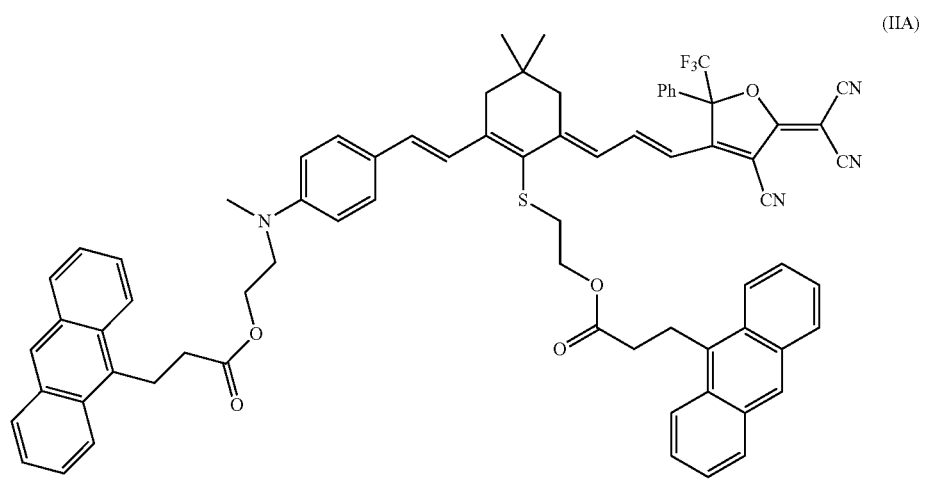 [SMILES: CN(CCOC(=O)CCc1c2ccccc2cc2ccccc12)c1ccc(/C=C/C2=C(SCCOC(=O)CCc3c4ccccc4cc4ccccc34)C(=C/C=C/C3=C(C#N)C(=C(C#N)C#N)OC3(c3ccccc3)C(F)(F)F)/CC(C)(C)C2)cc1]

and the one or more compounds comprising at least two counterpart reactive groups is a compound of Formula (IIB):

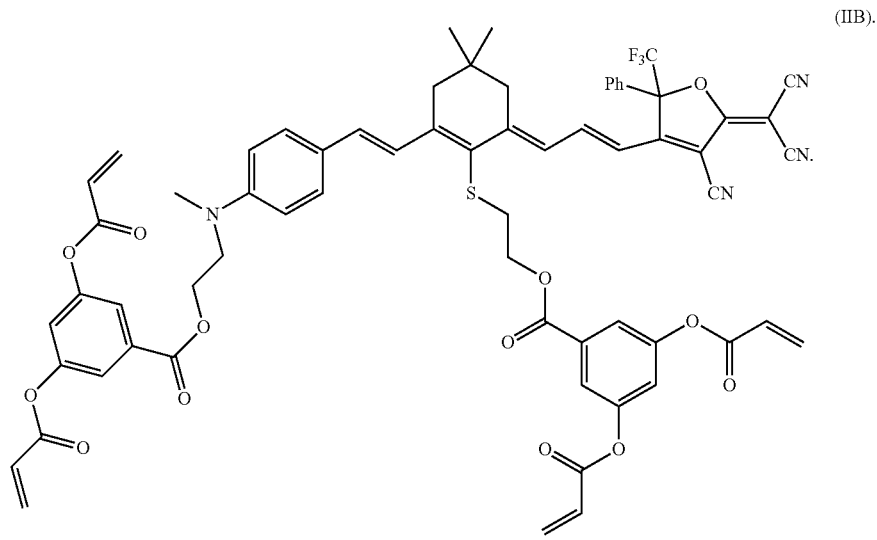 [SMILES: C=CC(=O)Oc1cc(OC(=O)C=C)cc(C(=O)OCCSC2=C(/C=C/c3ccc(N(C)CCOC(=O)c4cc(OC(=O)C=C)cc(OC(=O)C=C)c4)cc3)CC(C)(C)C/C2=C\C=C\C2=C(C#N)C(=C(C#N)C#N)OC2(c2ccccc2)C(F)(F)F)c1]

(IIB).

22. An electro-optic device, comprising the film of claim 1.

23. The electro-optic device of claim 22, wherein the device is an electro-optic modulator, antenna, Mach-Zehnder modulator, phase modulator, silicon-organic hybrid modulator, plasmonic-organic hybrid modulator, electrical-to-optical convertor, terahertz detector, frequency shifter, or frequency comb source.

* * * * *